(12) United States Patent  
Kato et al.

(10) Patent No.: US 7,528,674 B2
(45) Date of Patent: May 5, 2009

(54) MOBILE RADIO APPARATUS CAPABLE OF ADAPTIVE IMPEDANCE MATCHING

(75) Inventors: Akira Kato, Osaka (JP); Koichi Ogawa, Osaka (JP); Hiroshi Iwai, Osaka (JP); Atsushi Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 454 days.

(21) Appl. No.: 10/594,522

(22) PCT Filed: Jan. 24, 2006

(86) PCT No.: PCT/JP2006/301041

§ 371 (c)(1),
(2), (4) Date: Sep. 28, 2006

(87) PCT Pub. No.: WO2006/080304

PCT Pub. Date: Aug. 3, 2006

(65) Prior Publication Data

US 2007/0210899 A1 Sep. 13, 2007

(30) Foreign Application Priority Data

Jan. 31, 2005 (JP) ............................. 2005-023841

(51) Int. Cl.
*H03H 7/38* (2006.01)
(52) U.S. Cl. ........................ 333/17.3; 333/32
(58) Field of Classification Search ............... 333/17.3, 333/32, 99 PL; 315/111.21
See application file for complete search history.

(56) References Cited

U.S. PATENT DOCUMENTS 5,982,099 A * 11/1999 Barnes et al. .......... 315/111.21

FOREIGN PATENT DOCUMENTS

| JP | 57-101435 | 6/1982 |
|----|-----------|--------|
| JP | 60-80323 | 5/1985 |
| JP | 6-90186 | 3/1994 |
| JP | 8-97733 | 4/1996 |
| JP | 8-186512 | 7/1996 |
| JP | 11-251928 | 9/1999 |
| JP | 11-251956 | 9/1999 |

* cited by examiner

*Primary Examiner*—Stephen E Jones
(74) *Attorney, Agent, or Firm*—Wenderoth, Lind & Ponack L.L.P.

(57) ABSTRACT

There is provide a mobile radio apparatus capable of suppressing a mismatching loss, and increasing a transmission/reception sensitivity by means of instantly and adaptively matching the impedance between the antenna and the transmission/reception circuit whatever situation a mobile radio apparatus, such as a mobile phone or the like, may be. In a mobile radio apparatus (1), when starting control of the matching circuit (102), a control section (105) evaluates an initial chromosome stored in a storage section (106), and if there is an initial chromosome for providing an impedance matching, controls the matching circuit (102) so as to have a load value corresponding to this initial chromosome. If there is no initial chromosome for providing the impedance matching, the control section (105) evolves the initial chromosome with a genetic algorithm, derives a chromosome for providing the impedance matching, and controls the matching circuit (102) so as to have a load value corresponding to the derived chromosome.

30 Claims, 55 Drawing Sheets

| USE SITUATION INITIAL CHROMOSOME TABLE | |
|---|---|
| CHROMOSOME | USE SITUATION |
| INITIAL CHROMOSOME A(1):0000 0000 0000 0000 | FREE SPACE |
| INITIAL CHROMOSOME A(2):0000 1100 0001 0100 | CALL POSTURE |
| INITIAL CHROMOSOME A(3):0000 0101 0000 1111 | E-MAIL POSTURE |

FIG. 5

| CHROMOSOME RECEIVED POWER TABLE | |
|---|---|
| CHROMOSOME | RECEIVED POWER |
| CHROMOSOME B(1):0000 0000 0000 0000 | RSSSI 1 |
| CHROMOSOME B(2):0000 0000 0000 0000 | RSSSI 2 |
| CHROMOSOME B(3):0000 1100 0001 0100 | RSSSI 3 |
| CHROMOSOME B(4):0000 0101 0000 1111 | RSSSI 4 |

FIG. 6

| CHROMOSOME RECEIVED POWER TABLE AFTER NATURAL SELECTION | |
|---|---|
| CHROMOSOME | RECEIVED POWER |
| CHROMOSOME C(1):0000 1100 0001 0100 | RSSSI 3 |
| CHROMOSOME C(2):0000 0000 0000 0000 | RSSSI 2 |
| CHROMOSOME C(3):0000 1100 0001 0100 | RSSSI 3 |
| CHROMOSOME C(4):0000 0101 0000 1111 | RSSSI 4 |

FIG. 7

| CHROMOSOME TABLE AFTER CROSSOVER |
|---|
| CHROMOSOME |
| CHROMOSOME D(1):0000 1101 0001 1111 |
| CHROMOSOME D(2):0000 0000 0000 0000 |
| CHROMOSOME D(3):0000 1100 0001 0100 |
| CHROMOSOME D(4):0000 0100 0000 0100 |

FIG. 8

| CHROMOSOME TABLE AFTER MUTATION |
|---|
| CHROMOSOME |
| CHROMOSOME E(1):0000 1101 0001 0111 |
| CHROMOSOME E(2):0100 0001 0000 0100 |
| CHROMOSOME E(3):0000 1100 0001 0100 |
| CHROMOSOME E(4):0000 1100 0100 0100 |

FIG. 9

| CHROMOSOME RECEIVED POWER TABLE | |
|---|---|
| CHROMOSOME | RECEIVED POWER |
| CHROMOSOME B(1):0100 0001 0000 0100 | RSSSI5 |
| CHROMOSOME B(2):0000 1101 0001 0111 | RSSSI6 |
| CHROMOSOME B(3):0100 0001 0000 0100 | RSSSI7 |
| CHROMOSOME B(4):0000 1100 0001 0100 | RSSSI8 |
| CHROMOSOME B(5):0000 1100 0100 0100 | RSSSI9 |

FIG. 16

| INITIAL PARAMETER TABLE FOR USE SITUATION | |
|---|---|
| PARAMETER | USE SITUATION |
| SERIES: 0 V, PARALLEL: 0 V | FREE SPACE |
| SERIES: 1.2 V, PARALLEL: 2 V | CALL POSTURE |
| SERIES: 0.5 V, PARALLEL: 1.5 V | E-MAIL POSTURE |

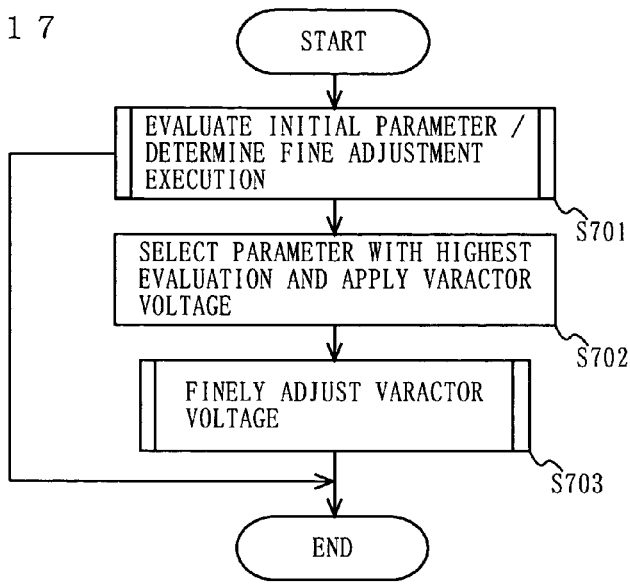

| PARAMETER RECEIVED POWER TABLE | |
|---|---|
| PARAMETER | RECEIVED POWER |
| SERIES: 0 V, PARALLEL: 0 V (CURRENT PARAMETER) | RSSSI1 |
| SERIES: 0 V, PARALLEL: 0 V (INITIAL PARAMETER) | RSSSI2 |
| SERIES: 1.2 V, PARALLEL: 2 V (INITIAL PARAMETER) | RSSSI3 |
| SERIES: 0.5 V, PARALLEL: 1.5 V (INITIAL PARAMETER) | RSSSI4 |

F I G. 2 1
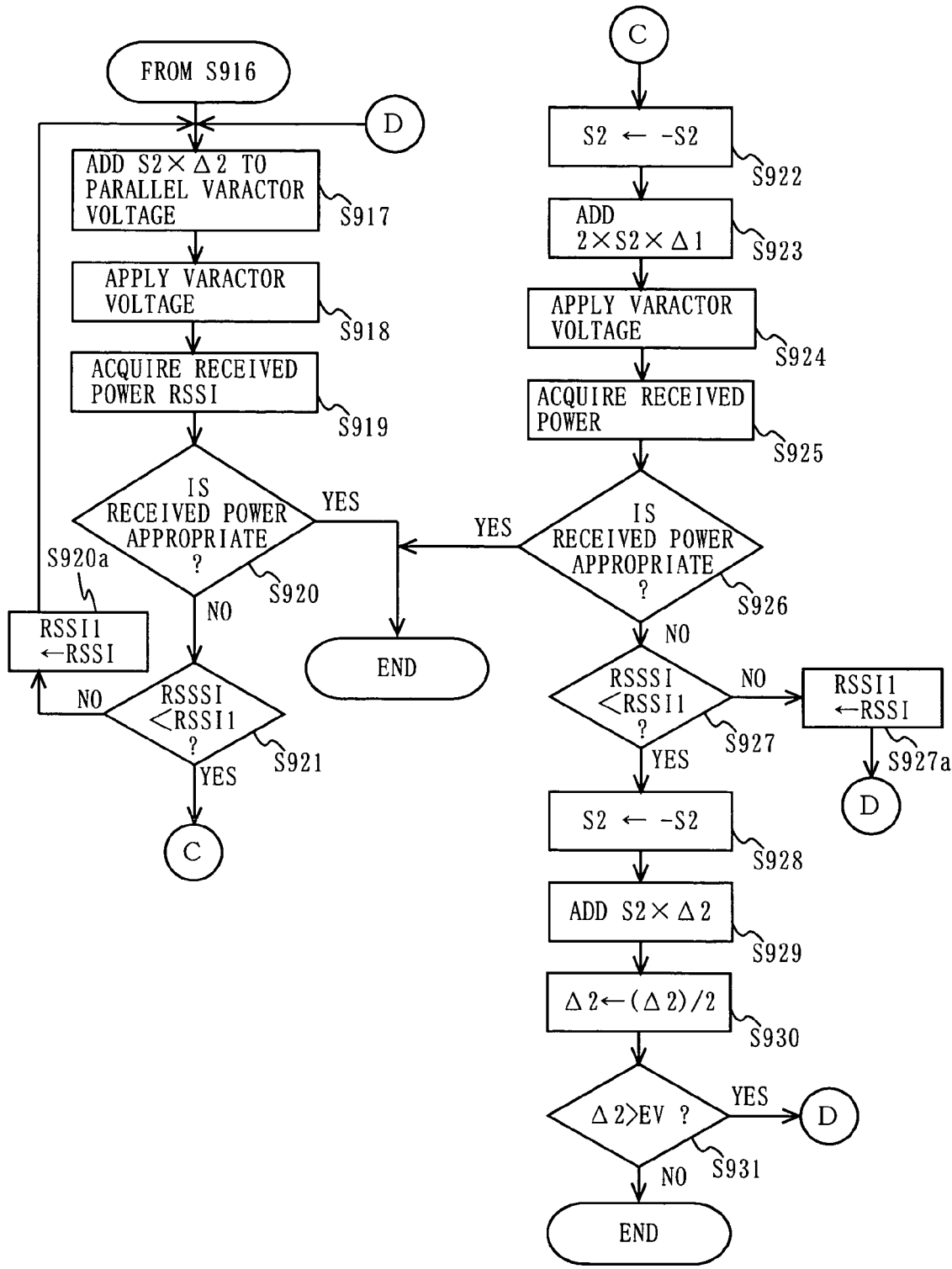

| INITIAL PARAMETER TABLE FOR USE SITUATION ||
|---|---|
| INITIAL PARAMETER | USE SITUATION |
| 0100 0010 | FREE SPACE |
| 1100 0101 | CALL POSTURE |
| 1010 0111 | E-MAIL POSTURE |

| USE SITUATION INITIAL CHROMOSOME TABLE ||
|---|---|
| INITIAL CHROMOSOME | USE SITUATION |
| 0100 0010 | FREE SPACE |
| 1100 0101 | CALL POSTURE |
| 1010 0111 | E-MAIL POSTURE |

| INITIAL PARAMETER TABLE FOR USE SITUATION | | | |
|---|---|---|---|
| INITIAL LOAD VALUE FOR MOBILE PHONE | | | USE SITUATION |
| NUMBER | VARACTOR VOLTAGE | | |
| | 206 | 207 | |
| A(1) | 3.0V | 1.0V | FREE SPACE |
| A(2) | 2.5V | 1.5V | CALL POSTURE |
| A(3) | 2.0V | 3.0V | E-MAIL POSTUR |

FIG. 50

| INITIAL PARAMETER TABLE FOR USE SITUATION | | | |
|---|---|---|---|
| INITIAL LOAD VALUE FOR DTV | | | USE SITUATION |
| NUMBER | VARACTOR VOLTAGE | | |
| | 206 | 207 | |
| AD(1) | 2.0V | 2.5V | FREE SPACE |
| AD(2) | 1.5V | 2.0V | HOLD WITH ONE HAND |
| AD(3) | 1.7V | 1.3V | HOLD WITH BOTH HANDS |
| AD(4) | 1.3V | 0.7V | ON DESK |

FIG. 51

| INITIAL PARAMETER TABLE FOR USE SITUATION | | | |
|---|---|---|---|
| INITIAL LOAD VALUE FOR RADIO LAN | | | USE SITUATION |
| NUMBER | VARACTOR VOLTAGE | | |
| | 206 | 207 | |
| AW(1) | 1.7V | 2.3V | FREE SPACE |
| AW(2) | 1.6V | 1.9V | HOLD WITH ONE HAND |
| AW(3) | 1.5V | 1.0V | HOLD WITH BOTH HANDS |

| LOAD VALUE RECEIVING TABLE | | | |
|---|---|---|---|
| INITIAL LOAD VALUE FOR RADIO LAN | | | RECEIVED POWER |
| NUMBER | VARACTOR VOLTAGE | | |
| | 206 | 207 | |
| BW(1) | 1.7V | 2.3V | RSSSI 1 |
| BW(2) | 1.7V | 2.3V | RSSSI 2 |
| BW(3) | 1.6V | 1.9V | RSSSI 3 |
| BW(4) | 1.5V | 1.0V | RSSSI 4 |

FIG. 54

| LOAD VALUE RECEIVING TABLE | | | |
|---|---|---|---|
| INITIAL LOAD VALUE FOR RADIO LAN | | | RECEIVED POWER |
| NUMBER | VARACTOR VOLTAGE | | |
| | 206 | 207 | |
| CW(1) | 1.7V | 2.3V | RSSSI2 |
| CW(2) | 1.7V | 2.3V | RSSSI1 |
| CW(3) | 1.7V | 2.3V | RSSSI2 |
| CW(4) | 1.5V | 1.0V | RSSSI4 |

FIG. 55

| LOAD VALUE RECEIVING TABLE | | |
|---|---|---|
| INITIAL LOAD VALUE FOR RADIO LAN | | |
| NUMBER | VARACTOR VOLTAGE | |
| | 206 | 207 |
| DW(1) | 1.7V | 2.3V |
| DW(2) | 1.7V | 2.3V |
| DW(3) | 1.6V | 1.65V |
| DW(4) | 1.55V | 1.33V |

FIG. 56

| LOAD VALUE RECEIVING TABLE | | |
|---|---|---|
| INITIAL LOAD VALUE FOR RADIO LAN | | |
| NUMBER | VARACTOR VOLTAGE | |
| | 206 | 207 |
| EW(1) | 0.6V | 1.1V |
| EW(2) | 1.7V | 2.3V |
| EW(3) | 1.6V | 1.65V |
| EW(4) | 1.55V | 1.33V |

FIG. 57

| LOAD VALUE RECEIVING TABLE | | | |
|---|---|---|---|
| INITIAL LOAD VALUE FOR RADIO LAN | | | RECEIVED POWER |
| NUMBER | VARACTOR VOLTAGE | | |
| | 206 | 207 | |
| BW(1) | 1.6V | 1.65V | RSSSI 5 |
| BW(2) | 0.6V | 1.1V | RSSSI 6 |
| BW(3) | 1.7V | 2.3V | RSSSI 7 |
| BW(4) | 1.6V | 1.65V | RSSSI 8 |
| BW(5) | 1.55V | 1.33V | RSSSI 9 |

MOBILE RADIO APPARATUS CAPABLE OF ADAPTIVE IMPEDANCE MATCHING

TECHNICAL FIELD

The present invention relates to a mobile radio apparatus, and relates more specifically to a mobile radio apparatus capable of adaptive impedance matching between an antenna and a transmission/reception circuit.

BACKGROUND ART

In recent years, a mobile radio apparatus, such as a mobile phone or the like, has quickly been developed. The mobile phone is used in close proximity to a human body in most of the cases. When an antenna of the mobile phone closes to a human body, an impedance of the antenna will change. When the impedance of the antenna changes, impedance matching between the antenna and a transmission/reception circuit will be shift from its matching state. When the impedance matching shifts, properties of the mobile phone will be deteriorated. For that reason, there is proposed a technology for automatically matching the impedance between the antenna and the transmission/reception circuit.

For example, there is proposed in Patent Document 1 a radio apparatus which is provided with a variable load section within an impedance matching circuit. According to the conventional radio apparatus described in Patent Document 1, when the impedance shifts from the matching state resulting from closing to a human body, the impedance between a radio unit and an antenna will be matched by means of adjusting a load of a matching circuit.

FIG. 67 is a block diagram illustrating a configuration of a conventional radio apparatus 900 described in Patent Document 1. In FIG. 67, the conventional radio apparatus 900 is provided with an impedance matching circuit 904 for adjusting an impedance between a radio unit 907 and an antenna 901 with a variable capacitance diode. Electric power detection circuits 906 and 902 generate signals C and D for indicating electric powers of signals at the preceding stage and the subsequent stage of the impedance matching circuit 904, respectively. A comparator 905 compares the voltage signals C and D. An applied voltage control circuit 903 generates a voltage signal V for controlling a capacitance of a variable capacitance diode based on a comparison result E so that a difference between the voltage signals C and D may become small to thereby supply it to the variable capacitance diode. According to the voltage signal V, the impedance matching circuit 904 adjusts the impedance. As a result of this, the conventional radio apparatus can adjust the impedance between the radio unit 907 and the antenna 901.

In addition, there is disclosed in Patent Document 2 a method of matching an impedance between an antenna and a power amplification section.

According to the conventional method described in Patent Document 2, when one of a plurality of channel frequencies is specified, the impedance between the power amplification section and the antenna is adjusted in a specified channel. According to this conventional method, when a channel frequency is set, by rotating a variable element in a forward or reverse direction to a setting tuning position of each channel frequency by means of a drive motor using a manual signal, a preset adjusting operation for changing a load as an antenna dummy resistance, and a managing operation for correcting a preset value with a manual signal in order to match it to an actual antenna impedance are provided. As a result of this, the impedance between the antenna and the power amplification section will be matched in the specified channel.

Moreover, there is disclosed in Patent Document 3 an impedance matching device capable of automatically matching an impedance between an antenna and a transmitting section when the environment around the antenna changes suddenly.

The conventional impedance matching device disclosed in Patent Document 3 is provided with a standing-wave ratio detecting section for measuring a plurality of voltages at respective points over a transmission path from the transmitting section to the antenna to detect a standing-wave ratio, an impedance calculating section for calculating a present impedance on an antenna side seen from a side of the transmission path, based on the aforementioned standing wave over the aforementioned transmission path, a setting match table for storing, as a list, setting values of a predetermined element for matching which eliminates a difference between an impedance on a side of the transmitting section and the present impedance calculated as above, a variable matching section provided for impedance adjustment in an input terminal of the antenna which receives a transmission power from the aforementioned transmission path, and an operation control section for controlling a matching element of the aforementioned variable matching section to be a predetermined value based on the present impedance and the aforementioned setting match table. As described above, the conventional impedance matching device disclosed in Patent Document 3, while storing the setting value of the predetermined element for matching which eliminates the difference between the impedance on the side of the transmitting section and the present impedance on the side of the antenna, adjusts a variable matching circuit so as to provide this setting value, and matches the impedance between the transmitting section and the antenna.

Furthermore, there is disclosed in Patent Document 4 an antenna tuner for selectively coupling, with an antenna and a transmitter-receiver, a plurality of capacitors and a plurality of inductors which serve as a load of the antenna and are selectively connected between the antenna and the transmitter-receiver, based on whether a load resistance is larger than a characteristic impedance of the antenna or small. As a result of this, an antenna system can be tuned.

[Patent Document 1] Japanese Laid-open Patent Publication No. 11-251928

[Patent Document 2] Japanese Laid-open Patent Publication No. 60-80323

[Patent Document 3] Japanese Laid-open Patent Publication No. 8-97733

[Patent Document 4] Japanese Laid-open Patent Publication No. 57-101435

DISCLOSURE OF THE INVENTION

Problems to be Solved by the Invention

The mobile phone in recent years has been used not only as a telephone, but also as means for transmitting and receiving an E-mail, means for browsing Web sites, means for downloading contents, or the like. When the mobile phone is used as the telephone, an antenna thereof will be located close to user's ears. Meanwhile, during stand-by mode, the antenna may be located over a free space apart from a user's body, located near a user's chest, or put in a user's bag. When it is used as the means for transmitting and receiving an E-mail, or means for browsing the Web site, the antenna thereof will be located near a user's palm. When it is used as the means for downloading contents, the mobile phone may be put on a desk. Thus, there are various situations in using the mobile phone. In addition, bodily features of the user who uses the mobile phone are not the same. Accordingly, the impedance of the antenna changes variously according to a use situation, and has a difficult value to be predicted. In addition, an impedance of the antenna changes instantly according to the use situation.

In the conventional radio apparatus disclosed in Patent Document 1, however, an initial condition upon starting control is not defined, so that a convergence of a control operation is slow, resulting in a problem that the control requires a long time. Hence, it is not effective to apply the technology disclosed in Patent Document 1 to the mobile phone in recent years, in which the impedance of the antenna changes instantly according to the use situation.

In the conventional method disclosed in Patent Document 2, the impedance matching is performed manually, so that the impedance matching operation requires much time. Hence, it is not effective to apply the technology disclosed in Patent Document 2 to the mobile phone in recent years in which the impedance of the antenna changes instantly according to the use situation.

In the conventional impedance matching device disclosed in Patent Document 3, it is necessary to predict any impedances of the antenna to store them on the table. When the change of the impedance of the antenna is various like the mobile phone, however, it is difficult to store the table which can cope with the any impedances.

In the conventional antenna tuner disclosed in Patent Document 4, the capacitor and the inductor which are prepared in advance are limited. Hence, in the conventional antenna tuner disclosed in Patent Document 4, it is difficult to match the impedance with the impedance of the antenna which changes variously.

Therefore, it is an object of the present invention to provide a mobile radio apparatus capable of suppressing a mismatching loss and increasing a transmission/reception sensitivity by means of instantly and adaptively matching the impedance between the antenna and the transmission/reception circuit, whatever situation the mobile radio apparatus, such as the mobile phone or the like, may be.

Solution to the Problems

In order to solve the aforementioned problems, the present invention has following features. According to the present invention, there is provided a mobile radio apparatus for a radio communication, comprising an antenna, a signal processing section for processing a signal a matching circuit for matching an impedance between the antenna and the signal processing section, the matching circuit being connected between the antenna and the signal processing section, and having a variable load value, a control section for controlling the load value of the matching circuit, and a storage section for storing information on the load value of the matching circuit as initial load value information, corresponding to a use situation of the mobile radio apparatus. The control section includes initial control means for evaluating the initial load value information stored in the storage section upon starting control of the matching circuit, and if there is initial load value information for providing impedance matching, for controlling the matching circuit so as to have a load value corresponding to this initial load value information, and if there is no initial load value information for providing the impedance matching, matched load value deriving means for deriving matched load value information which is information on the load value for providing the impedance matching, using the initial load value information stored in the storage section, and controlling the matching circuit so as to have a load value corresponding to the derived matched load value information.

According to the present invention, upon starting the control of the matching circuit, the matching circuit is first controlled using the initial load value information stored in advance. Hence, if there is information on the load value that can provide the impedance matching, in the initial load value information, the impedance matching can be obtained without finely adjusting the load value of the matching circuit. Thus, the impedance matching can be obtained in a short time. Even when there is no information on the load value that can provide the impedance matching, in the initial load value information, the matched load value information can be derived by the matched load value deriving means using the initial load value information. Since the initial load value information corresponds to the use situation, it is information on the load value expected to provide the impedance matching to some extent. Hence, the time required to derive the matched load value information may also be short. As described above, there is provided the mobile radio apparatus capable of instantly matching the impedance between the antenna and signal processing section whatever situation the mobile radio apparatus may be, and thereby capable of suppressing a mismatching loss and increasing a transmission/reception sensitivity.

Preferably, the mobile radio apparatus further comprises a matching detecting section for detecting an impedance matching rate between the antenna and the signal processing section, the matching detecting section being connected between the matching circuit and the signal processing section. The matching detecting section includes a signal strength detecting section for detecting signal strength of a first frequency band corresponding to a frequency band of a received signal received through the antenna and the matching circuit. The initial control means evaluates the initial load value information stored in the storage section based on the signal strength of the first frequency band detected by the signal strength detecting section. If there is no initial load value information for providing the impedance matching, the matched load value deriving means, while changing the load value of the matching circuit, evaluates the changed load value of the matching circuit based on the signal strength of the first frequency band detected by the signal strength detecting section, and derives the matched load value information.

As a result of this, the mobile radio apparatus can obtain appropriate matched load value information based on a received power.

Preferably, the mobile radio apparatus further comprises a matching detecting section for detecting an impedance matching rate between the antenna and the signal processing section, the matching detecting section being connected between the matching circuit and the signal processing section. The matching detecting section includes a reflected voltage detecting section for detecting a reflected voltage of a second frequency band corresponding to a frequency band of a transmission signal generated in the signal processing section. The initial control means evaluates the initial load value information stored in the storage section based on the reflected voltage of the second frequency band detected by the reflected voltage detecting section. If there is no initial load value information for providing the impedance matching, the matched load value deriving means, while changing the load value of the matching circuit, evaluates the changed initial load value information based on the reflected voltage of the second frequency band detected by the reflected voltage detecting section, and derives the matched load value information.

As a result of this, the mobile radio apparatus can obtain the appropriate matched load value information based on a transmission power.

Preferably, the signal processing section transmits a function to be used to the control section, and the control section controls the load value of the matching circuit, along with the function transmitted from the signal processing section, so that the received power of the received signal received through the antenna and the matching circuit, or the transmission power of the transmission signal generated in the signal processing section may be increased.

As a result of this, the control section can control the load value of the matching circuit so that the received power or the transmission power may be increased corresponding to a function that the signal processing section uses (for example, a mobile phone function, a digital television function, a radio LAN function, or the like).

Preferably, the matched load value deriving means may derive the matched load value information by means of repeatedly changing the load value of the matching circuit.

As a result of this, the appropriate matched load value information can be obtained.

Preferably, the initial load value information is initial information for indicating the load value of the matching circuit, and the matched load value deriving means may derive information for indicating the matched load value information by means of evolving the initial information.

As described above, the information for indicating the matched load value information can be derived quickly by means of evolving the initial information, so that there is provided the mobile radio apparatus capable of quickly matching the impedance between the antenna and the signal processing section.

Preferably, the initial load value information is an initial chromosome for indicating the load value of the matching circuit, and the matched load value deriving means may derive a chromosome for indicating the matched load value information by means of evolving the initial chromosome using a genetic algorithm.

As described above, the chromosome for indicating the matched load value information can be derived quickly by means of evolving the chromosome with a genetic algorithm, so that there is provided the mobile radio apparatus capable of quickly matching the impedance between the antenna and the signal processing section.

Preferably, the matched load value deriving means may derive the matched load value information by means of finely adjusting the load value of the matching circuit using a steepest descent method algorithm.

As described above, the impedance matching can be obtained quickly by means of finely adjusting the load value of the matching circuit using the steepest descent method algorithm.

Preferably, the matching circuit includes a plurality of switches for selecting a load, and the matched load value deriving means may derive, while switching the plurality of switches, the matched load value information which is information on on/off of the switch by setting a state where the plurality of switches are controlled to a starting point, so as to correspond to the initial load value information with the highest evaluation.

As described above, since a switch state corresponding to the initial load value information with the highest evaluation is set to the starting point, the impedance matching can be obtained quickly.

Preferably, the matched load value deriving means comprises local search means for deriving the matched load value information by means of finely adjusting the load value of the matching circuit, and if the matched load value information cannot be derived by means of the local search means, global search means for newly generating load value information required for deriving the matched load value information, and deriving the matched load value information using the load value information, wherein if the matched load value information cannot be derived by the global search means, the local search means may derive the matched load value information by means of finely adjusting the load value of the matching circuit again.

As described above, a case where the matched load value cannot be derived even by the local search means may be considered a case where the use situation has changed while the matching circuit has been controlled, and the matched load value could not be derived by a local fine adjustment, for example. According to the present invention, if the matched load value cannot be derived even by the local search means, the load value information is newly generated, so that the matched load value information for providing the impedance matching is derived using this load value information. Hence, there is provided the mobile radio apparatus capable of providing an impedance matching even when the use situation is changed during the control for the impedance matching. Moreover, since the finer adjustment is performed by the local search means, the impedance matching can be obtained with sufficient accuracy. Additionally, since the processing according to the global search means and the processing according to the local search means will be performed alternately, the mobile radio apparatus will repeat the operation for obtaining the impedance matching.

Preferably, the matched load value deriving means may derive the matched load value information by means of finely adjusting the load value of the matching circuit.

As a result of this, since the matched load value deriving means will perform the local search processing, the impedance matching can be obtained with sufficient accuracy.

Preferably, the matched load value deriving means may generates pieces of information for indicating the load values of the matching circuit at random as random load value information to thereby evaluate the generated random load value information, and if there is random load value information for providing the impedance matching, controls the matching circuit so as to have the load value corresponding to this random load value information, while, if there is no random load value information for providing the impedance matching, derives the matched load value information using the initial load value information and the random load value information.

As a result of this, even when there is no information on the load value that can provide the impedance matching, in the initial load value information, it will be determined whether or not there is the information on the load value that can provide the impedance matching, in the newly generated random load value information. Hence, the impedance matching can be obtained quickly. Moreover, if there is no appropriate information in the random load value information, the matched load value information is derived using the initial load value information and the random load value information, so that the impedance matching can be obtained more certainly.

Preferably, the initial load value information is the initial chromosome for indicating the load value of the matching circuit, the random load value information is a random chromosome for indicating the load value of the matching circuit, and the matched load value deriving means may derive the matched load value information by means of evolving the initial chromosome and the random chromosome using a genetic algorithm.

As described above, since the matched load value information is obtained using a genetic algorithm, the impedance matching can be obtained quickly.

Preferably, the matched load value deriving means may derive the matched load value information by means of finely adjusting the load value of the matching circuit corresponding to a chromosome with the highest evaluation among the chromosomes obtained by means of evolving the initial chromosome and the random chromosome.

As described above, since the chromosome with the highest evaluation is used and the load value of the matching circuit is finely adjusted, the matched load value information can be derived quickly.

Preferably, if the processing for fine adjustment satisfies a predetermined limiting condition, the matched load value deriving means may generate a new chromosome, and derive the matched load value information using the new chromosome that has been generated.

For example, when the matched load value information could not be obtained by the processing for fine adjustment resulting from the change of the use situation during controlling the load value of the matching circuit, the predetermined limiting condition will be satisfied. In such a case, since the matched load value information is derived using the new chromosome, the impedance matching can be obtained even when the use situation has changed during the control of the matching circuit.

Preferably, the matched load value deriving means evaluates the new chromosome, and if there is a chromosome for providing the impedance matching, controls the matching circuit so as to have the load value corresponding to this chromosome, while, if there is no chromosome for providing the impedance matching, evolves the new chromosome using a genetic algorithm to derive the matched load value information using the evolved chromosome.

As described above, when the new chromosome is generated, the matched load value deriving means evaluates the new chromosome first, so that the impedance matching is obtained quickly. Meanwhile, if there is no chromosome for providing the impedance matching, the matched load value information is derived using a genetic algorithm, so that the impedance matching will be obtained quickly.

Preferably, the matched load value deriving means may derive the matched load value information by means of finely adjusting the load value of the matching circuit corresponding to the chromosome with the highest evaluation among the chromosomes obtained by means of evolving the new chromosome.

As described above, the matched load value information can be derived quickly by means of finely adjusting the load value of the matching circuit corresponding to the chromosome with the highest evaluation.

Preferably, the control section further comprises new initial load value information registration means for additionally registering the matched load value information derived by the matched load value deriving means to the storage section as the initial load value information, wherein the control section may perform the control from the next time using the initial load value information that is newly additionally registered.

As described above, the matched load value information obtained once is registered as the initial load value information, and the initial load value information that is newly additionally registered is used in the control from the next time, so that the probability of obtaining the impedance matching at the step of evaluating the initial load value information will be increased. When the same user is operating the mobile radio apparatus, the load value for the impedance matching should be concentrated as the similar load value. For that reason, by additionally registering the matched load value information as the initial load value information like the present invention, the information on the load values that can provide the impedance matching will be increasingly accumulated, so that the more the matching process by the control section is repeated, the more quickly the impedance matching will be obtained.

Preferably, the mobile radio apparatus is a mobile phone, wherein the initial load value information may include information on a load value expected to provide the impedance matching in a situation when there is the mobile phone in a free space apart from a human body, information on a load value expected to provide the impedance matching when the mobile phone is used in a situation during call, and information on a load value expected to provide the impedance matching in a situation when an E-mail function of the mobile phone is used.

As a result of this, the information on the load value corresponding to a typical use situation of the mobile phone will be registered as the initial load value information, so that the impedance matching can be obtained quickly.

Preferably, the mobile radio apparatus further comprises a matching detecting section for detecting the impedance matching rate, the matching detecting section being connected between the matching circuit and the signal processing section, wherein the control section may determine whether or not the impedance matching is obtained, based on the detected result by the matching detecting section.

Preferably, the initial control means may start the control of the matching circuit based on the detected result by the matching detecting section.

Preferably, the matching detecting section detects the reflected voltage or the received power, the mobile radio apparatus further comprises an integrating circuit, and the reflected voltage or the received power detected by the matching detecting section may be inputted into the control section through the integrating circuit.

As a result of this, a stable reflected voltage or received power can be obtained, so that the control of the matching circuit is stabilized.

Preferably, the mobile radio apparatus further comprises a use situation change detecting section for detecting the change of the use situation of the mobile radio apparatus, wherein the initial control means may start the control of the matching circuit when the change of the use situation is detected by the use situation change detecting section.

Preferably, the initial control means may first evaluate the initial load value information corresponding to the use situation after the change detected by the use situation change detecting section.

As a result of this, the probability that the impedance matching is obtained is increased, so that the impedance matching can be obtained quickly.

For example, the mobile radio apparatus is a mobile phone, wherein the use situation change detecting section may detect whether or not the use situation is in a talk state by means of detecting whether or not a call button of the mobile phone is pressed, and if the use situation is detected to be in the talk state by the use situation change detecting section, the initial control means may first evaluate the initial load value information corresponding to the talk state.

For example, the mobile radio apparatus is a folding-type flip mobile phone, wherein the use situation change detecting section detects whether or not the use situation is in an open state or in a close state by means of detecting open/close of the flip mobile phone, and if the open state is detected by the use situation change detecting section, the initial control means may first evaluate the initial load value information corresponding to the open state, while, if the close state is detected by the use situation change detecting section, it may first evaluate the initial load value information corresponding to the close state.

For example, the use situation change detecting section may detect the change of the use situation of the mobile radio apparatus by detecting a temperature, and the initial control means may first evaluate the initial load value information corresponding to the temperature detected by the use situation change detecting section.

Moreover, the mobile radio apparatus further comprises at least one other antenna other than the antenna, and a switch circuit for switching a connection between the signal processing section, and the antenna and the other antennas, wherein the matching circuit may match the impedance between the antenna and the other antennas, and the signal processing section, and the control section may control the connection of the switch circuit.

As a result of this, there is provided the mobile radio apparatus with a diversity function.

For example, the matching circuit may include at least one reactive element and/or at least one inductance element, which serves as the load, and at least one switch for selecting the load.

For example, the at least one switch may be a MEMS (Micro-Electro-Mechanical System) switch.

As a result of this, a loss by the matching circuit can be reduced.

Effect of the Invention

As described above, according to the present invention, whatever situation the mobile radio apparatus may be, there is provided the mobile radio apparatus capable of instantly and adaptively matching the impedance between the antenna and signal processing section, and capable of suppressing a mismatching loss and increasing a transmission/reception sensitivity.

BRIEF DESCRIPTION OF THE DRAWINGS

FIG. 5 is a diagram illustrating an example of a chromosome received power table.

FIG. 6 is a diagram illustrating an example of a chromosome received power table after natural selection.

FIG. 7 is a diagram illustrating an example of a chromosome table after crossover.

FIG. 8 is a diagram illustrating an example of a chromosome table after mutation.

FIG. 9 is a diagram illustrating an example of a chromosome received power table after second generation.

FIG. 16 is a diagram illustrating an example of a initial parameter table for use situation in a second embodiment.

FIG. 17 is a flow chart illustrating the operation of the control section 105 in accordance with the second embodiment.

FIG. 18 is a diagram illustrating an example of a parameter received power table.

FIG. 21 is a flow chart illustrating the details of the operation of the control section 105 after Step S917.

FIG. 50 is a diagram illustrating an example of the initial load value table of the use situation for DTV.

FIG. 51 is a diagram illustrating an example of the initial load value table of the use situation for radio LAN.

FIG. 54 is a diagram illustrating an example of the load value received power table for radio LAN after natural selection.

FIG. 55 is a diagram illustrating an example of the load value table after crossover.

FIG. 56 is a diagram illustrating an example of the load value table after mutation.

FIG. 57 is a diagram illustrating an example of the load value received power table after the second generation.

FIG. 65 D is a block diagram illustrating a configuration of a mobile radio apparatus 6b provided with an RL integrating circuit.

Figure 1:
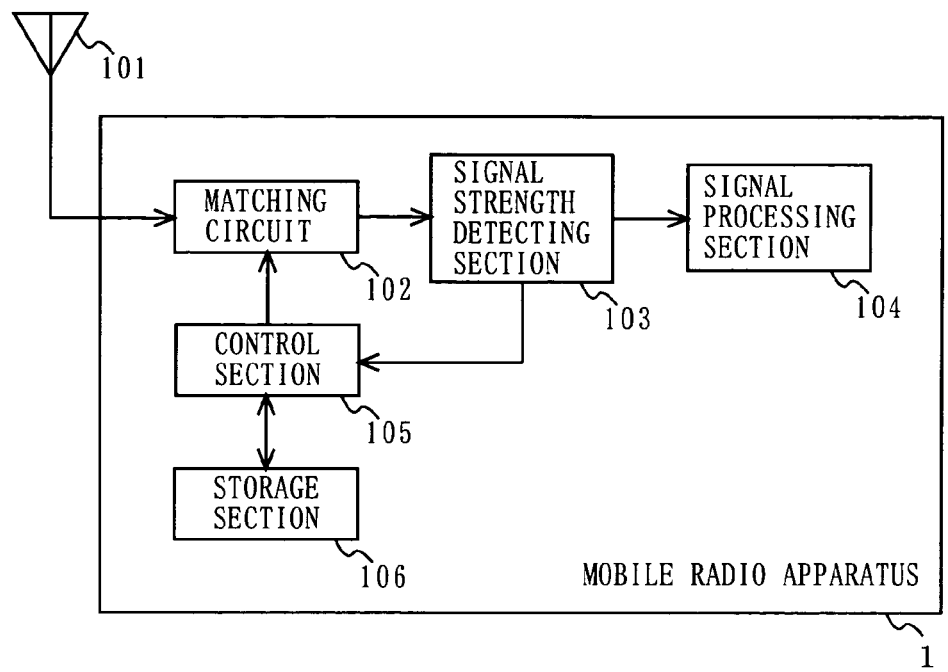
FIG. 1 is a block diagram illustrating a configuration of a mobile radio apparatus 1 in accordance with a first embodiment of the present invention.

DESCRIPTION OF THE REFERENCE CHARACTERS 1, 1a, 1b, 6a, 6b, 5, 6, 7, and 8: Mobile radio apparatus
101, 501, 601, 701, and 801: Antenna
102, 400, 502, 602, 702, and 802: Matching circuit
103, 503, and 803b: Signal strength detecting section
104, 504, 604, 704, and 804: Signal processing section
105, 505, 605, 705, and 805: Control section
106, 506, 606, 706, and 806: Storage section
201: Serial load
202: Parallel load
203: Serial varactor diode
204: Parallel varactor diode
205: Ground
206: Serial varactor voltage
207: Parallel varactor voltage
301 and 305: Resistor
302: Capacitor
304: Inductor
401: Call button
402: Temperature sensor
411 through 414 and 421 through 424: First through eighth loads
415 through 418 and 425 through 428: First through eighth switches
507: Switch circuit
603 and 803a: Reflected voltage detecting section
703 and 803: Matching detecting section
707: Shared unit
802a: Transmitting side matching circuit
802b: Receiving side matching circuit
804a: Transmitting section
804b: Receiving section

BEST MODE FOR CARRYING OUT THE INVENTION

Hereinafter, embodiments of the present invention will be described with reference to the drawings. However, the present invention is not limited to the following embodiments.

FIRST EMBODIMENT

FIG. 1 is a block diagram illustrating a configuration of a mobile radio apparatus 1 in accordance with a first embodiment of the present invention. In FIG. 1, the mobile radio apparatus 1 is provided with an antenna 101, a matching circuit 102, a signal strength detecting section 103, a signal processing section 104, a control section 105, and a storage section 106.

A signal received by the antenna 101 is sent to the signal processing section 104 through the matching circuit 102 and the signal strength detecting section 103 to be subjected to the signal processing. The matching circuit 102 has a variable load value. The signal strength detecting section 103 detects an electric power (received power) of the received signal, and transmits the detected received power to the control section 105. The control section 105 controls the load value of the matching circuit 102, in order to further increase the received power using a genetic algorithm. The control section 105 may be implemented by a dedicated microprocessor, or may be implemented by a general purpose CPU which can read and perform a program product stored in the storage section 106. The storage section 106 stores a chromosome used for a genetic algorithm (GA) in the control section 105.

Figure 2:
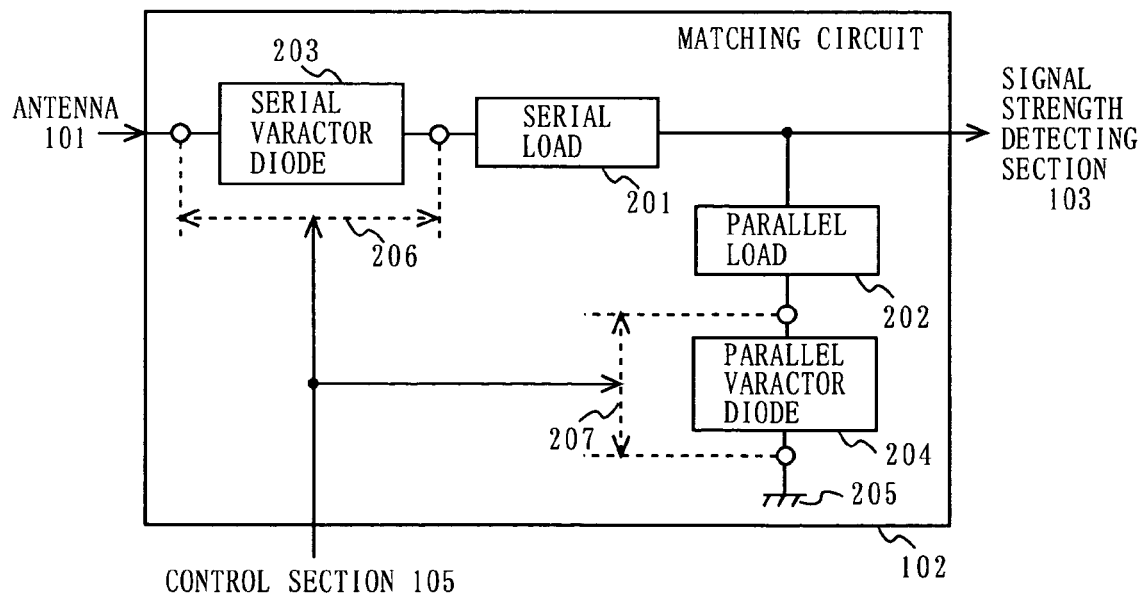
FIG. 2 is a block diagram illustrating a circuit configuration of a matching circuit 102.

FIG. 2 is a block diagram illustrating a circuit configuration of a matching circuit 102. In FIG. 2, the matching circuit 102 includes a serial load 201, a parallel load 202, a serial varactor diode 203, and a parallel varactor diode 204. The serial load 201 and the parallel load 202 are composed of at least one of a capacitor and an inductor. The serial varactor diode 203 is a varactor diode, and a capacitance thereof can be changed by varying a serial varactor voltage 206. The parallel varactor diode 204 is a varactor diode, and a capacitance thereof can be changed by varying a parallel varactor voltage 207. Thus, the matching circuit 102 has a variable load value. The matching circuit 102 is comprised of the serial load 201, the parallel load 202, the serial varactor diode 203 to which the varactor voltage 206 is applied, and the parallel varactor diode 204 to which the varactor voltage 207 is applied so as to provide matching in a free space in an initial condition. A GND 205 is a ground. The varactor voltages 206 and 207 are controlled by the control section 105.

According to the first embodiment, as parameters for representing the varactor voltages 206 and 207, a chromosome in which a parameter obtained by multiplying the varactor voltage 206 by ten and converting the result into an 8-bit binary number, and a parameter obtained by multiplying the varactor voltage 207 by ten and converting the result into an 8-bit binary number are coupled is used.

There will be described a chromosome corresponding to a case in which, for example, the varactor voltage 206 at the side of the serial varactor diode 203 is set to 0 [V], and the varactor voltage 207 at the side of the parallel varactor diode 204 is set to 0 [V]. When a value obtained by multiplying 0 [V], which is the varactor voltage 206, by ten is converted into a 8-bit binary number, "0000 0000" is obtained. When a value obtained by multiplying 0 [V], which is the varactor voltage 207, by ten is converted into a 8-bit binary number, "0000 0000" is obtained. Hence, as the chromosomes for indicating the varactor voltages 206 and 207, "0000 0000 0000 0000", in which "0000 0000" and "0000 0000" are coupled is used. Note herein that, in the chromosome, "0" and "1" are called genes.

There will be described a chromosome corresponding to a case in which the varactor voltage 206 at the side of the serial varactor diode 203 is set to 1.2 [V], and the varactor voltage 207 at the side of the parallel varactor diode 204 is set to 2 [V]. When a value obtained by multiplying 1.2 [V], which is the varactor voltage 206, by ten is converted into a 8-bit binary number, "0000 1100" is obtained. When a value obtained by multiplying 2 [V], which is the varactor voltage 207, by ten is converted into a 8-bit binary number, "0001 0100" is obtained. Hence, as the chromosome for representing the varactor voltages 206 and 207, "0000 1100 0001 0100", in which "0000 1100" and "0001 0100" are coupled is used.

There will be described a chromosome corresponding to a case in which the varactor voltage 206 at the side of the serial varactor diode 203 is set to 0.5 [V], and the varactor voltage 207 at the side of the parallel varactor diode 204 is set to 1.5 [V]. When a value obtained by multiplying 0.5 [V], which is the varactor voltage 206, by ten is converted into a 8-bit binary number, "0000 0101" is obtained. Next, when a value obtained by multiplying 1.5 [V], which is the varactor voltage 207, by ten is converted into a 8-bit binary number, "0000 1111" is obtained. Hence, as the chromosome for representing the varactor voltages 206 and 207, "0000 0101 0000 1111" in which "0000 0101" and "0000 1111" are coupled is used.

The storage section 106 stores information on the load value of the matching circuit 102 as an initial load value information, corresponding to a use situation of the mobile radio apparatus. In the first embodiment, in a typical use situation of the mobile radio apparatus 1, the storage section 106 stores in advance a chromosome for indicating the varactor voltage expected to provide the impedance matching (hereinafter, referred to as the initial chromosome), corresponding to the typical use situation. The initial chromosome is the initial load value information. Hereinafter, a table in which the initial chromosome and the typical use situation are associated with each other will be called a use situation initial chromosome table. In the first embodiment, it is assumed that an array for indicating the use situation initial chromosome table is A(i) (i is an integer).

According to the first embodiment, by naturally selecting, crossing over, and mutating a chromosome, the chromosome is evolved, so that the varactor voltages 206 and 207 which can provide more appropriate impedance matching will be determined.

Figures 3, 4:
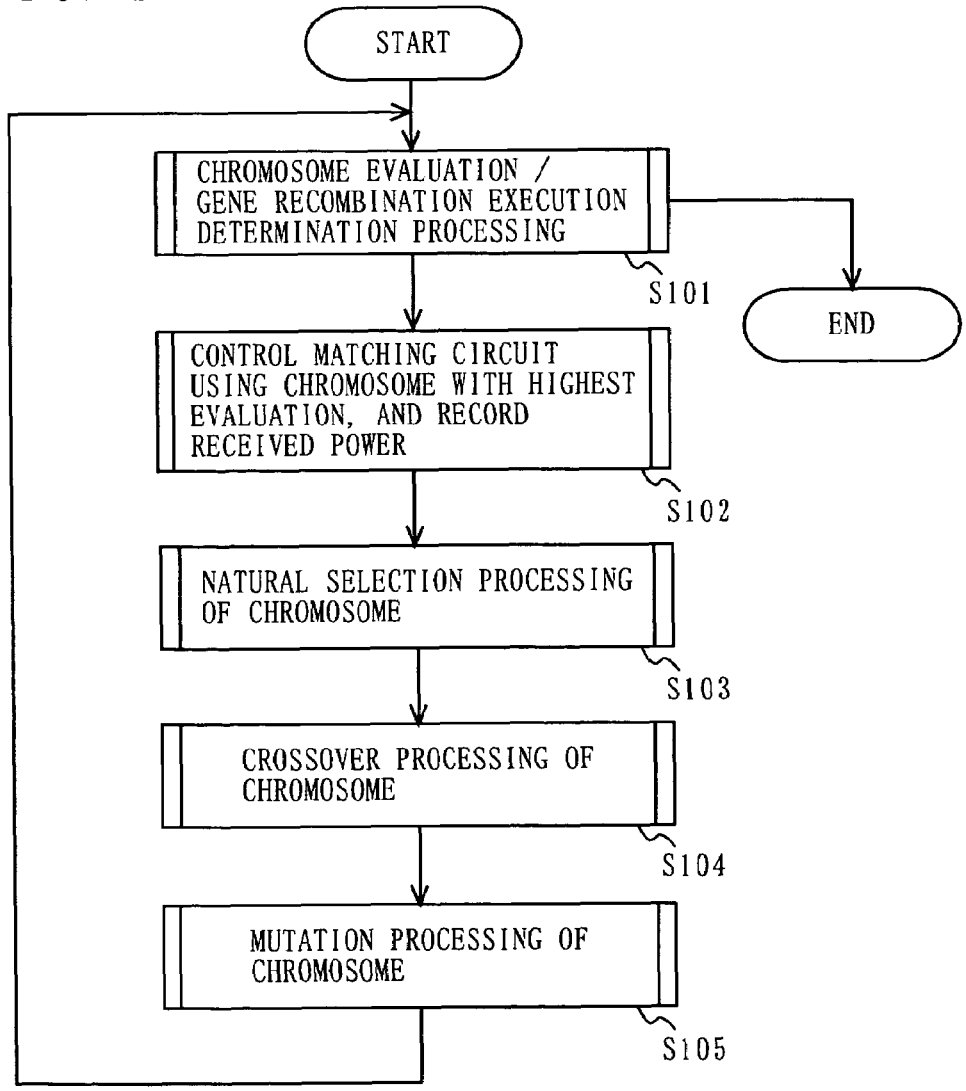
FIG. 3 is a diagram illustrating an example of a use situation initial chromosome table.
FIG. 4 is a flow chart illustrating operation of a control section 105 in accordance with the first embodiment.

FIG. 3 is a diagram illustrating an example of the use situation initial chromosome table. As the typical use situation of the mobile radio apparatus 1, there are, for example, a situation when there is the mobile phone in a free space apart from a human body, a situation when the mobile phone is used during call, and a situation when using an E-mail function of the mobile phone. In FIG. 3, the initial chromosomes A(1), A(2), and A(3) are defined corresponding to these use situations.

In order to match an impedance between the antenna 101 and the signal processing section 104 in the free space, it is assumed that the varactor voltages 206 and 207 must be 0 [V], respectively. In this case, the initial chromosome A(1) will be "0000 0000 0000 0000".

When the mobile radio apparatus 1 is used in a situation of a call posture, in order to match the impedance between the antenna 101 and the signal processing section 104, it is expected that the varactor voltage 206 must be 1.2 [V], and the varactor voltage 207 must be 2 [V]. In this case, the initial chromosome A(2) will be "0000 1100 0001 0100".

When the mobile radio apparatus 1 is used in a situation of an E-mail posture, in order to match the impedance between the antenna 101 and the signal processing section 104, it is expected that the varactor voltage 206 must be 0.5 [V], and the varactor voltage 207 must be 1.5 [V]. In this case, the initial chromosome A(3) will be "0000 0101 0000 1111".

The storage section 106 has a writable area, corresponding to the chromosome used for controlling the matching circuit 102, for storing a received power when using this chromosome. A table stored in this area will be called a chromosome received power table. It is assumed that an array for indicating the chromosome received power table is B(i).

The storage section 106 has a writable area, corresponding to the chromosome after natural selection, for storing the received power when using this chromosome. A table stored in this area will be called a chromosome received power table after natural selection. It is assumed that an array for indicating the chromosome received power table after natural selection is $C(i)$.

The storage section 106 has a writable area for storing the chromosome after the crossover. A table stored in this area will be called a chromosome table after crossover. It is assumed that an array for indicating the chromosome table after crossover is $D(i)$.

The storage section 106 has a writable area for storing the chromosome after the mutation. A table stored in this area will be called a chromosome table after mutation. It is assumed that an array for indicating the chromosome table after mutation is $E(i)$.

Incidentally, the areas for storing the aforementioned tables may be partially overlapped with each other, or may be overwritten with the overlapped area. Moreover, each table may be overwritten for every generation, or may newly be created for every generation.

A method of the crossover will be described taking a case where a chromosome Xa "0000 1100 0001 0100" and a chromosome Ya "0000 0101 0000 1111" are crossed over as an example. When the chromosomes are crossed over, the genes are partially exchanged. For example, by exchanging "**** *100 ** 0100" in the chromosome Xa "0000 1100 0001 0100" and "** *101 **** 1111" in the chromosome Ya "0000 0101 0000 1111", the crossover is performed, so that "0000 1101 0001 1111" is produced as a chromosome Xb, and "0000 0100 0000 0100" is produced as a chromosome Yb. Incidentally, a position of the exchange is chosen at random. A chromosome to be a target of the crossover is called a parent chromosome.

In the mutation, a gene chosen at random is reversed, such as "1" to "0", or "0" to "1". For example, supposing that a chromosome Xc "0000 1101 0001 1111" is mutated. At this time, as shown in "**   #*", supposing that a gene in a position of "#" is reversed. Thus, the chromosome Xc results in a chromosome Xd "0000 1101 0001 0111". One gene in one position or a plurality of genes in a plurality of positions may be reversed, and it will be determined at random. For example, as shown in "**#* **#* ** #*", supposing that genes in positions of "#" are reversed. Thus, the chromosome Xd is mutated, resulting in a chromosome Xe "0010 1111 0001 1111".

Next, the operation of the mobile radio apparatus 1 in accordance with the first embodiment will be described.

First, as a precondition, supposing that the signal strength detecting section 103 always detect the received power, and always transmit the detected received power to the control section 105. The control section 105 averages the received power transmitted from the signal strength detecting section 103. Hereafter, when it is simply called the received power, it means the received power averaged by the control section 105.

For example, it is assumed that the antenna 101 and the signal processing section 104 are matched in a free space at the beginning. Let the received power at that time be a received power RSSIA in matching. It is supposed that the antenna 101 closes to a human body after that, and the received power is changed from the received power RSSIA in matching to RSSIB (hereinafter, referred to as received power RSSIB in change) to be a small value (this situation is called a first human body proximity state). Note herein that, the received power assumed first is not limited to this.

The control section 105 always determines whether or not the received power transmitted from the signal strength detecting section 103 became small. As described above, when the received power is changed from the received power RSSIA in matching to the received power RSSIB in change, the control section 105 acquires chromosomes corresponding to the varactor voltages 206 and 207, which can further increase the received power, with a genetic algorithm, and controls the matching circuit 102 based on the acquired chromosomes.

FIG. 4 is a flow chart illustrating operation of the control section 105 in accordance with the first embodiment. Hereafter, the operation of the control section 105 will be described with reference to FIG. 4. The operation shown in FIG. 4 is triggered by the received power detected by the signal strength detecting section 103 being reduced. Note herein that, the operation shown in FIG. 4 may be triggered by the received power detected by the signal strength detecting section 103 being smaller than a threshold. Moreover, the operation shown in FIG. 4 may be started when the received power becomes small in more than a certain constant width.

First, at Step S101 in a first generation, the control section 105 controls the matching circuit 102 using all the chromosomes defined in the use situation initial chromosome table with reference to the use situation initial chromosome table stored in the storage section 106, and determines whether or not there is a chromosome which can provide an appropriate received power. When using all the chromosomes defined in the use situation initial chromosome table, the control section 105 stores the received power obtained from the signal strength detecting section 103, and the used chromosome in the storage section 106 in association with each other. If there is the appropriate chromosome, the control section 105 completes the processing. Meanwhile, if there is no appropriate chromosome, the control section 105 proceeds to the operation after Step S102 to then perform natural selection, crossover, and mutation of the chromosome to thereby recombine genes. Since the processing at Step S101 is a processing for determining whether or not evaluation of the chromosome and gene recombination are to be performed, it is called a determining processing for chromosome evaluation/gene recombination execution.

Next, at Step S102, the control section 105 applies a bias voltage corresponding to a chromosome which has obtained the highest evaluation at Step S101 (received power), to the matching circuit 102, and stores the received power obtained from the signal strength detecting section 103 and the used chromosome in the storage section 106 in association with each other.

The chromosome received power table will be completed by the operations at Steps S101 and S102. FIG. 5 is a diagram illustrating an example of the chromosome received power table. As shown in FIG. 5, in the chromosome received power table, the chromosome and the received power are registered in association with each other. The chromosome received power table shown in FIG. 5 is a table created in the first generation. Since the chromosomes B(2), B(3), and B(4) are the chromosomes registered at Step S101, they are the same as the initial chromosomes A(1), A(2), and A(3). The chromosome B(1) is the chromosome registered at Step S102, and serves as a chromosome which could obtain the highest received power among the initial chromosomes A(1), A(2), and A(3). Here, it is assumed that the chromosome B(1) is the same as the initial chromosome A(1). Hence, the received powers RSSI1 and RSSI2 have the same value. It is supposed that the received power corresponding to the chromosome B(i) is RSSI(i).

The reason for controlling the matching circuit using the chromosome with the highest received power at Step S102 is to obtain the highest received power at a present stage for the time being. Meanwhile, the reason for the chromosome with the highest received power to be stored in the storage section 106 at Step S102 is to increase the probability of having a superior chromosome as an ancestor in the case of gene recombination.

Next, at Step S103, the control section 105 naturally selects the chromosomes by selecting a chromosome considered to have high evaluation to some extent among the chromosomes registered in the chromosome received power table. The control section 105 stores the chromosome after natural selection, and the received power when using it in the storage section 106, and creates the chromosome received power table after natural selection.

FIG. 6 is a diagram illustrating an example of the chromosome received power table after natural selection. As can be seen from comparing FIG. 5 with FIG. 6, by the natural selection at Step S103, the chromosomes B(2) and B(4) in the chromosome received power table are selected once, the chromosome B(3) is selected twice, and the chromosomes C(1), C(2), C(3), and C(4) are registered in the chromosome received power table after natural selection.

Next, at Step S104, the control section 105 crosses over the chromosomes registered in the chromosome received power table after natural selection, and registers the chromosomes after the crossover as the chromosome table after crossover.

FIG. 7 is a diagram illustrating an example of the chromosome table after crossover. As can be seen from comparing FIG. 6 with FIG. 7, the chromosome C(1) and the chromosome C(4) are crossed over by the crossover at Step S104, and the chromosome D(1) and the chromosome D(4) are registered in the chromosome table after crossover by parts of the genes being exchanged. Incidentally, the chromosome C(2) and the chromosome C(3) are registered in the chromosome table after crossover as the chromosomes D(2) and D(3) as they are, without being crossed over.

Next, at Step S105, the control section 105 mutates the chromosome registered in the chromosome table after crossover, and registers the chromosome after the mutation as a chromosome table after mutation.

FIG. 8 is a diagram illustrating an example of the chromosome table after mutation. As can be seen from comparing FIG. 7 with FIG. 8, by the mutation at Step S105, the chromosomes D(1), D(2), and D(4) are mutated and are registered as the chromosomes E(1), E(2), and E(4). Incidentally, the chromosome D(3) is registered as the chromosome E(3) as it is, without being mutated.

After Step S105, the control section 105 returns to the operation at Step S101 to perform the processing after second generation. In the processing after the second generation, at Step S101, the control section 105 controls the matching circuit 102 not using the chromosome registered in the use situation initial chromosome table, but using all the chromosomes registered in the chromosome table after mutation obtained at Step S105, and determines whether or not there is a chromosome which can provide the appropriate received power. Also at Step S102 after the second generation, the control section 105 stores the received power obtained from the signal strength detecting section 103, and the used chromosome in the storage section 106 in association with each other. If there is the appropriate chromosome, the control section 105 completes the processing. Meanwhile, if there is no appropriate chromosome, the control section 105 proceeds to operation at Step S102.

At Step S102 after the second generation, the control section 105 applies the bias voltage corresponding to the chromosome which has obtained the highest evaluation at Step S101 to the matching circuit 102, and stores the received power obtained from the signal strength detecting section 103, and the used chromosome in the storage section 106 in association with each other.

The chromosome received power table after the second generation will be completed by the operations at Steps S101 and S102. FIG. 9 is a diagram illustrating an example of the chromosome received power table after the second generation. As shown in FIG. 9, the chromosomes B(2), B(3), B(4), and B(5) are the chromosomes registered at Step S101, and are the same as the chromosomes E(1), E(2), E(3), and E(4) in the chromosome table after mutation. The chromosome B(1) is the chromosome registered at Step S102, and the chromosome which could obtain the highest received power among the chromosomes E(1), E(2), E(3), and E(4). Herein, it is supposed that the chromosome B(1) is the same as the chromosome E(2) and the chromosome B(3). Hence, received powers RSSI5 and RSSI7 have the same value.

Next, at Step S103 after the second generation, the control section 105 naturally selects the chromosomes registered in the chromosome received power table, selects a chromosome considered to have a high evaluation to some extent, and generates the chromosome received power table after natural selection. The number of the chromosomes to be selected may be the same as that in the first generation, and may be different from that.

Next, at Step S104 after the second generation, the control section 105 crosses over the chromosomes registered in the chromosome received power table after natural selection, and registers the chromosome after the crossover in the chromosome table after crossover.

Next, at Step S105 after the second generation, the control section 105 mutates the chromosome registered in the chromosome table after crossover, and registers the chromosome after the mutation in the chromosome table after mutation.

The control section 105 then returns to the operation at Step S101 to evaluate the received power using the chromosome registered in the chromosome table after mutation, and if there is an appropriate chromosome, completes the processing, while, if there is no appropriate chromosome, it repeats the operation for generating a chromosome for the next generation. Since this appropriate chromosome is of the information on the load value from which the impedance matching is obtained by the matching circuit 102, it is called the matched load value information. At Step S101, when determining that it exceeds a predetermined generation number, the control section 105 controls the matching circuit 102 using the chromosome with the highest evaluation among the chromosomes currently obtained to then complete the procedure.

Figure 10:
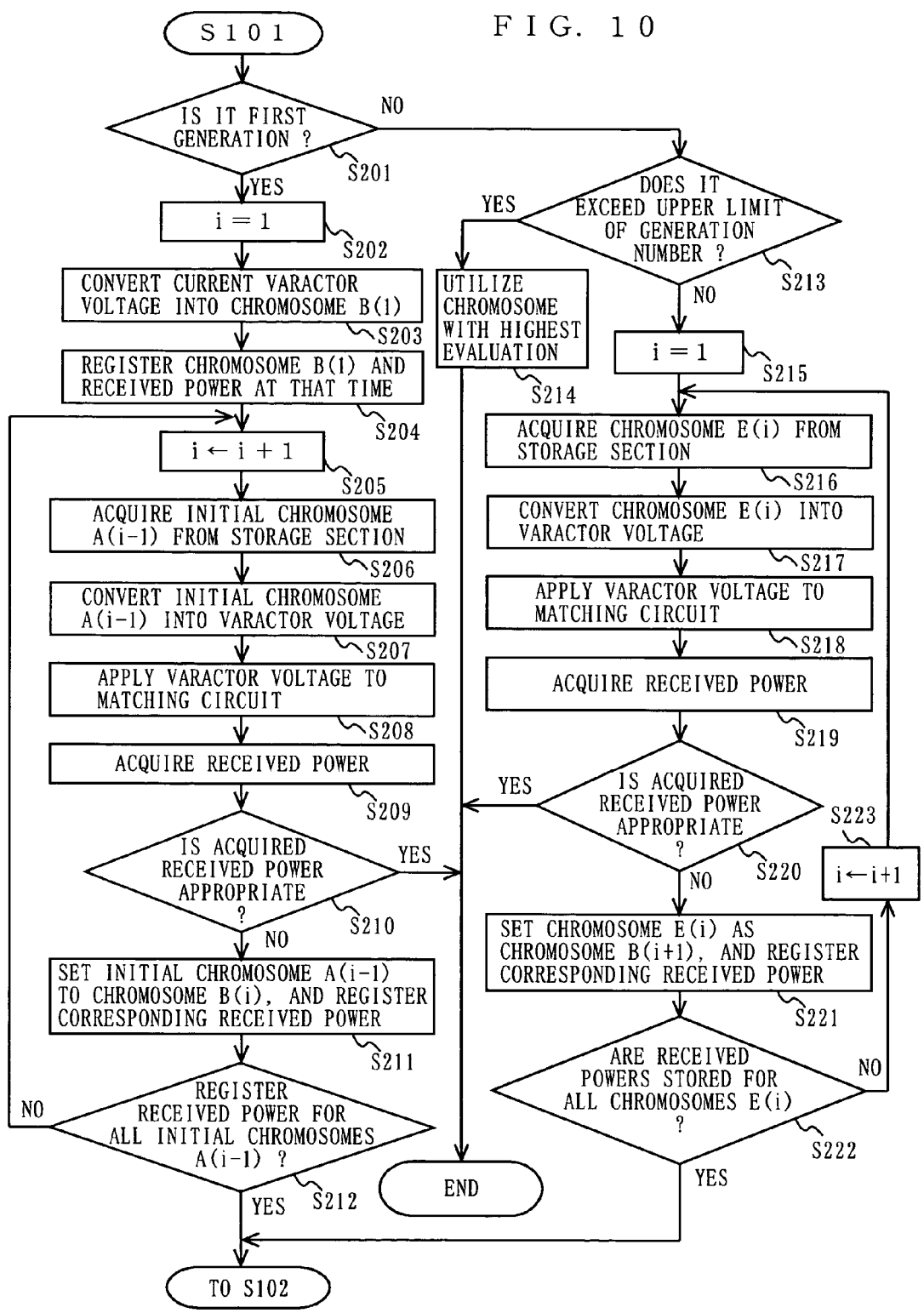
FIG. 10 is a flow chart illustrating details of the operation of the control section 105 at Step S101.

FIG. 10 is a flow chart illustrating details of the operation of the control section 105 at Step S101. Hereafter, the operation of the control section 105 at Step S101 will be described with reference to FIG. 10.

First, the control section 105 determines whether or not the chromosome is the first generation (Step S201). Incidentally, the generation number is managed by being stored in the storage section 106 whenever the chromosome changes the generation. If the chromosome is the first generation, the control section 105 initializes as i=1 (Step S202). If the chromosome is not the first generation, the control section 105 proceeds to operation at Step S213.

After Step S202, the control section 105 converts the currently provided varactor voltage into the chromosome to the matching circuit 102, and sets the obtained chromosome to the chromosome B(1) (Step S203). Next, the control section 105 obtains the received power when using the chromosome B(1) from the signal strength detecting section 103, and registers it in the chromosome received power table in association with the chromosome B(1) (Step S204). Incidentally, at Step S204, when the chromosome and the received power are newly registered into the chromosome received power table, the control section 105 is to clear the old chromosome received power table prior to it. However, if the chromosome received power table is managed so that the generation number may be identified, it is not necessary to clear the chromosome received power table at Step S204.

Next, the control section 105 increments i by 1 (Step S205), and acquires the initial chromosome A(i−1) from the use situation initial chromosome table in the storage section 106 (Step S206). Next, the control section 105 converts the acquired initial chromosome A(i−1) into the varactor voltage (Step S207), and applies this varactor voltage to the matching circuit 102 (Step S208).

Next, the control section 105 acquires the received power from the signal strength detecting section 103 (Step S209), and determines whether or not the acquired received power is the appropriate received power (Step S210).

At Step S210, for example, if the received power acquired at Step S209 is equal to the received power RSSIA in matching or more, the control section 105 determines that the received power acquired at Step S209 is appropriate. In addition to that, the control section 105 may determine whether or not the received power acquired at Step S209 is appropriate using the following judgment criteria. For example, if the received power acquired at Step S209 is larger than the received power RSSIA at the time of change by a predetermined amount, the control section 105 may determine that the received power acquired at Step S209 is appropriate. Moreover, if the received power acquired at Step S209 is larger than a certain predetermined threshold, the control section 105 may determine that the received power acquired at Step S209 is appropriate. The judgment criterion at Step S210 is not limited to the aforementioned judgment criterion.

If it is determined at Step S210 that the received power is appropriate, the control section 105 completes the processing, and continues applying the varactor voltage which can provide this received power, to the matching circuit 102. Meanwhile, if it is determined that the received power is not appropriate, the control section 105 proceeds to operation at Step S211.

At Step S211, the control section 105 stores the initial chromosome A(i−1) as the chromosome B(i) in the storage section 106 along with the received power corresponding to the initial chromosome A(i−1), and registers it in the chromosome received power table.

After Step S211, the control section 105 determines whether or not the received power is stored for all initial chromosomes A (i−1). If it is not stored, the control section 105 returns to the operation at Step S205. If it is stored, the control section 105 proceeds to operation at Step S102. Thus, in the first generation, the chromosome corresponding to the original varactor voltage when the operation at Step S101 is just started is registered as the chromosome B(1), and all initial chromosomes A(i) are registered as chromosomes B(i+1) in association with the received power.

At Steps S206 through S212, the control section 105 evaluates the initial chromosome (initial load value information) stored in the storage section 106, and if there is an initial chromosome (initial load value information) for providing the impedance matching, applies the varactor voltage corresponding to this initial chromosome (initial load value information) to the matching circuit 102 so that the matching circuit 102 may have the load value corresponding to this initial chromosome (initial load value information). The processing at Steps S206 through S212 is called the initial control processing.

At Step S213, the control section 105 determines whether or not it exceeds the upper limit of the generation number if it exceeds the upper limit of the generation number, the control section 105 controls the matching circuit 102 using the chromosome that obtains the largest received power with reference to the chromosome received power table (Step S214), and completes the process. Incidentally, at Step S102, since the control section 105 controls the matching circuit 102 using the chromosome with the highest evaluation, the operation at Step S214 is not indispensable.

Meanwhile, at Step S213, if it does not exceed the upper limit of the generation number, the control section 105 proceeds to operation at Step S215 to initialize as i=1.

After Step S215, the control section 105 acquires the chromosome E(i) with reference to the chromosome table after mutation stored in the storage section 106 (Step S216). Next, the control section 105 converts the chromosome E(i) into the varactor voltage (Step S217), and applies this varactor voltage to the matching circuit 102 (Step S218).

Next, the control section 105 acquires the received power from the signal strength detecting section 103 (Step S219), and determines whether or not the acquired received power is appropriate (Step S220). The concrete judgment criterion at Step S220 is similar to that at Step S210. If the received power is appropriate, the control section 105 continues applying the varactor voltage which can provide this received power, to the matching circuit 102. Since the chromosome corresponding to the varactor voltage which can provide the appropriate received power is of the information on the load value of the matching circuit 102 from which the impedance matching is obtained, it is called the matched load value information. Meanwhile, if it is determined that the received power is not appropriate, the control section 105 proceeds to operation at Step S221.

At Step S221, the control section 105 sets the chromosome E(i) as the chromosome B(i+1), causes the storage section 106 to store the corresponding received power, and registers it in the chromosome received power table. Next, the control section 105 determines whether or not the received power is stored for all the chromosomes E(i) (Step S222). If the received power is stored for all the chromosomes E(i), the control section 105 proceeds to operation at Step S102. Meanwhile, if the received power is not stored for all the chromosomes E(i), the control section 105 increments i by 1 (Step S223), and returns to the operation at Step S216. Thus, in the second generation or subsequent ones, the chromosome E(i) registered in the chromosome table after mutation is registered as the chromosome B(i+1) in association with the received power. Incidentally, at Step S222, when the chromosome and the received power are newly registered into the chromosome received power table, the control section 105 is to clear the old chromosome received power table prior to it. However, if the chromosome received power table is managed so that the generation number may be identified, it is not necessary to clear the chromosome received power table at Step S222.

Figure 11:
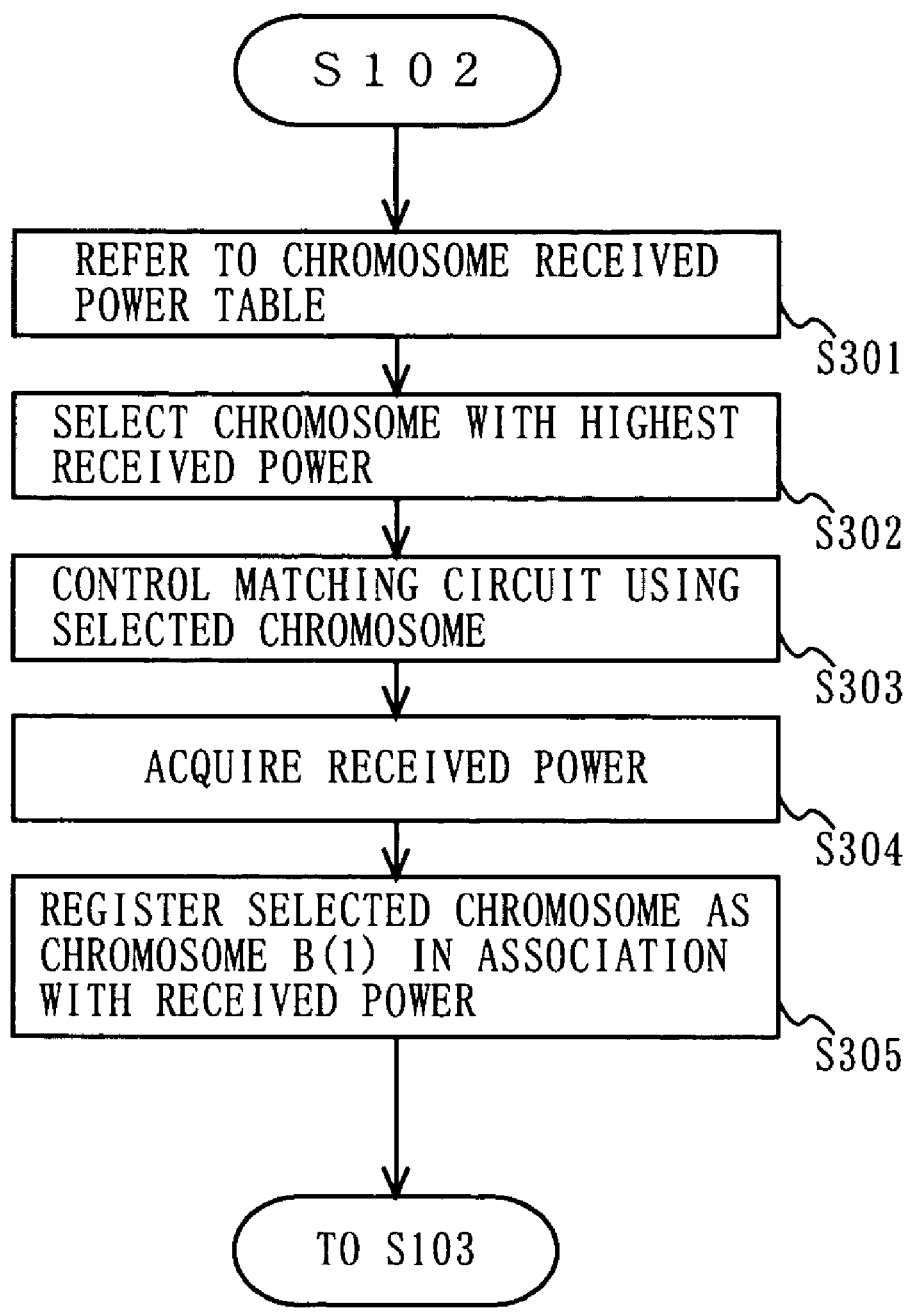
FIG. 11 is a flow chart illustrating the detailed operation of the control section 105 at Step S102 in FIG. 4.

FIG. 11 is a flow chart illustrating the detailed operation of the control section 105 at Step S102 in FIG. 4. Hereafter, the detailed operation of the control section 105 at Step S102 in FIG. 4 will be described with reference to FIG. 11.

First, the control section 105 refers to the chromosome received power table (Step S301). Next, the control section 105 selects a chromosome with the highest received power among the chromosomes registered in the chromosome received power table (Step S302). Next, the control section 105 controls the matching circuit using the selected chromosome (Step S303), and acquires the received power (Step S304). Next, the control section 105 registers the selected chromosome as the chromosome B(1) in the chromosome received power table, in association with this received power (Step S305), and proceeds to operation at Step S103. As a result of this, a chromosome with the highest received power among the chromosomes included in the chromosome received power table generated at Step S101 will certainly be registered as the chromosome B(1). Note herein that, in the first generation, the chromosome B(1) has been the received power corresponding to the chromosome at the time when Step S101 has started in a stage at Step S101. Additionally, in the second generation or subsequent ones, the chromosome B(1) has been empty in a stage at Step S101.

Figure 12:
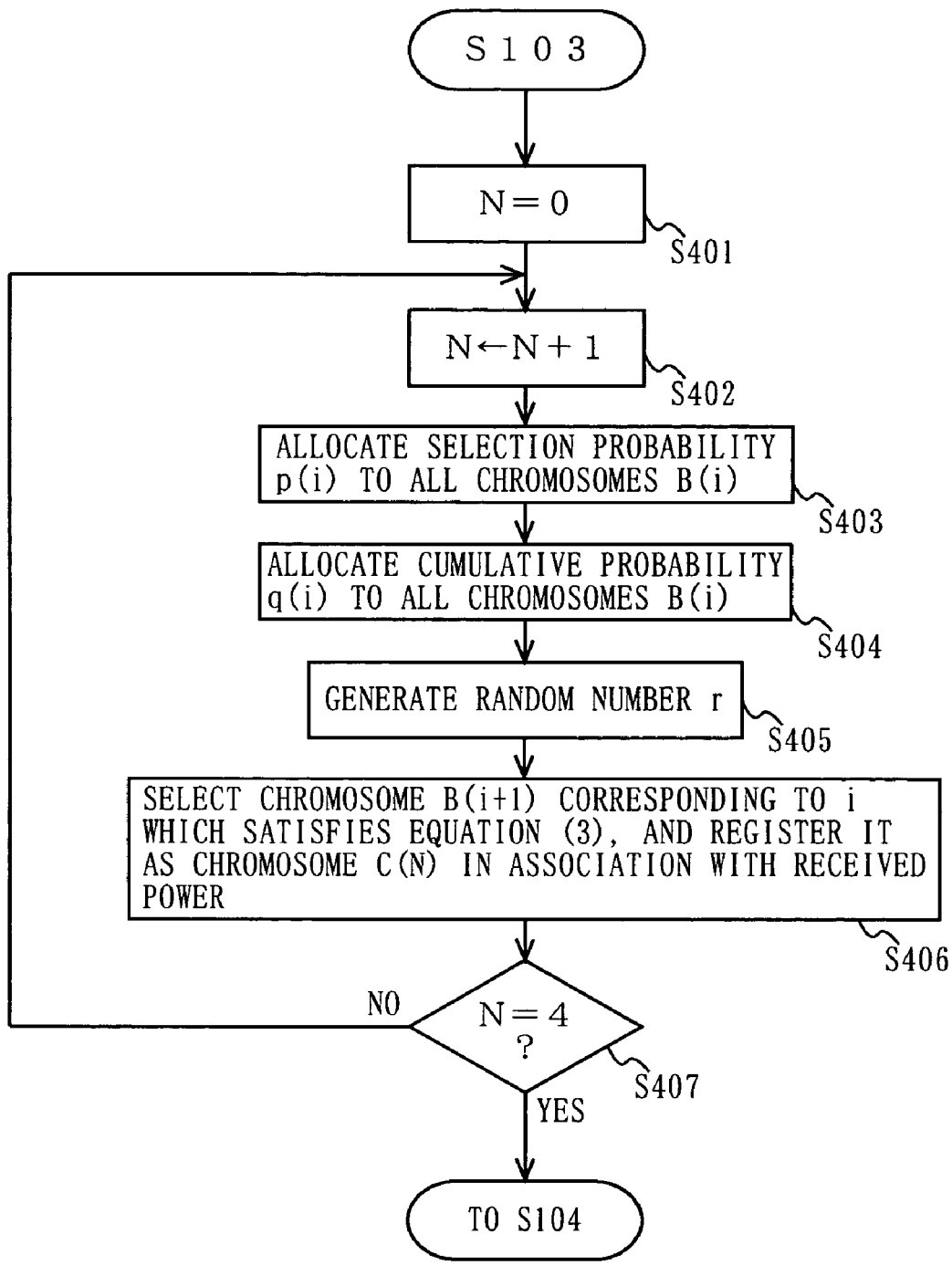
FIG. 12 is a flow chart illustrating the detailed operation of the control section 105 at Step S103 in FIG. 4.

FIG. 12 is a flow chart illustrating the detailed operation of the control section 105 at Step S103 in FIG. 4. Hereafter, the detailed operation of the control section 105 at Step S103 in FIG. 4 will be described with reference to FIG. 12.

First, the control section 105 initializes as N=0 (Step S401). Here, N is a value for counting how many chromosomes have been chosen by natural selection.

Next, the control section 105 increments N by 1 (Step S402), and allocates the selection probability p(j) represented by Equation (1) to all the chromosomes B(i) in the chromosome received power table (Step S403). Thus, for example, a selection probability q(1) will be allocated to the chromosome B(1), and a selection probability q(2) will be allocated to the chromosome B(2).

$$p(j) = \frac{RSSI(j)}{\sum_{i=0}^{Nc} RSSI(i)} \quad \text{(Equation 1)}$$

Where, Nc represents the number of chromosomes.

As represented in Equation (1), the higher the received power is, the higher the selection probability (adaptive value) becomes.

Next, the control section 105 allocates a cumulative probability q(i) represented by Equation (2) to all the chromosomes B(i) in the chromosome received power table (Step S404). Thus, for example, the cumulative probability q(1) will be allocated to the chromosome B(1), and the cumulative probability q(2) will be allocated to the chromosome B(2).

$$q(i) = \sum_{j=1}^{i} p(j) \quad \text{(Equation 2)}$$

By using Equation (1) and Equation (2), a probability that the chromosome with high received power is selected will be increased.

Next, the control section 105 generates a random number r (0<r<1) (Step S405).

Next, the control section 105 calculates for i which satisfies Equation (3) for the generated random number r, selects the chromosome B(i+1) corresponding to q(i+1), and registers the selected chromosome B(i+1) as a chromosome C(N) in the chromosome received power table after natural selection along with the received power corresponding to the selected chromosome B(i+1) (Step S406).

$$q(i)<r<q(i+1) \quad \text{(Equation 3)}$$

Next, the control section 105 determines whether or not N=4 (Step S407). Note herein that, N=4 is an upper limit number of the chromosome selected by natural selection, but this upper limit number is not limited to this. However, when the upper limit number is set other than N=4, the number of chromosomes registered in the chromosome received power table after natural selection accordingly changes, and the number of chromosomes registered in the chromosome table after crossover and the chromosome table after mutation further changes, so that the judgment criteria at below-mentioned Step S506, and below-mentioned Step S605 will change according to the number of registered chromosomes together with it.

At Step S407, if it is determined that it is not N=4, the control section 105 returns to the operation at Step S402 to perform the processing for registering the chromosome C(N) to N incremented by 1. Meanwhile, if it is determined that it is N=4, the control section 105 proceeds to operation at Step S104. Thereby, the chromosome received power table after natural selection will be completed.

Figure 13:
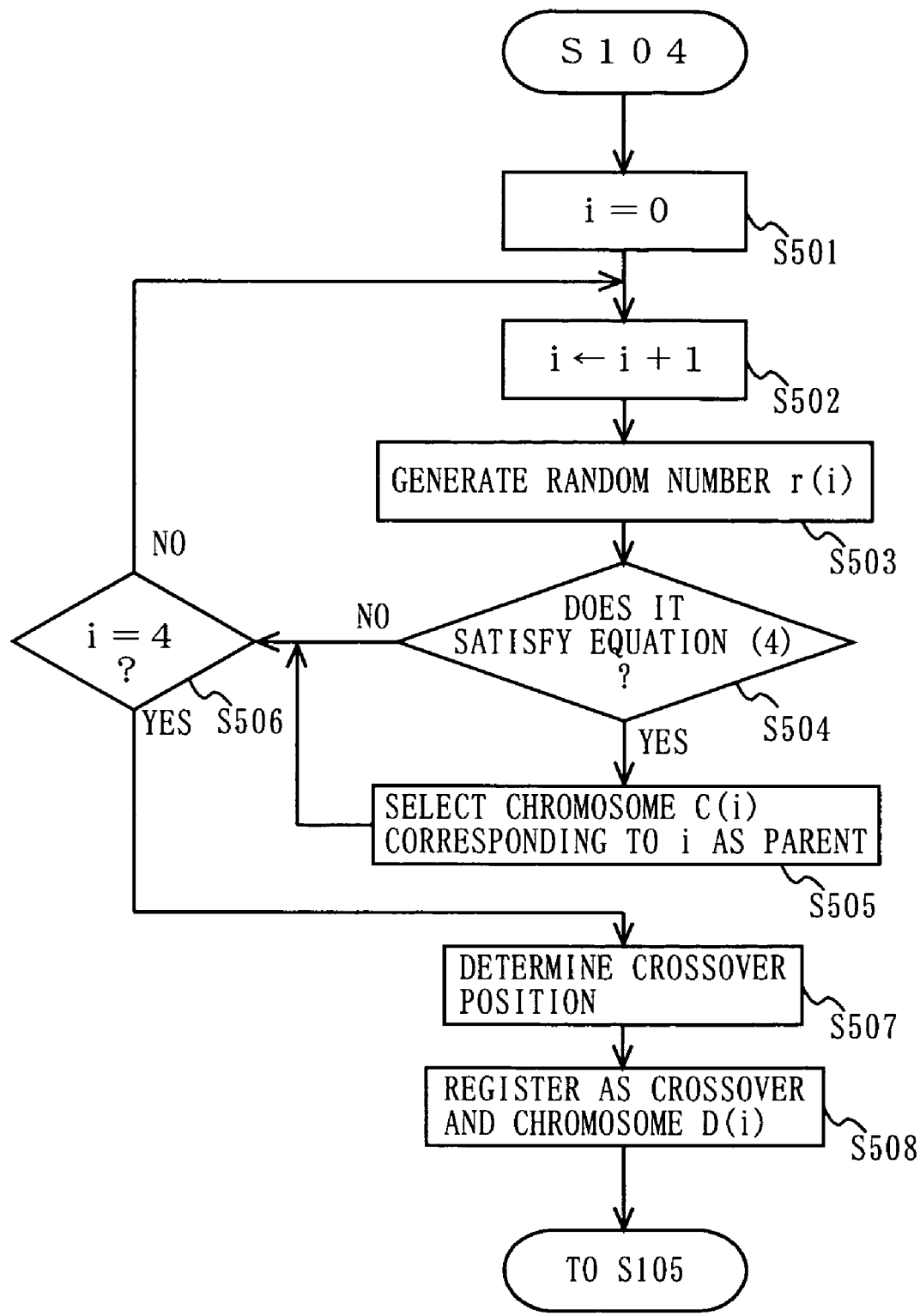
FIG. 13 is a flow chart illustrating the detailed operation of the control section 105 at Step S104 in FIG. 4.

FIG. 13 is a flow chart illustrating the detailed operation of the control section 105 at Step S104 in FIG. 4. Hereafter, the detailed operation of the control section 105 at Step S104 in FIG. 4 will be described with reference to FIG. 13.

First, the control section 105 initializes as i=0 (Step S501). Next, the control section 105 increments i by 1 (Step S502), and generates a random number r(i) (0<r(i)<1) (Step S503). Next, the control section 105 determines whether or not Equation (4) is satisfied (Step S504).

$$r(i)<pc \quad \text{(Equation 4)}$$

Where, pc is a crossover probability and is defined in advance.

If Equation (4) is satisfied, the control section 105 selects a chromosome C(i) corresponding to i as the parent from the chromosome received power table after natural selection (Step S505), and proceeds to operation at Step S506. Meanwhile, if Equation (4) is not satisfied, the control section 105 proceeds to operation at Step S506 as it is, without selecting the parent.

At Step S506, the control section 105 determines whether or not i=4. As described above, the condition of i=4 is a condition to be changed in accordance with the number of chromosomes registered in the chromosome received power table after natural selection.

If it is not i=4, the control section 105 returns to the operation at Step S502, and continues the parent selection. Meanwhile, if it is i=4, the control section 105 proceeds to operation at Step S507.

At Step S507, the control section 105 determines the crossover position at random. For example, the control section 105 generates a random number r(k) (1<=k<=16) for every bit (here, it may be 16 bits) of the chromosome, and determines whether or not the generated random number r(k) satisfies conditions of Equation (5).

$$r(k)<0.5 \quad \text{(Equation 5)}$$

If the conditions of Equation (5) are satisfied, the control section 105 determines a bit corresponding to k as the crossover position.

After Step S507, the control section 105 chooses two arbitrary chromosomes among the parent chromosomes selected at Step S505, and performs crossover by replacing the genes of the crossover positions determined at Step S507. The control section 105 registers the chromosome after the crossover and the chromosome without crossover as a chromosome D(i) in the chromosome table after crossover (Step S508), and proceeds to operation at Step S105. Incidentally, if the number of parent chromosomes selected at Step S505 is one, the control section 105 will not cross over the chromosomes selected as the parent. Meanwhile, if the number of parent chromosomes selected at Step S505 is odd, there are odd chromosomes to which the crossover is not performed although they are selected as the parents. Thereby, the chromosome table after crossover will be completed.

Figure 14:
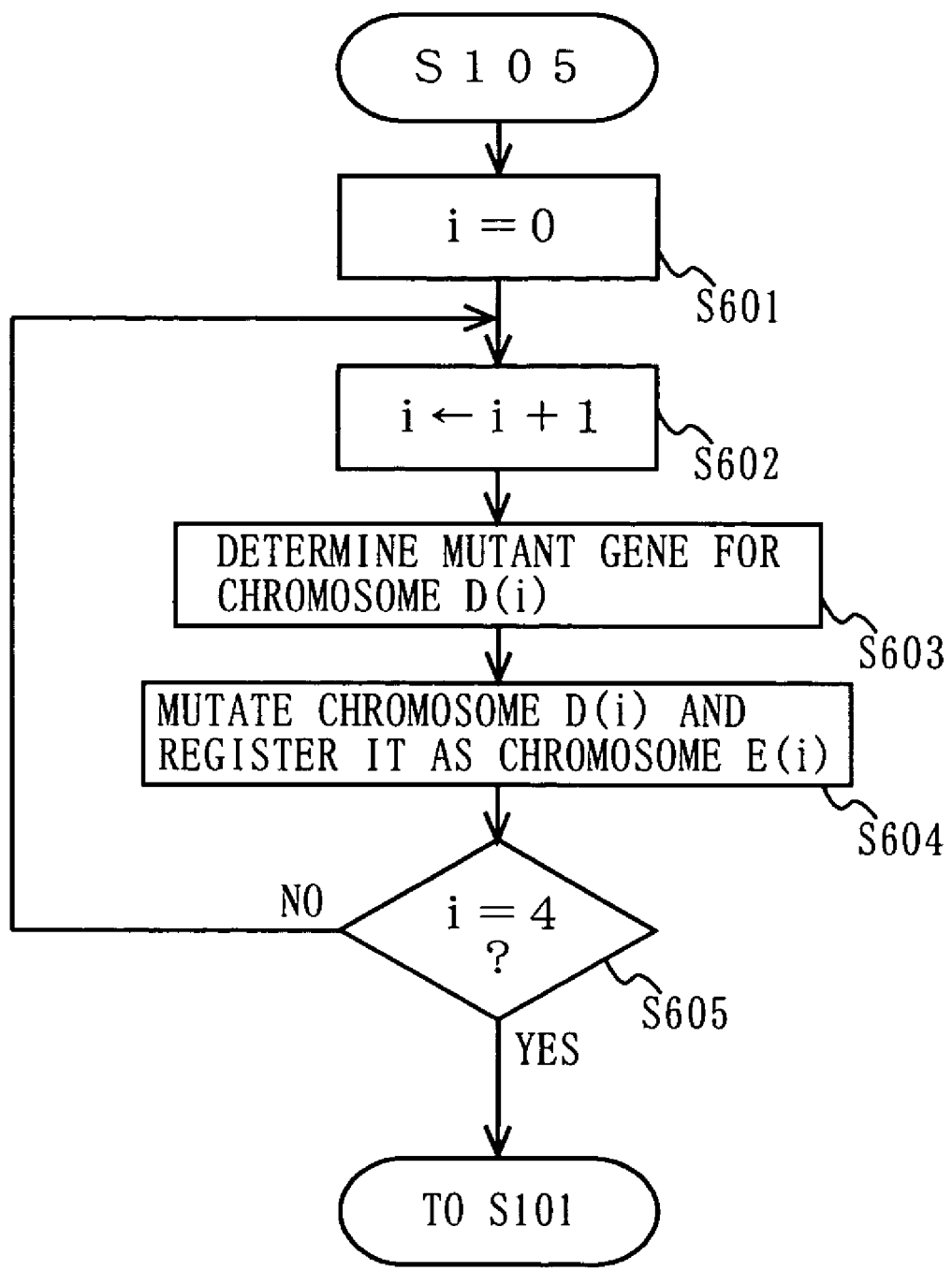
FIG. 14 is a flow chart illustrating the detailed operation of the control section 105 at Step S105 in FIG. 4.

FIG. 14 is a flow chart illustrating the detailed operation of the control section 105 at Step S105 in FIG. 4. Hereafter, the details of the operation of the control section 105 at Step S105 in FIG. 4 will be described with reference to FIG. 14.

First, the control section 105 initializes as i=0 (Step S601). Next, the control section 105 increments i by 1 (Step S602). Next, the control section 105 determines at random whether or not to mutate the chromosome D(i) in the chromosome table after crossover, and if it is mutated, determines the position of the gene to be mutated at random (Step S603). Specifically, the control section 105 generates a random number r(l) (1<=l<=16), and if the random number r(l) satisfies Equation (6), determines a bit corresponding to l as a position of the gene to be mutated.

$$r(l) < pm \tag{Equation 6}$$

Where, pm is a mutation probability and is defined in advance.

Next, the control section 105 reverses the gene at the determined position to perform mutation, and registers it as the chromosome E(i) in the chromosome table after mutation (Step S604). However, a gene C(i) which has not been mutated is registered as a gene E(i) as it is.

Subsequently, the control section 105 determines whether or not it is i=4 (Step S605). If it is not i=4, the control section 105 returns to the operation at Step S602, and performs mutation for the remaining genes D(i). Meanwhile, if it is i=4, it means that the chromosome table after mutation has been completed. The chromosome table after mutation will indicate a next generation gene. The control section 105 returns to the operation at Step S101, and proceeds to the processing of the next generation. Incidentally, as described above, the condition of i=4 is a condition to be changed in accordance with the number of chromosomes registered in the chromosome received power table after natural selection.

If there is no initial chromosome (initial load value information) for providing the impedance matching in the initial control processing, the control section 105, at Steps S101 through S105 after the second generation, evolves the initial chromosome (initial load value information) with a genetic algorithm, derives a chromosome (matched load value information) corresponding to the load value of the matching circuit 102 for providing the impedance matching, and controls the matching circuit 102 so as to have a load value corresponding to the derived chromosome. The processing at Steps S101 through S105 after the second generation will be called matched load value deriving processing.

For example, when changing from the situation where the impedance is matched in a free space to the first human body proximity state, a chromosome for indicating a varactor voltage which can provide the appropriate received power is generated, so that the impedance will be matched. Subsequently, when changing from the first human body proximity state to the situation in a free space, the control section 105 detects the change of the received power, performs the processing shown in FIG. 4, and generates a chromosome for indicating a varactor voltage which can provide the impedance matching between the antenna 101 and the signal processing section 104 to thereby match the impedance.

As is understood, according to the first embodiment, if the change of the received power is detected, the control section 105 first applies the varactor voltage to the matching circuit 102 using the chromosome stored in the use situation initial chromosome table. If there is an initial chromosome which can provide the appropriate received power, the control section 105 applies the varactor voltage corresponding to this initial chromosome to the matching circuit 102 to thereby match the impedance. Meanwhile, if there is no initial chromosome which can provide the appropriate received power, the control section 105 evolves the initial chromosome with a genetic algorithm, and operates so that the appropriate chromosome may be obtained. The control section 105 preferentially selects a chromosome with high received power among the initial chromosomes in the case of evolution of the initial chromosome. Hence, the initial chromosome can be evolved to the appropriate chromosome in a short time. Consequently, the impedance matching will be performed quickly. As a result of this, since the impedance can be always controlled adaptively in various environments where the antenna is placed, a loss due to a mismatching loss can be reduced, so that the mobile radio apparatus which can always obtain the stable received power will be provided.

Moreover, the mobile radio apparatus 1 can adaptively match the impedance only by storing only the chromosome corresponding to the use situation, thus making it possible to reduce the information to be stored.

Furthermore, the mobile radio apparatus 1 uses the averaged received power, thus making it possible to achieve the stable operation.

Figure 15:
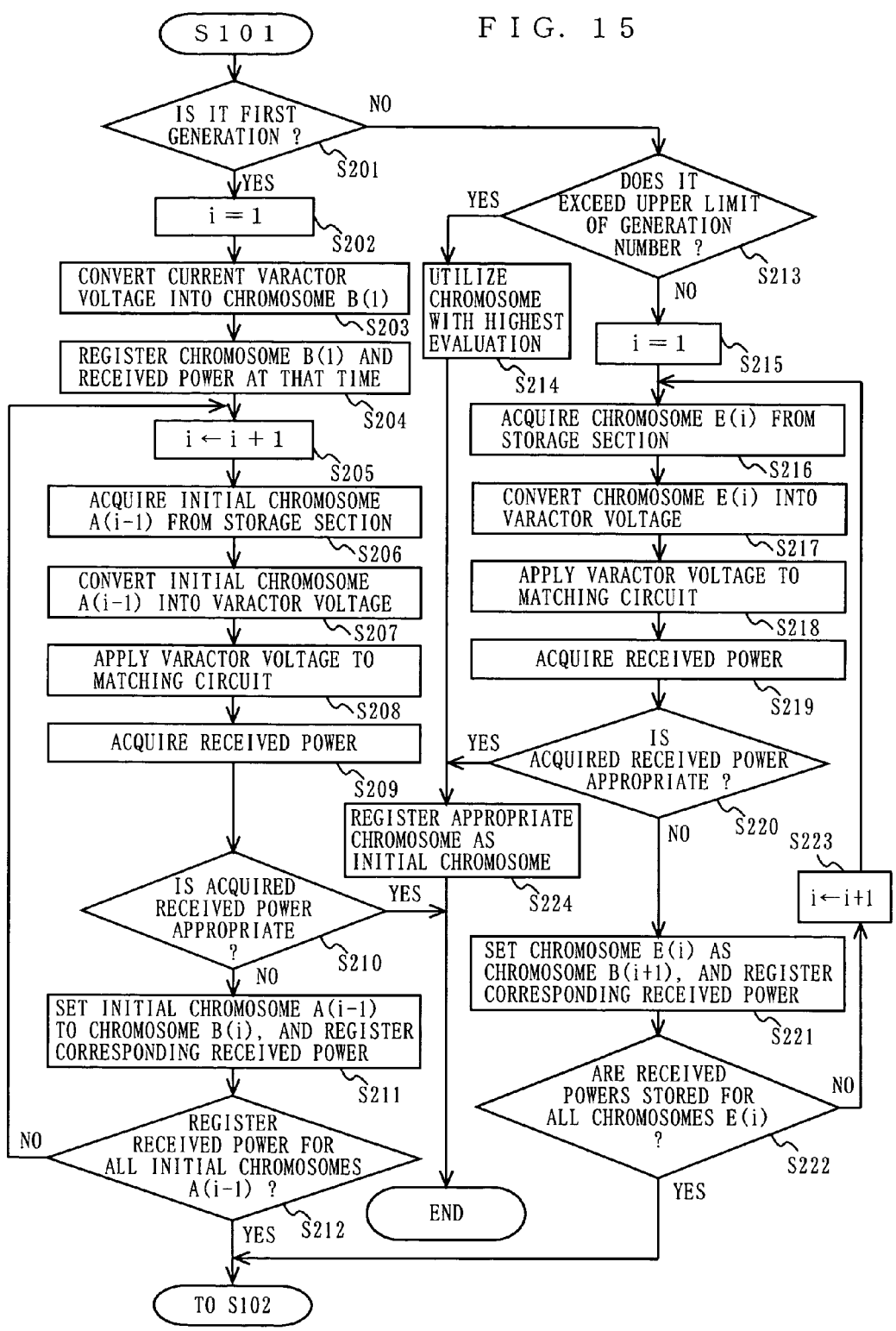
FIG. 15 is a flow chart illustrating the details of the operation at Step S101 in FIG. 4, where if an appropriate chromosome is found, this chromosome is registered in the initial chromosome table as the initial chromosome.

Note herein that, if the appropriate chromosome is found in the process of evolving the chromosome, the control section 105 may register the newly found chromosome as the initial chromosome (initial load value information) in the use situation initial chromosome table. Specifically, the control section 105 registers the chromosome used for control for the matching circuit 102 as the initial chromosome in the storage section 106 after Step S220 and/or S214 in FIG. 10. FIG. 15 is a flow chart illustrating the details of the operation at Step S101 in FIG. 4, where if an appropriate chromosome is found, this chromosome is registered in the initial chromosome table as the initial chromosome. FIG. 15 is different from FIG. 10 in that Step S224 which newly registers the initial chromosome in the use situation initial chromosome table is added. Incidentally, the control section 105 may set the use situation of the chromosome selected at Step S302 in the first generation as the use situation of the newly registered initial chromosome. The control section 105 may determine the varactor voltage for impedance matching also using the newly registered initial chromosome, at the processing in FIG. 4 which will be performed next time. As a result of this, chromosomes suitable for the user who uses the mobile radio apparatus 1 will be accumulated as the initial chromosome by repeating the evolution of the chromosome. Accordingly, as the processing by the control section 105 is repeated performed, the time for impedance matching will be reduced.

Note herein that, the genetic algorithm described in the first embodiment is only an example. The genetic algorithm used in the present invention is not limited to the aforementioned genetic algorithm.

SECOND EMBODIMENT

In a second embodiment, since the block configuration of the mobile radio apparatus is similar to that in the first embodiment, FIG. 1 will be employed. Additionally, since the block configuration of the matching circuit 102 is similar to that in the first embodiment, FIG. 2 will be employed.

In the second embodiment, the initial parameters for indicating the serial varactor voltage 206 and the parallel varactor voltage 207 are stored in the storage section 106 as the initial parameter table for use situation, in association with the use situation. FIG. 16 is a diagram illustrating an example of a use condition initial parameter table in a second embodiment. The initial parameter is the information on the load value of the matching circuit 102, and it corresponds to the use situation of the mobile radio apparatus, so that it is called the initial load value information.

FIG. 17 is a flow chart illustrating the operation of the control section 105 in accordance with the second embodiment. Hereafter, the operation of the control section 105 in the second embodiment will be described with reference to FIG. 17.

The operation shown in FIG. 17 is started at a timing similar to that in FIG. 4 according to the first embodiment.

First, at Step S701, the control section 105 acquires the received power when using the initial parameter registered in the initial parameter table for use situation, and determines whether or not there is a initial parameter having the appropriate received power. If there is such an initial parameter, the control section 105 controls the matching circuit 102 using this initial parameter to complete the processing. Meanwhile, if there is no such an initial parameter, the control section 105 proceeds to operation at Step S702. At Step S701, the control section 105 causes the storage section 106 to store the present varactor voltage and the current received power in association with each other, and also causes the storage section 106 to store the initial parameter and the received power in association with each other to thereby create a parameter received power table. FIG. 18 is a diagram illustrating an example of a parameter received power table.

At Step S702, the control section 105 selects a parameter with the largest received power among the parameters registered in the parameter received power table, and applies the varactor voltage corresponding to the selected parameter to the matching circuit 102 to then proceeds to operation at Step S703.

At Step S703, the control section 105 finely adjusts the load value of the matching circuit 102 by finely adjusting the varactor voltage with a steepest descent method using the parameter with the largest received power selected at Step S702 to thereby match the impedance, and then completes the process.

Figure 19:
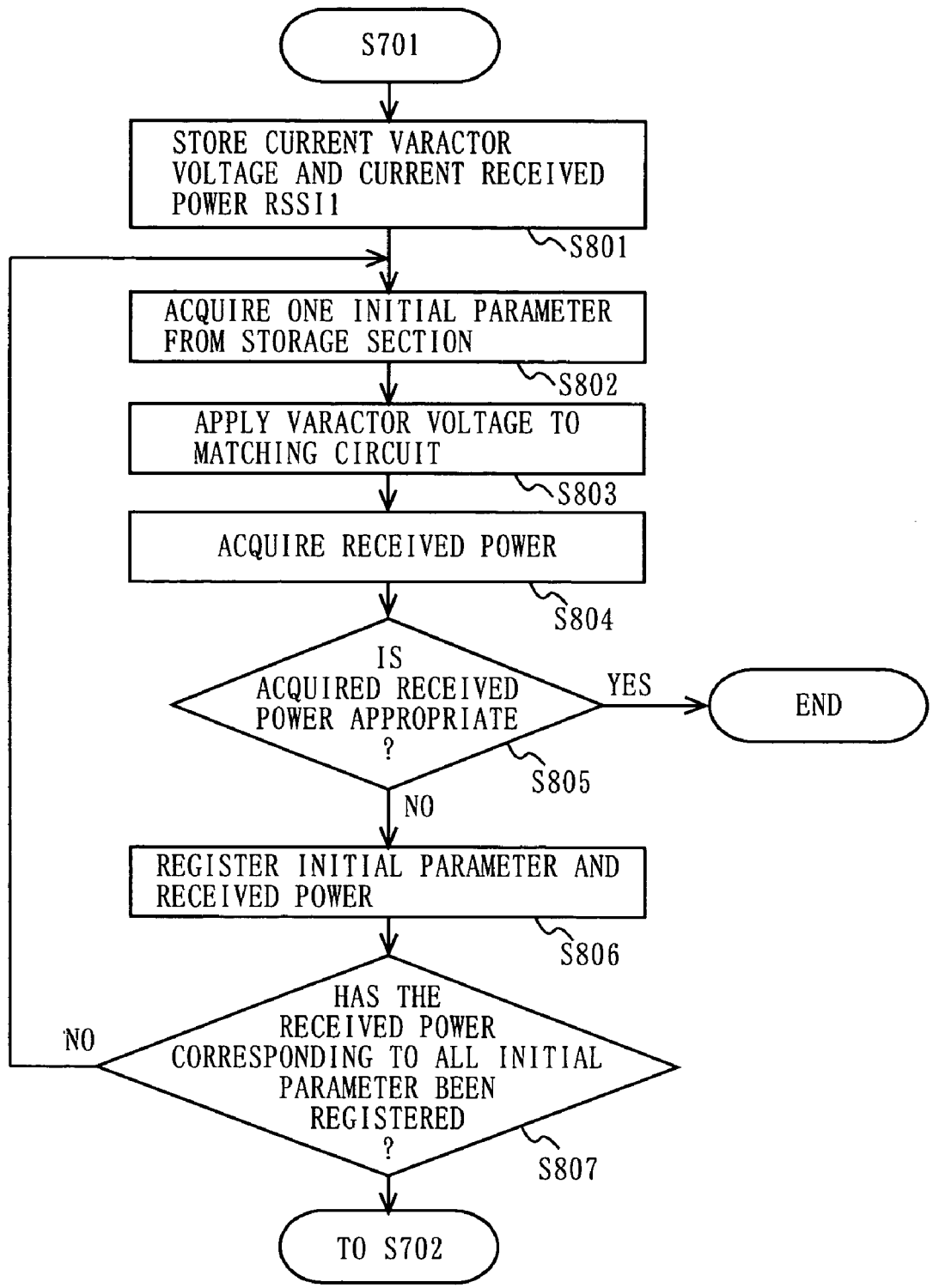
FIG. 19 is a flow chart illustrating details of the operation of the control section 105 at Step S701.

FIG. 19 is a flow chart illustrating details of the operation of the control section 105 at Step S701. Hereafter, the details of the operation of the control section 105 at Step S701 will be described with reference to FIG. 19.

First, the control section 105 registers the current varactor voltage and the current received power (hereafter, referred to as received power RSSI1) in the parameter received power table (Step S801). Next, the control section 105 acquires one initial parameter from the initial parameter table for use situation stored in the storage section 106 (Step S802), and applies the varactor voltage based on the acquired initial parameter to the matching circuit 102 (Step S803). Next, the control section 105 acquires the received power from the signal strength detecting section 103 (Step S804), and determines whether or not the acquired received power is appropriate (Step S805). The judgment criterion at Step S805 is similar to that at Step S210 in FIG. 10.

If the received power is appropriate, the control section 105 completes the processing. Meanwhile, if the received power is not appropriate, the control section 105 registers this initial parameter and the acquired received power in the parameter received power table in association with each other (Step S806), and proceeds to operation at Step S807.

At Step S807, the control section 105 determines whether or not the received power corresponding to all initial parameters is registered. If it is not registered, the control section 105 returns to the operation at Step S802. As a result of this, it is determined for all the initial parameters whether or not the appropriate received power can be obtained. Meanwhile, if it is registered, the control section 105 proceeds to operation at Step S702.

At Steps S801 through S807, the control section 105 evaluates the initial parameter (initial load value information) stored in the storage section 106, and if there is an initial parameter (initial load value information) for providing the impedance matching, applies the varactor voltage corresponding to this initial parameter (initial load value information) to the matching circuit 102 so that the matching circuit 102 may have the load value corresponding to this initial parameter (initial load value information). The processing at Steps S801 through S807 is called the initial control processing.

Figure 20:
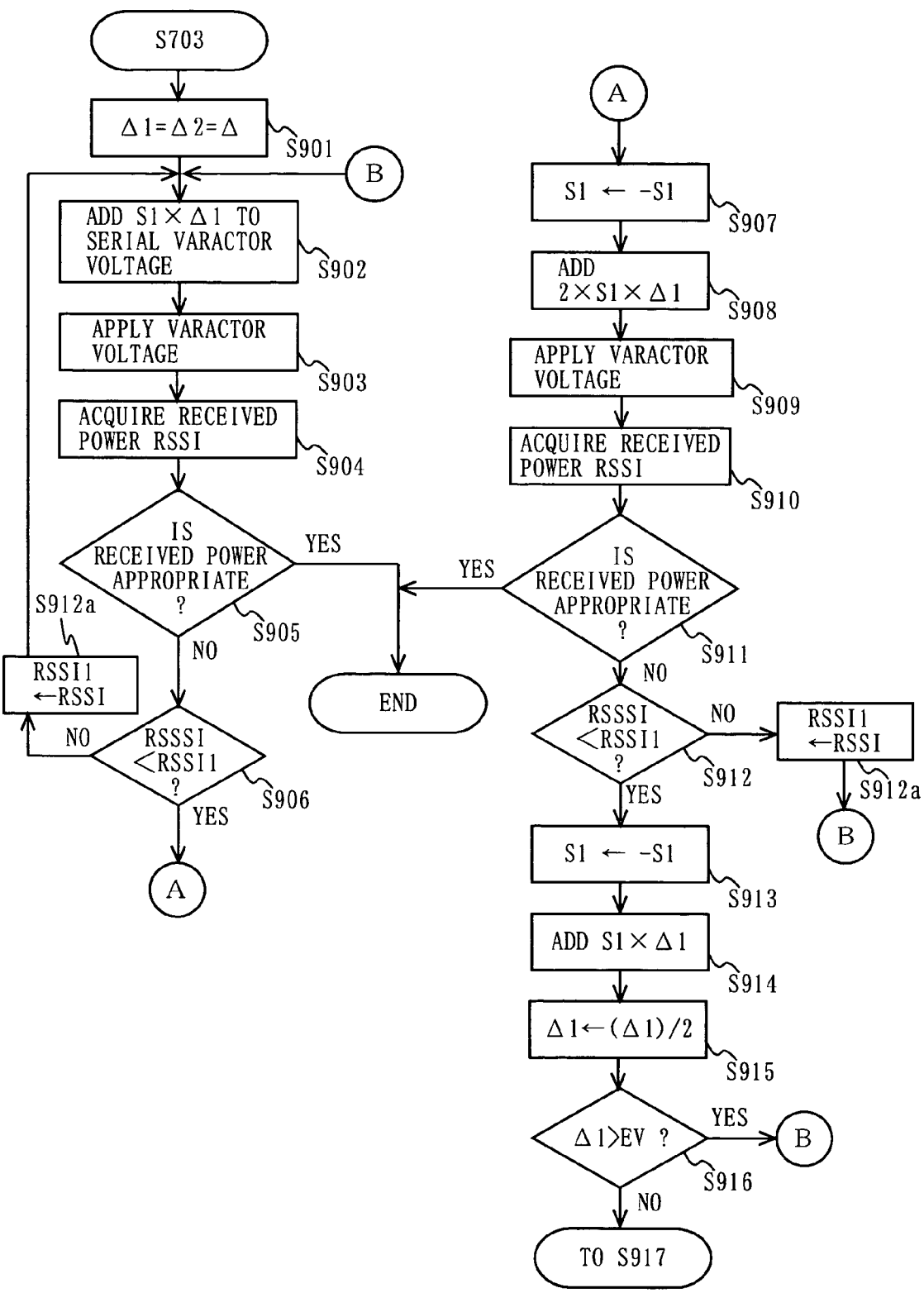
FIG. 20 is a flow chart illustrating a part of the operation of the control section 105 at Step S703.

FIG. 20 is a flow chart illustrating a part of the operation of the control section 105 at Step S703. Hereafter, a part of the operation of the control section 105 at Step S703 will be described with reference to FIG. 20. Note herein that, an initial variationΔ and an end value EV, which are required for performing control, are defined in advance. Meanwhile, the initial values of symbols S1 and S2 are 1 s.

First, the control section 105 substitutes the initial variationΔ to a variationΔ1 and a variationΔ2 (Step S901). Next, the control section 105 adds symbol S1×variationΔ1 to the serial varactor voltage indicated by the parameter with the highest evaluation selected at Step S702 (Step S902). Next, the control section 105 applies the serial varactor voltage obtained at Step S902 and the parallel varactor voltage indicated by the parameter selected at Step S702, to the serial varactor diode 203 and the parallel varactor diode 204 of the matching circuit 102, respectively (Step S903). Next, the control section 105 acquires the received power, and sets the acquired received power to RSSI (Step S904).

Next, the control section 105 determines whether or not the received power RSSI acquired at Step S904 is appropriate (Step S905). The judgment criterion at Step S905 is similar to that at Step S210 in FIG. 10. If the received power is appropriate, the control section 105 completes the processing. Since the varactor voltage, here, which can provide the appropriate received power is of the information on the load value of the matching circuit 102 from which the impedance matching is obtained, it is called the matched load value information. Meanwhile, if the received power is not appropriate, the control section 105 determines whether or not the received power RSSI is smaller than the received power RSSI1 (Step S906). According to the determination at Step S906, it is determined that changing the serial varactor voltage by the variationΔ1 will lead to increasing the received power.

If it is determined that RSSI is smaller than RSSI1 at Step S906, the control section 105 reverses symbol S1 (Step S907). Next, the control section 105 adds 2×symbol S1×variationΔ1 to the serial varactor voltage (Step S908). Thus, the serial varactor voltage will be changed to a direction reverse to that at Step S902. Next, the control section 105 applies the serial varactor voltage obtained at Step S908 and the parallel varactor voltage obtained at Step S702 to the matching circuit 102 (Step S909) to acquire the received power, and sets the acquired received power to RSSI (Step S910) to then proceed to operation at Step S911. However, if the serial varactor voltage obtained at Step S908 becomes a negative voltage, the control section 105 applies the voltage of 0 V to the matching circuit 102. Hereinafter, similarly, if the serial varactor voltage after change is negative, the voltage applied to the matching circuit 102 will be 0 V.

If it is determined at Step S906 that RSSI is not smaller than RSSI1, the control section 105 replaces the received power RSSI1 with the received power RSSI acquired at Step S904 (Step S906a), and returns to the operation at Step S902. Thus, a determination whether or not a higher received power can be obtained by further changing the serial varactor voltage is proceeded.

At Step S911, the control section 105 determines whether or not the received power RSSI acquired at Step S910 is appropriate. The judgment criterion at Step S911 is similar to that at Step S210 in FIG. 10. If it is determined that the received power is appropriate, the control section 105 completes the processing. The varactor voltage here is of the matched load value information. Meanwhile, if it is determined that the received power is not appropriate, the control section 105 determines whether or not the received power RSSI acquired at Step S910 is smaller than the received power RSSI1 (Step S912).

If it is determined at Step S912 that RSSI is smaller than RSSI1, the control section 105 reverses symbol S1 (Step S913), and adds symbol S1×variationΔ1 to the serial varactor voltage (Step S914). Thus, the serial varactor voltage returns to the level of starting the operation shown in FIG. 20. Next, the control section 105 updates the variationΔ1 to ½ times thereof (Step S915). Next, the control section 105 determines whether or not the variationΔ1 after the update is larger than the end value EV (Step S916).

If it is determined at Step S912 that RSSI is not smaller than RSSI1, the control section 105 replaces the received power RSSI1 with the received power RSSI acquired at Step S910 (Step S912a), and returns to the operation at Step S902.

If the variationΔ1 is larger than the end value EV at Step S916, the control section 105 returns to the operation at Step S902. Thus, the serial varactor voltage will be adjusted using the smaller variation. Meanwhile, if the variationΔ1 is not larger than the end value EV, the control section 105 proceeds to operation at Step S917.

FIG. 21 is a flow chart illustrating the details of the operation of the control section 105 after Step S917. Hereafter, the details of the operation of the control section 105 after Step S917 will be described with reference to FIG. 21.

At Step S917, the control section 105 adds symbol S2×variationΔ2 to the parallel varactor voltage indicated by the parameter selected at Step S702. Next, the control section 105 applies the parallel varactor voltage obtained at Step S917 and the serial varactor voltage obtained before Step S916, to the serial varactor diode 203 and parallel varactor diode 204 of the matching circuit 102, respectively (Step S918). Next, the control section 105 acquires the received power, and sets the acquired received power to RSSI (Step S919).

Next, the control section 105 determines whether or not the received power RSSI acquired at Step S919 is appropriate (Step S920). The judgment criterion at Step S920 is similar to that at Step S210 in FIG. 10. If the received power is appropriate, the control section 105 completes the processing. The varactor voltage here is of the matched load value information. Meanwhile, if the received power is not appropriate, the control section 105 determines whether or not the received power RSSI acquired at Step S919 is smaller than the received power RSSI1 (Step S921). According to the determination at Step S921, it is determined that changing the parallel varactor voltage by the variationΔ2 will lead to increasing the received power.

If it is determined at Step S921 that RSSI is smaller than RSSI1, the control section 105 reverses symbol S2 (Step S922). Next, the control section 105 adds 2× symbol S2×variationΔ2 to the parallel varactor voltage (Step S923). Thus, the parallel varactor voltage will be changed to a direction reverse to that at Step S917. Next, the control section 105 applies the parallel varactor voltage obtained at Step S923 and the serial varactor voltage obtained before Step S916 to the matching circuit 102 (Step S924) to acquire the received power, and sets the acquired received power to RSSI (Step S925) to then proceed to operation at Step S926. However, if the parallel varactor voltage obtained at Step S923 becomes a negative voltage, the control section 105 applies the voltage of 0V to the matching circuit 102. Hereafter, similarly, if the parallel varactor voltage after change is negative, the voltage applied to the matching circuit 102 will be 0 V.

If it is determined at Step S922 that RSSI is not smaller than RSSI1, the control section 105 replaces the received power RSSI1 with the received power RSSI acquired at Step S919 (Step S921a), and returns to the operation at Step S917.

At Step S926, the control section 105 determines whether or not the received power RSSI acquired at Step S925 is appropriate. The judgment criterion at Step S926 is similar to that at Step S210 in FIG. 10. If it is determined that the received power is appropriate, the control section 105 completes the processing. The varactor voltage here is of the matched load value information. Meanwhile, if it is determined that the received power is not appropriate, the control section 105 determines whether or not the received power RSSI acquired at Step S925 is smaller than the received power RSSI1 (Step S927).

If it is determined at Step S927 that RSSI is smaller than RSSI1, the control section 105 reverses symbol S2 (Step S928), and adds symbol S2×variationΔ2 to the parallel varactor voltage (Step S929). Thus, the serial varactor voltage returns to the level of starting the operation shown in FIG. 21. Next, the control section 105 updates the variationΔ2 to ½ times thereof (Step S930). Next, the control section 105 determines whether or not the variationΔ2 after the update is larger than the end value EV (Step S931).

If it is determined at Step S927 that RSSI is not smaller than RSSI1, the control section 105 replaces the received power RSSI1 with the received power RSSI acquired at Step S925 (Step S927a), and returns to the operation at Step S917.

If the variationΔ2 is larger than the end value EV at Step S936, the control section 105 returns to the operation at Step S917. Thus, the serial varactor voltage will be adjusted using the smaller variation. Meanwhile, if the variationΔ2 is not larger than the end value EV, the control section 105 completes the processing.

If there is no initial parameter (initial load information) for providing the impedance matching in the initial control processing, the control section 105, at Steps S702, and S901 through 931, finely adjusts the load value of the matching circuit 102 by finely adjusting the varactor voltage using a steepest descent method algorithm, derives a varactor voltage (matched load information) corresponding to the load value of the matching circuit 102 for providing the impedance matching, and apply the derived varactor voltage to control the matching circuit 102. The processing at Steps S702, S901 through S931 is the matched load value deriving processing.

As is understood, according to the second embodiment, if the change of the received power is detected, the control section 105 first applies the varactor voltage to the matching circuit 102 using the chromosome stored in the initial parameter table for use situation. If there is an initial parameter which can provide the appropriate received power, the control section 105 applies the varactor voltage corresponding to this initial parameter to the matching circuit 102 to thereby match the impedance. Meanwhile, if there is no initial parameter which can provide the appropriate received power, the control section 105 selects an initial parameter which can provide the highest received power, and applies the varactor voltage corresponding to this parameter to thereby control the matching circuit. Thereafter, the control section 105 finely adjusts the varactor voltage currently applied with a steepest descent method, and operates so that the appropriate received power may be obtained. Hence, the varactor voltage can be changed to the appropriate value in a short time. Consequently, the impedance matching will be performed quickly. As a result of this, since the impedance can be always controlled adaptively in various environments where the antenna is placed, a loss due to a mismatching loss can be reduced, so that the mobile radio apparatus which can always obtain the stable received power will be provided.

Moreover, the mobile radio apparatus 1 can adaptively match the impedance only by storing only the parameter corresponding to the use situation, thus making it possible to reduce the information to be stored.

Furthermore, the mobile radio apparatus 1 uses the averaged received power, thus making it possible to achieve the stable operation.

Note herein that, if the appropriate varactor voltage is found in the process of finely adjusting the varactor voltage with a steepest descent method, the control section 105 may register the parameter corresponding to this varactor voltage in the initial parameter table for use situation. Specifically, the control section 105 registers the parameter corresponding to the varactor voltage for controlling the matching circuit 102, in the storage section 106 after Step S905 and after Step S911 in FIG. 20, and after Step S920 and after Step S926 in FIG. 21. The control section 105 may determine the varactor voltage for impedance matching also using the newly registered initial parameter, at the processing in FIG. 17 which will be performed next time. As a result of this, parameters suitable for the user who uses the mobile radio apparatus 1 will be accumulated as the initial parameter by repeating the fine adjustment of the varactor voltage. Accordingly, as the processing by the control section 105 is repeated performed, the time for impedance matching will be reduced.

The steepest descent method algorithm described in the second embodiment is only an example. The steepest descent method algorithm used in the present invention is not limited to the aforementioned steepest descent method algorithm.

THIRD EMBODIMENT

In a third embodiment, an embodiment in which the impedance is adaptively controlled with another control method will be described. In the third embodiment, since the configuration of the mobile radio apparatus is similar to that in the first embodiment, FIG. 1 will be employed. Additionally, since the configuration of the matching circuit 102 in the mobile radio apparatus 1 is similar to that in the first embodiment, FIG. 2 will be employed. Operation of the signal strength detecting section 103 and the signal processing section 104 is similar to that in the first embodiment. In the third embodiment, since the use situation initial chromosome table similar to that in the first embodiment is stored in the storage section 106, FIG. 3 will be employed. The operation of the control section 105 is different from that in the first embodiment. Hereinafter, the operation of the mobile radio apparatus 1 in the third embodiment will be described focusing on the operation of the control section 105.

Figure 22:
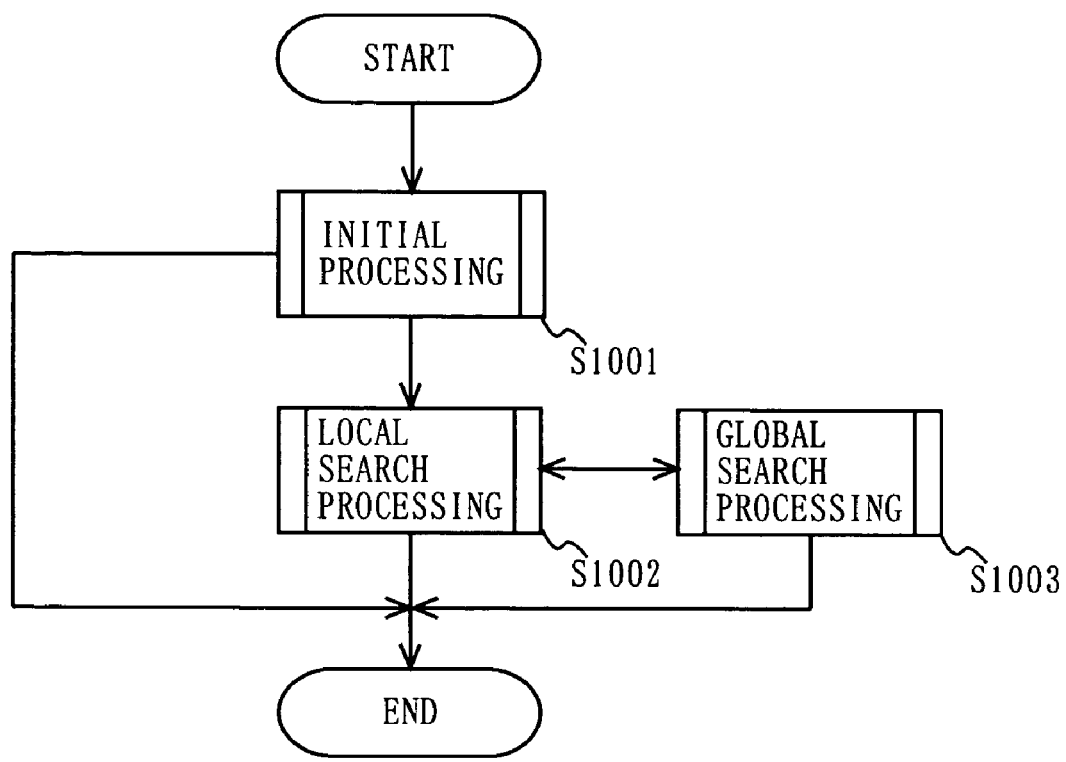
FIG. 22 is a flow chart illustrating the operation of the control section 105 in accordance with a third embodiment.

FIG. 22 is a flow chart illustrating the operation of the control section 105 in accordance with a third embodiment. Hereafter, the operation of the control section 105 in the third embodiment will be described with reference to FIG. 22. Incidentally, the operation shown in FIG. 22 is started at a timing similar to that in FIG. 4 according to the first embodiment. Note herein that, the initial variationΔ, the end value EV and the number of chromosomes of the gene N, the number of chromosomes NC, and an upper limit generation number Nmg are determined in advance. Meanwhile, the initial values of symbols S1 and S2 are 1s.

First, the control section 105 controls the varactor voltage to be applied to the matching circuit 102 using the initial chromosome (initial load value information) stored in the use situation initial chromosome table, and if there is an initial chromosome which can provide the appropriate received power, controls the matching circuit 102 using this initial chromosome to complete the process. If there is no initial chromosome which can provide the appropriate received power, the control section 105 generates a new chromosome, and then if there is a chromosome which can provide the appropriate received power in the new chromosomes, it controls the matching circuit 102 using this chromosome to complete the process. Moreover, the control section 105 evolves the chromosome, and if there is a chromosome which can provide the appropriate received power in the evolved chromosomes, it controls the matching circuit 102 using this chromosome to complete the process. If there is no chromosome which can provide the appropriate received power even in the evolved chromosomes, the control section 105 proceeds to the local search processing at Step S1002 to finely adjust the impedance of the matching circuit 102.

Next, as the local search processing, the control section 105 finely adjusts the varactor voltage applied to the matching circuit 102 based on the chromosome selected at Step S1001 (Step S1002). If the appropriate varactor voltage has not been found in the processing at Step S1002, the control section 105 proceeds to operation at Step S1003 which is the global search processing. Meanwhile, if the appropriate varactor voltage is found at Step S1002, the control section 105 completes the processing.

At Step S1003, as the global search processing, the control section 105 generates chromosomes at random, evolves the generated chromosomes using a genetic algorithm, and determines whether or not the appropriate chromosome is generated. If the appropriate chromosome is generated, the control section 105 completes the processing. Meanwhile, if the appropriate chromosome is not generated, the control section 105 selects the chromosome for providing the highest received power, and then returns to the operation at Step S1002 which is the local search processing.

Figure 23A:
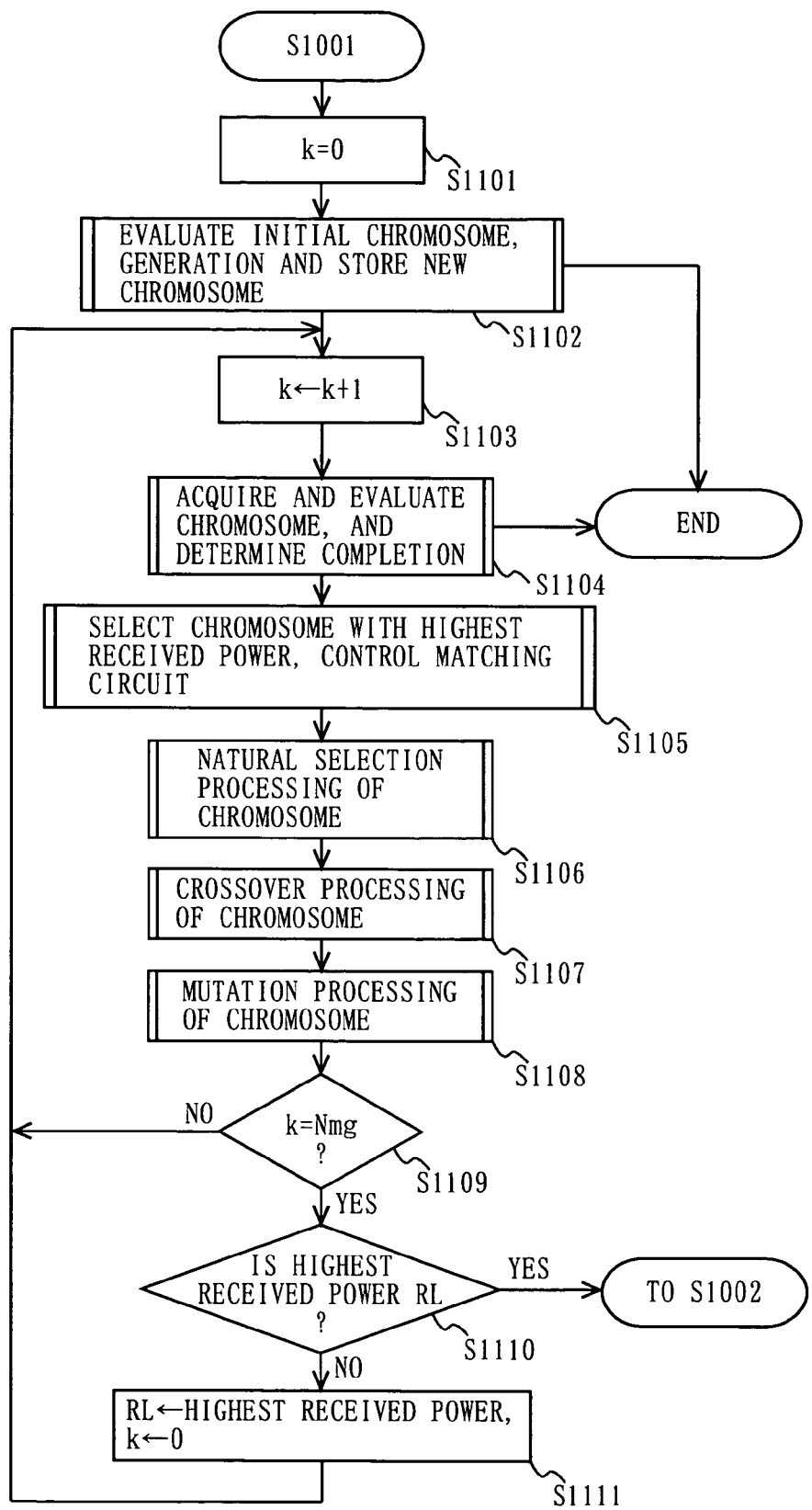
FIG. 23A is a flow chart illustrating details of the operation of the control section 105 at Step S1001.

FIG. 23A is a flow chart illustrating details of the operation of the control section 105 at Step S1001. Hereafter, the details of the operation of the control section 105 at Step S1001 will be described with reference to FIG. 23A.

First, the control section 105 sets to k=0 as the initial setting (Step S1101).

Next, at Step S1102, the control section 105 determines whether or not there is an initial chromosome which can provide the appropriate received power in the initial chromosome table, and if there is an initial chromosome which can provide the appropriate received power, it completes the process. If there is no initial chromosome which can provide the appropriate received power, the control section 105 generates a new chromosome at random so that Nc chromosomes in total including the initial chromosome may be obtained, and stores the generated chromosome in the storage section 106. At Step S1102, the control section 105 sets the largest received power among the received powers corresponding to the initial chromosome to the end reference value RL.

Next, the control section 105 increments k by 1 (Step S1103).

Next, the control section 105 acquires chromosomes A(i) from the storage section 106 for all i ($1<=i<=Nc$) to evaluate the acquired chromosomes (Step S1104). If there is an appropriate chromosome at Step S1104, the control section 105 completes the processing. Meanwhile, if there is no appropriate chromosome at Step S1104, the control section 105 proceeds to operation at Step S1105.

At Step S1105, the control section 105 selects the chromosome which has obtained the highest evaluation in the evaluation at Step S1104, and controls the matching circuit 102 with the varactor voltage corresponding to the selected chromosome.

Next, the control section 105 naturally selects the chromosomes stored in the storage section 106 (Step S1106). Next, the control section 105 crosses over the chromosomes obtained by the natural selection at Step S1106 (Step S1107). Next, the control section 105 mutates the chromosome obtained by the crossover at Step 1107 (Step S1108).

Next, the control section 105 determines whether or not k is the upper limit generation number Nmg (Step S1109). If k is not the upper limit generation number Nmg, the control section 105 returns to the operation at Step S1103 to perform the evaluation of chromosomes of the next generation. Meanwhile, if k is the upper limit generation number Nmg, the control section 105 proceeds to operation at Step S1110.

At Step S1110, the control section 105 determines whether or not the highest received power is the same as the end reference value RL. If the highest received power is the same as the end reference power RL, the control section 105 proceeds to the local search processing (Step S1002). Meanwhile, if the highest received power is not the same as the end reference power RL, the control section 105 proceeds to operation at Step S1111.

At Step S1111, the control section 105 sets the highest received power to the end reference power RL, and sets k to 0 to then return to the operation at Step S1103. Thus, as a result of performing the processing for the every GA unit by defining GA of the generation number Nmg as one unit, the processing will be completed if there is no change in the obtained solution. Hence, the optimization efficiency will be improved by performing the optimization with the needed minimum generation number Nmg which provides possible operation.

In a manner described above, a chromosome with the highest received power among the chromosomes obtained resulting from evolving the chromosomes by the upper limit generation number will be selected.

Figure 23B:
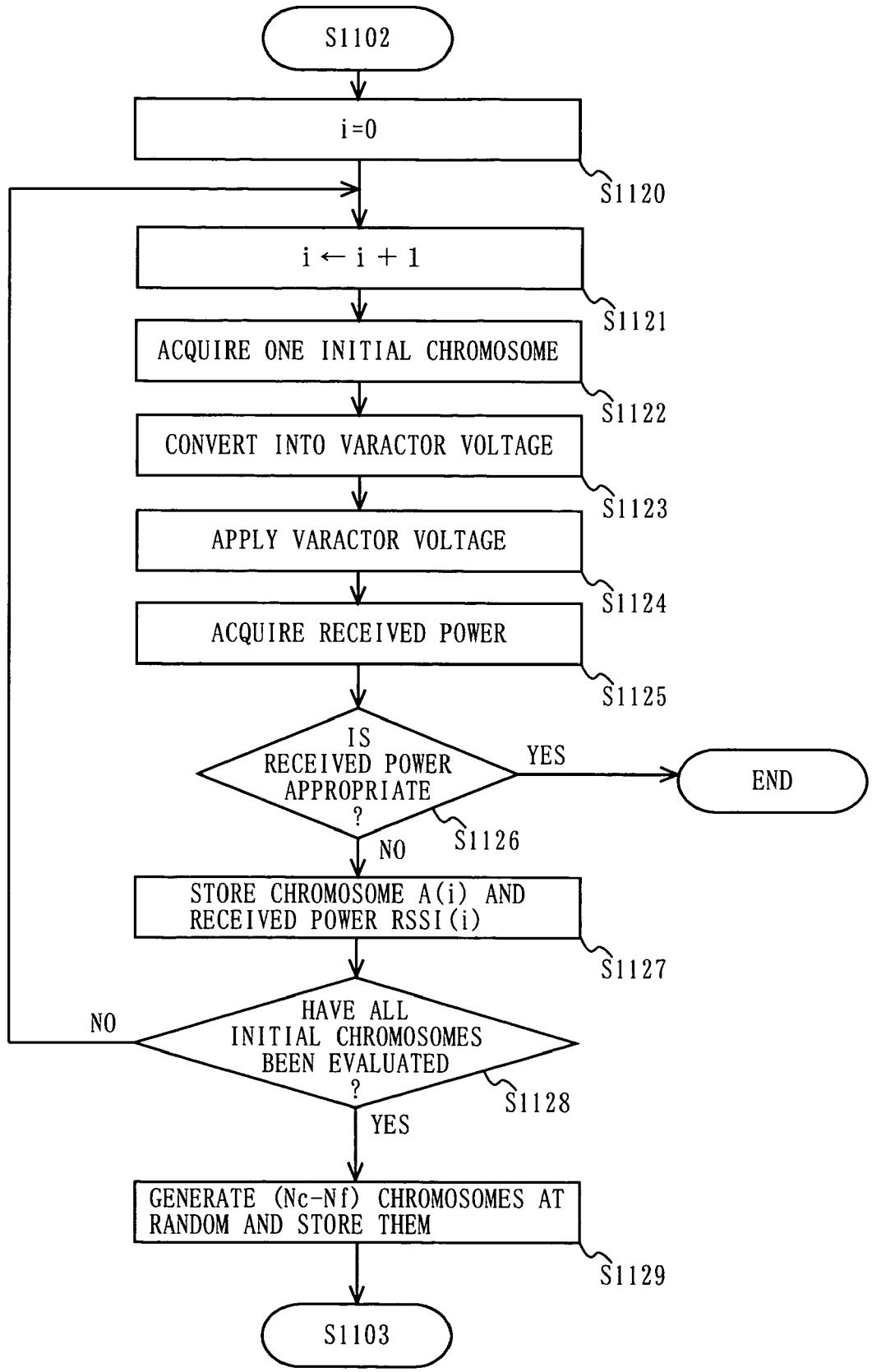
FIG. 23B is a flow chart illustrating the details of the operation of the control section 105 at Step S1102 in FIG. 23A.

FIG. 23B is a flow chart illustrating the details of the operation of the control section 105 at Step S1102 in FIG. 23A. Hereafter, the details of the operation of the control section 105 at Step S1102 in FIG. 23A will be described with reference to FIG. 23B.

First, the control section 105 sets to i=0 as the initial setting (Step S1120), and then increments i by 1 (Step S1121) to acquire one initial chromosome (Step S1122). Next, the control section 105 converts the acquired chromosome into the varactor voltage (Step S1123), and applies this varactor voltage to the matching circuit 102 (Step S1124). Next, the control section 105 acquires the received power from the signal strength detecting section 103 (Step S1125), and determines whether or not the acquired received power is appropriate (Step S1126). The judgment criterion at Step S1126 is similar to that at Step S210 in FIG. 10.

If it is the appropriate received power, the control section 105 completes the processing. Meanwhile, if it is not the appropriate received power, the control section 105 stores this initial chromosome and the received power as the chromosome A(i), and this received power as the received power RSSI(i) in the storage section 106 (Step S1127), and proceeds to operation at Step S1128.

At Step S1128, the control section 105 determines whether or not the received power is evaluated for all the initial chromosomes. If the received power is not evaluated for all the initial chromosomes, the control section 105 returns to the operation at Step S1121 to continue the evaluation of other chromosomes. Meanwhile, if it is evaluated for all the initial chromosomes, the control section 105 proceeds to operation at Step S1129.

At Steps S1121 through S1128, the control section 105 evaluates the initial chromosome (initial load value information) stored in the storage section 106, and if there is an initial chromosome (initial load value information) for providing the impedance matching, applies the varactor voltage corresponding to this initial chromosome (initial load value information) to the matching circuit 102 so that the matching circuit 102 may have the load value corresponding to this initial chromosome (initial load value information). The processing at Steps S1121 through S1128 is called the initial control processing.

At Step S1129, the control section 105 generates (Nc—Nf) chromosomes at random to store them in the storage section 106 as the chromosomes A(Nf+1) through A(Nc), and then completes the processing. Since this chromosome generated at random (it is called the random chromosome) is of the information for indicating the load value of the matching circuit 102, it is called the random load value information. Incidentally, a method of generating a chromosome at random is as follows. For example, the control section 105 generates the random number r ($0<r<1$), and determines whether or not $r<0.5$. If it is $r<0.5$, the control section 105 determines that one gene is "0". If it is not $r<0.5$, the control section 105 determines that one gene is "1". In a manner described above, the control section 105 generates the genes of N bit at random to thereby generate one chromosome.

Figure 24:
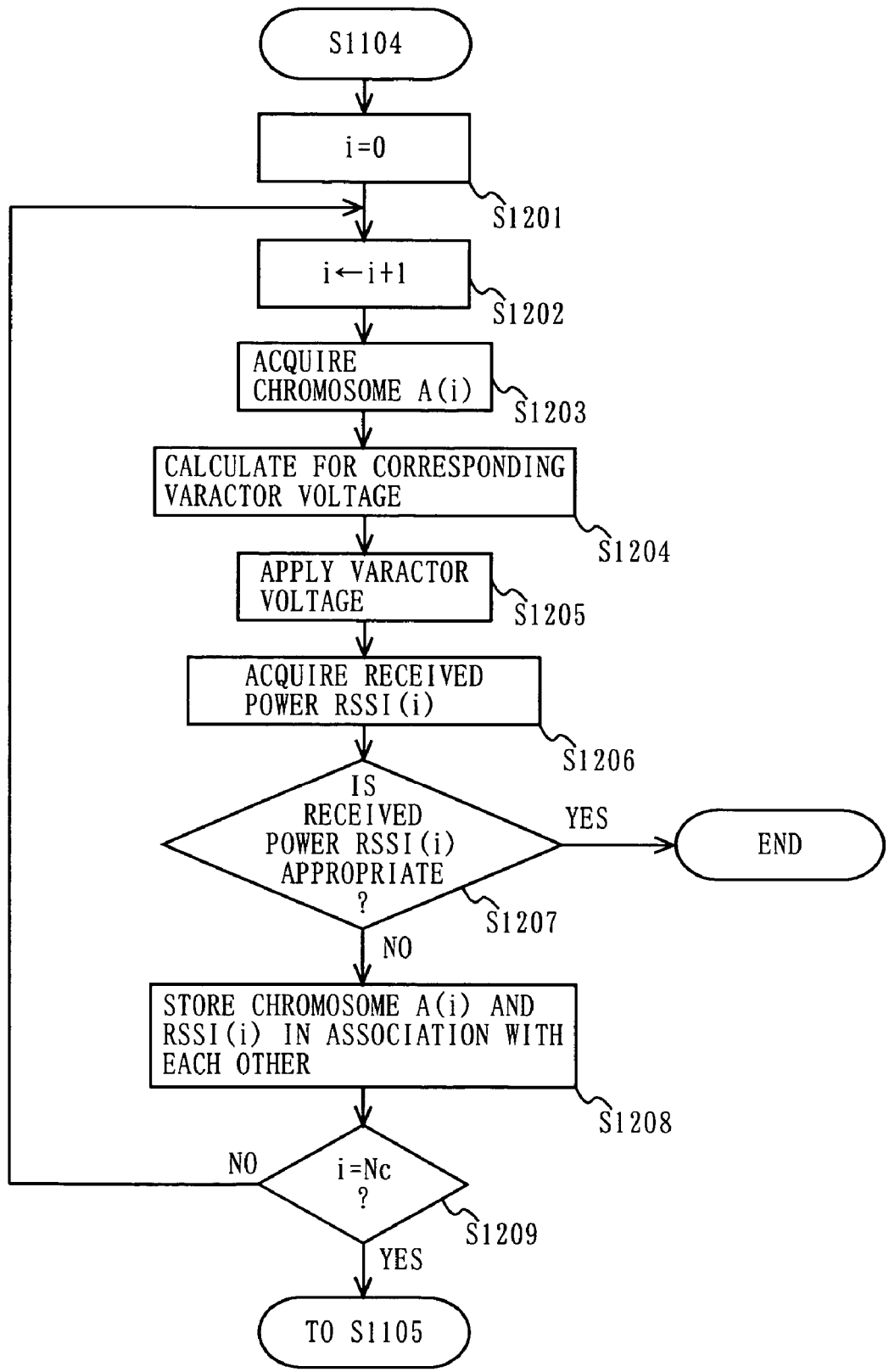
FIG. 24 is a flow chart illustrating the details of the operation of the control section 105 at Step S1104 in FIG. 23A.

FIG. 24 is a flow chart illustrating the details of the operation of the control section 105 at Step S1104 in FIG. 23A. Hereafter, the details of the operation of the control section 105 at Step 1104 in FIG. 23A will be described with reference to FIG. 24.

First, the control section 105 sets to i=0 as the initial setting (Step S1201). Next, the control section 105 increments i by 1 (Step S1202). Next, the control section 105 acquires the chromosome A(i) from the storage section 106 (Step S1203), and calculates a varactor voltage corresponding to the acquired chromosome A(i) (Step S1204).

Next, the control section 105 applies the varactor voltage calculated at Step S1204 to the matching circuit 102 (Step S1205), and acquires the received power RSSI(i) from the signal strength detecting section 103 (Step S1206).

Next, the control section 105 determines whether or not the obtained received power RSSI(i) is appropriate (Step S1207). The judgment criterion at Step S1207 is similar to that at Step S210 in FIG. 10. If the received power RSSI(i) is appropriate, the control section 105 completes the processing. Meanwhile, if the received power RSSI(i) is not appropriate, the control section 105 stores the chromosome A(i) and the received power RSSI(i) in the storage section 106 in association with each other (Step S1208).

Next, the control section 105 determines whether or not it is i=Nc (Step S1209). If it is not i=Nc, the control section 105 returns to the operation at Step S1202 to continue the determination whether or not the received power RSSI(i) is appropriate to all i. Meanwhile, if it is i=Nc, the control section 105 proceeds to operation at Step S1105.

Thus, at Step S1104, the control section 105 evaluates the random chromosomes (random load value information), if there is a random chromosome (random load value information) for providing the impedance matching, controls the matching circuit 102 so that the load value corresponding to this random chromosome (random load value information) may be obtained. If there is no random chromosome (random load value information) for providing the impedance matching, the control section 105 proceeds to the processing after Step S105, and derives a chromosome for providing the impedance matching (matched load value information), using the initial chromosome (initial load value information) and the random chromosome (random load value information).

Figure 25:
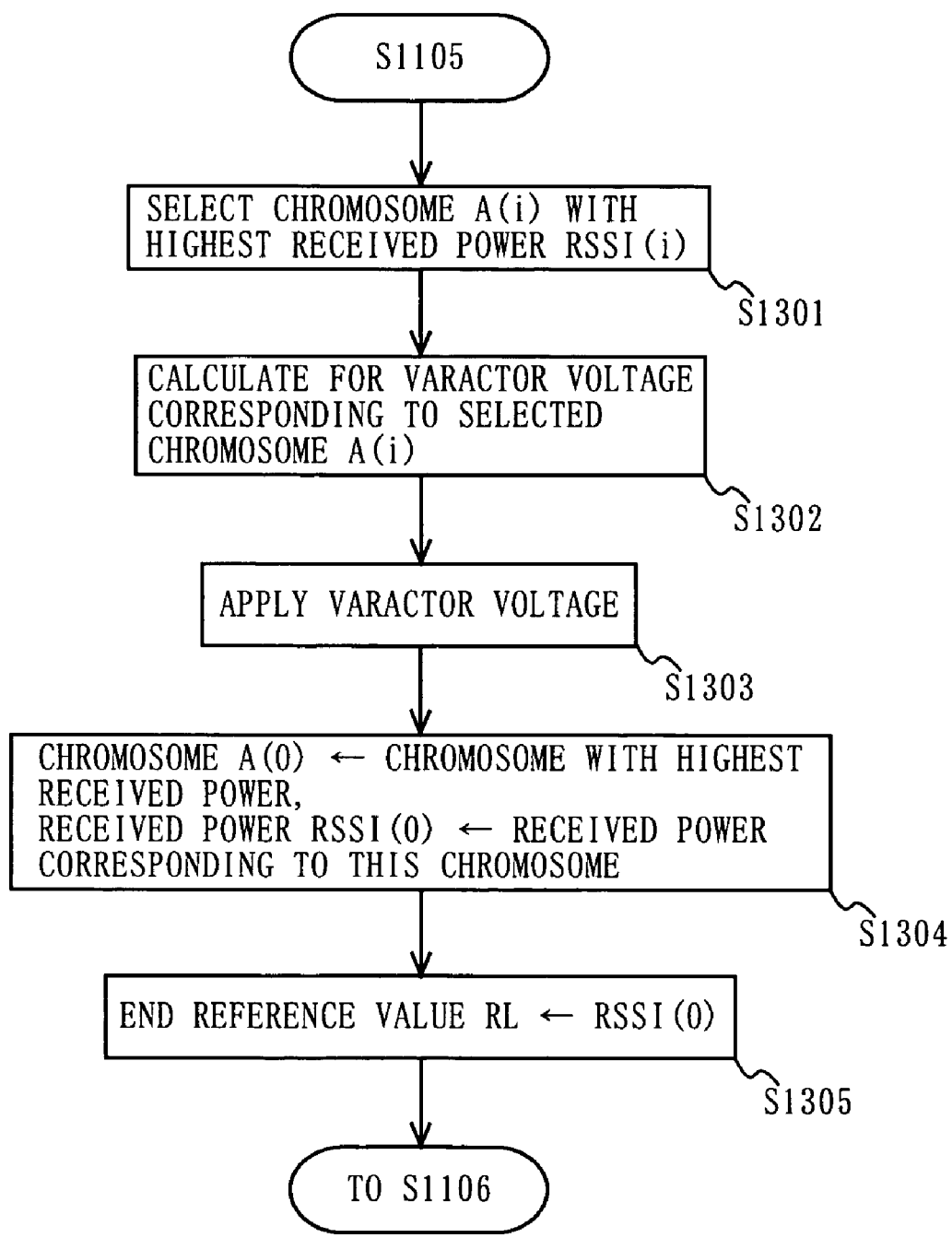
FIG. 25 is a flow chart illustrating the details of the operation of the control section 105 at Step S1105 in FIG. 23A.

FIG. 25 is a flow chart illustrating the details of the operation of the control section 105 at Step S1105 in FIG. 23A. Hereafter, the details of the operation of the control section 105 at Step S1105 in FIG. 23A will be described with reference to FIG. 25.

First, the control section 105 selects the chromosome A(i) with highest received power RSSI(i) with reference to the storage section 106 (Step S1301). Next, the control section 105 calculates a varactor voltage corresponding to the selected chromosome A(i) (Step S1302), and applies the calculated varactor voltage to the matching circuit 102 (Step S1303). Next, the control section 105 stores a chromosome with the highest received power as a chromosome A(0), and received power corresponding to this chromosome as RSSI (0) in the storage section 106 (Step S1304).

Next, the control section 105 stores the received power RSSI(0) as the end reference value RL, in the storage section 106 (Step S1305), and proceeds to operation at Step S1106.

Figure 26:
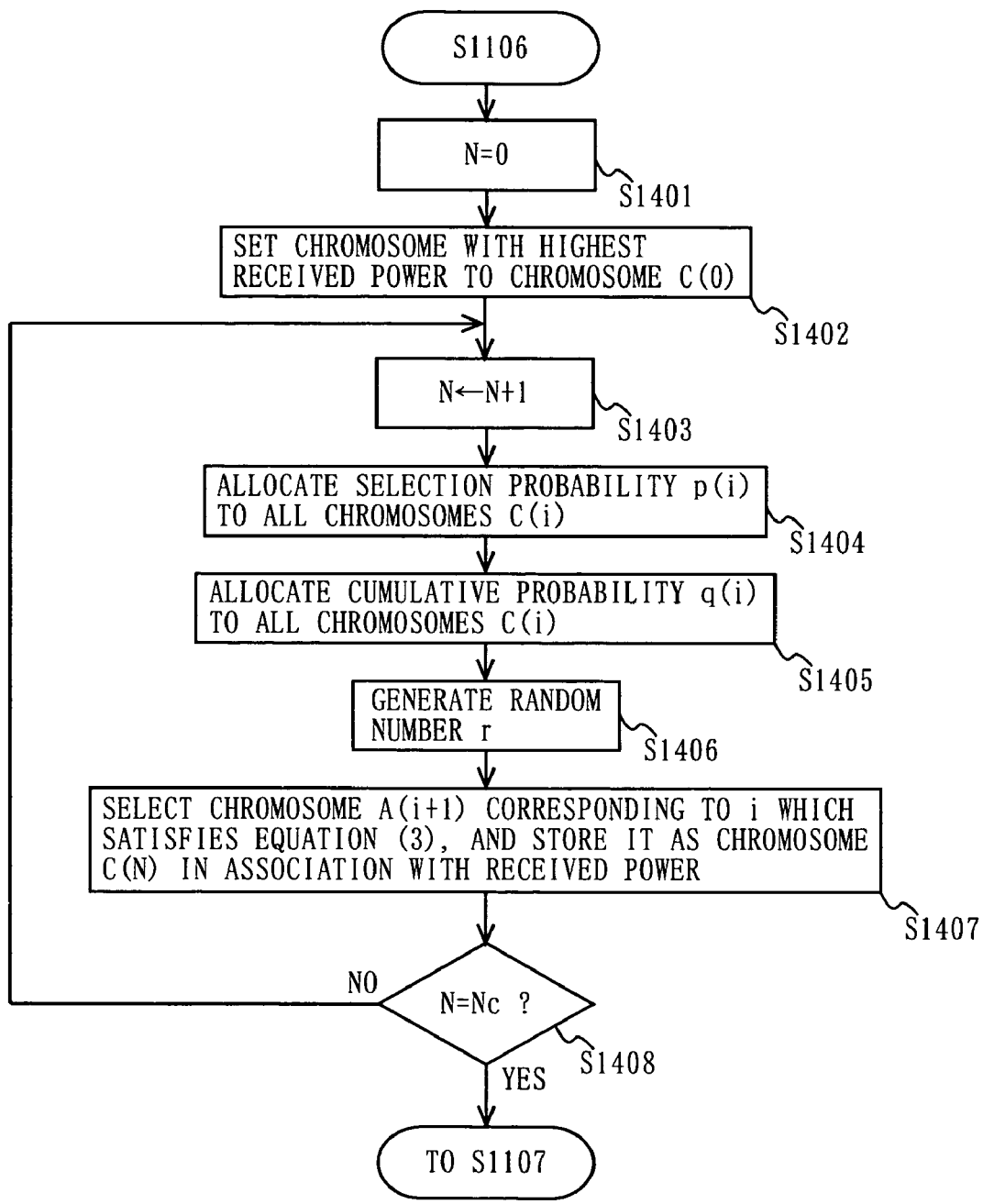
FIG. 26 is a flow chart illustrating the details of the operation of the control section 105 at Step S1106 in FIG. 23A.

FIG. 26 is a flow chart illustrating the details of the operation of the control section 105 at Step S1106 in FIG. 23A. Hereafter, the details of the operation of the control section 105 at Step S1106 in FIG. 23A will be described with reference to FIG. 26.

First, the control section 105 sets to N=0 as the initial setting (Step S1401). Next, the control section 105 sets a chromosome which has the highest received power among the received powers stored in the storage section 106, to a chromosome C(0) (Step S1402). Next, the control section 105 increments N by 1 (Step S1403).

Next, the control section 105 allocates the selection probability p(i) represented by Equation (1) to all the chromosomes A(i) (0<=i<=Nc) (Step S1404). Next, the control section 105 allocates the cumulative probability q(i) represented by Equation (2), to all the chromosomes A(i) (0<=i<=Nc) (Step S1405).

Next, the control section 105 generates the random number r (0<r<1) (Step S1406).

Next, the control section 105 calculates for i which satisfies formula (3) for the generated random number r, selects the chromosome A(i+1) corresponding to q(i+1), and stores the selected chromosome A(i+1) as the chromosome C(N) in the storage section 106 along with the received power corresponding to the selected chromosome A(i+1) (Step S1407).

Next, the control section 105 determines whether or not it is N=Nc (Step S1408). If it is not N=Nc, the control section 105 proceeds to operation at Step S1403, and selects the next chromosome. Meanwhile, if it is N=Nc, the control section 105 proceeds to operation at Step S1107.

The chromosome with high received power will be preferentially selected by the operation shown in FIG. 26.

Figure 27:
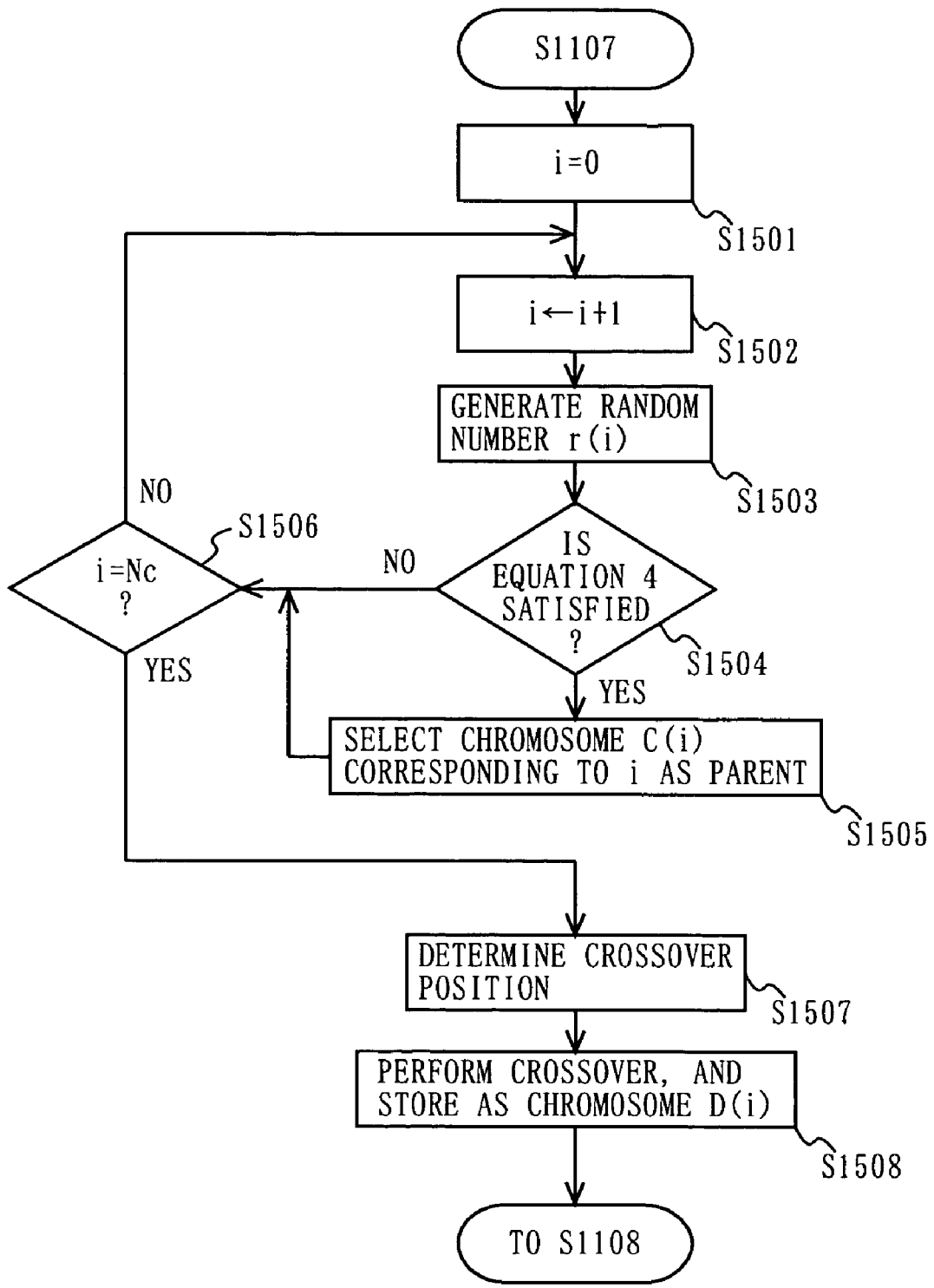
FIG. 27 is a flow chart illustrating the detailed operation of the control section 105 at Step S1107 in FIG. 23A.

FIG. 27 is a flow chart illustrating the detailed operation of the control section 105 at Step S1107 in FIG. 23A. Hereafter, the detailed operation of the control section 105 at Step S1107 in FIG. 23A will be described with reference to FIG. 27.

First, the control section 105 initializes as i=0 (Step S1501). Next, the control section 105 increments i by 1 (Step S1502), and generates the random number r(i) (0<r(i)<1) (Step S1503). Next, the control section 105 determines whether or not Equation (4) is satisfied (Step S1504).

If Equation (4) is satisfied, the control section 105 selects the chromosome C(i) corresponding to i, stored in the storage section 106 as the parent (Step S1505), and proceeds to operation at Step S1506. Meanwhile, if Equation (4) is not satisfied, the control section 105 proceeds to operation at Step S1506 as it is, without selecting the parent.

At Step S1506, the control section 105 determines whether or not it is i=Nc. If it is not i=Nc, the control section 105 returns to the operation at Step S1502, and continues the parent selection. Meanwhile, if it is i=Nc, the control section 105 proceeds to operation at Step S1507.

At Step S1507, the control section 105 determines the crossover position at random. How to determine the crossover position is similar to that at Step S507 in FIG. 13.

After Step S1507, the control section 105 chooses two arbitrary chromosomes among the parent chromosomes selected at Step S1505, and performs crossover by replacing the genes at the crossover positions determined at Step S1507. The control section 105 stores the chromosomes after the crossover and the chromosomes without the crossover as a chromosome D(i) in the storage section 106, and proceeds to operation at Step S1108.

Figure 28:
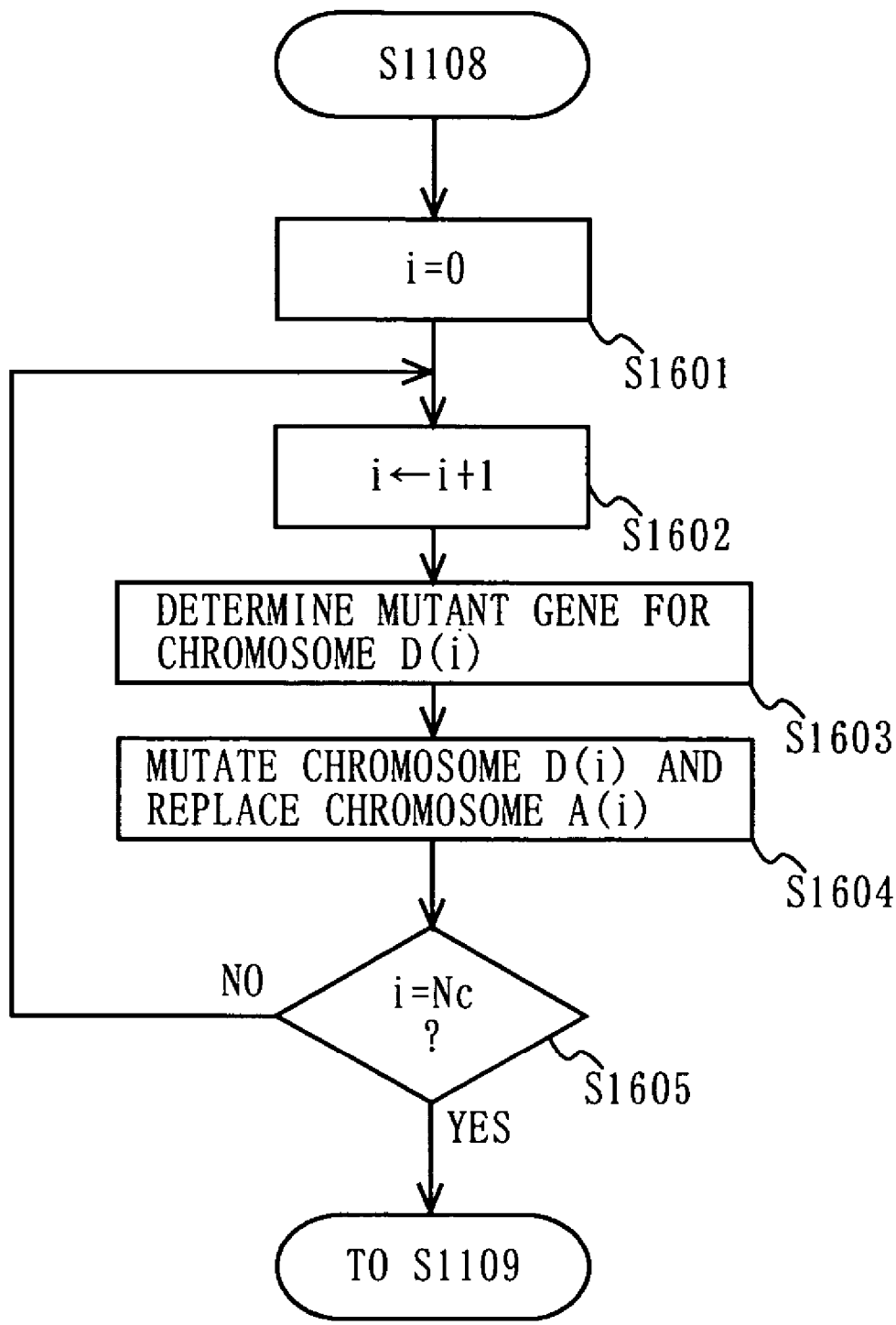
FIG. 28 is a flow chart illustrating the details of the operation of the control section 105 at Step S1108 in FIG. 23A.

FIG. 28 is a flow chart illustrating the details of the operation of the control section 105 at Step S1108 in FIG. 23A. Hereafter, the operation of the control section 105 at Step 1108 in FIG. 23A will be described with reference to FIG. 28.

First, the control section 105 initializes as i=0 (Step S1601), and increments i by 1 (Step S1602). Next, the control section 105 determines at random whether or not to mutate the chromosome D(i), and if it is mutated, determines the position of the gene to be mutated at random (Step S1603). A determining method of the position of the gene to be mutated is the same as the determining method at Step S603 in FIG. 14.

Next, the control section 105 reverses the gene at the determined position to perform mutation, and replace the chromosome A(i) with the chromosome after the mutation to store it in the storage section 106 (Step S1604). However, the gene D(i) which has not been mutated is registered as a gene A(i) as it is.

Subsequently, the control section 105 determines whether or not it is i=Nc (Step S1605). If it is not i=Nc, the control section 105 returns to the operation at Step S1602, and performs mutation for the remaining genes D(i). Meanwhile, if it is i=Nc, the control section 105 proceeds to operation at Step S1109.

At Steps S1004 through S1108 after the second generation, The control section 105 will derive the chromosome (matched load value information) which can provide the impedance matching by evolving the initial chromosome and the random chromosome using a genetic algorithm.

Figure 29:
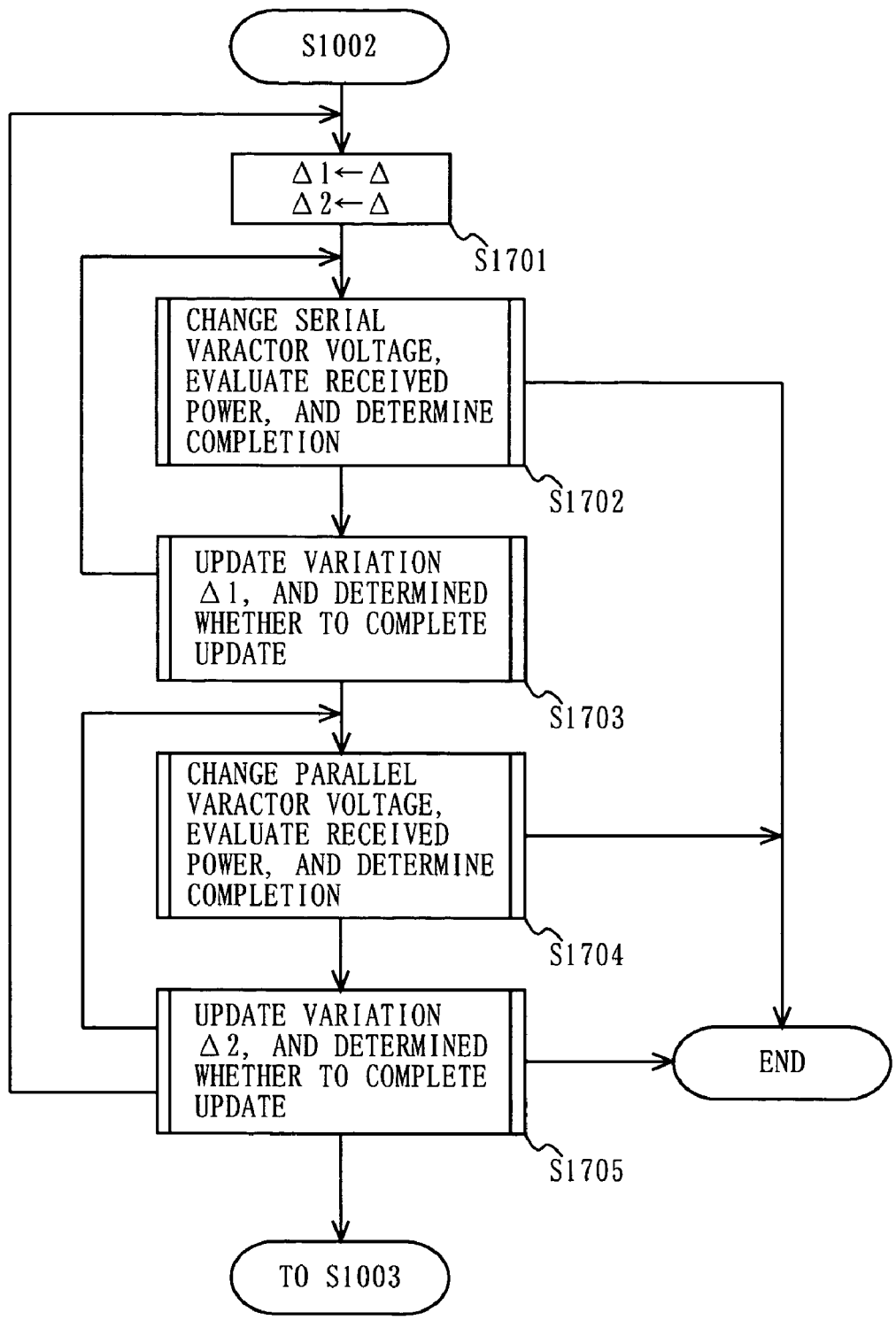
FIG. 29 is a flow chart illustrating the details of the operation of the control section 105 at Step S1002 in FIG. 22.

FIG. 29 is a flow chart illustrating the details of the operation of the control section 105 at Step S1002 in FIG. 22. Hereafter, the details of the operation of the control section 105 at Step S1002 in FIG. 22 will be described with reference to FIG. 29.

First, the control section 105 substitutes the initial variationΔ for the variationΔ1, substitutes the initial variationΔ for the variationΔ2 (Step S1701), and proceeds to operation at Step S1702.

At Step S1702, the control section 105 changes the current serial varactor voltage based on the variationΔ1 to acquires the received power, and determines whether or not the acquired received power is optimal. If the received power is optimal, the control section 105 completes the processing. Meanwhile, if the received power is not optimal, The control section 105 proceeds to operation at Step S1703.

At Step S1703, the control section 105 updates the variationΔ1, and determines whether or not the variationΔ1 reaches the value for the update to be completed. If the variationΔ1 has not reached the value for the update to be completed, the control section 105 returns to the operation at Step S1702. Meanwhile, if the variationΔ1 has reached the value for the update to be completed, the control section 105 proceeds to operation at Step S1704.

At Step S1704, the control section 105 changes the current parallel varactor voltage based on the variationΔ2 to acquires the received power, and determines whether or not the acquired received power is optimal. If the received power is optimal, the control section 105 completes the processing. Meanwhile, if the received power is not optimal, the control section 105 proceeds to operation at Step S1705.

At Step S1705, the control section 105 updates the variationΔ2, and determines whether or not the variationΔ2 reaches the value for the update to be completed. If the variationΔ2 has not reached the value for the update to be completed, the control section 105 returns to the operation at Step S1704. Meanwhile, if the variationΔ2 has reached the value for the update to be completed, the control section 105 proceeds to operation at Step S1003. Additionally, at Step S1705, the control section 105 also updates the initial variationΔ. If the initial variationΔ has not reached the value for the update to be completed, the control section 105 returns to the operation at Step S1701. Meanwhile, if the initial variationΔ has reached the value for the update to be completed, and the current received power is the same as the end reference power RL, the control section 105 completes the processing. If the initial variationΔ has reached the value for the update to be completed, and the current received power is not the same as the end reference value RL, the control section 105 proceeds to operation at Step S1003.

Figure 30:
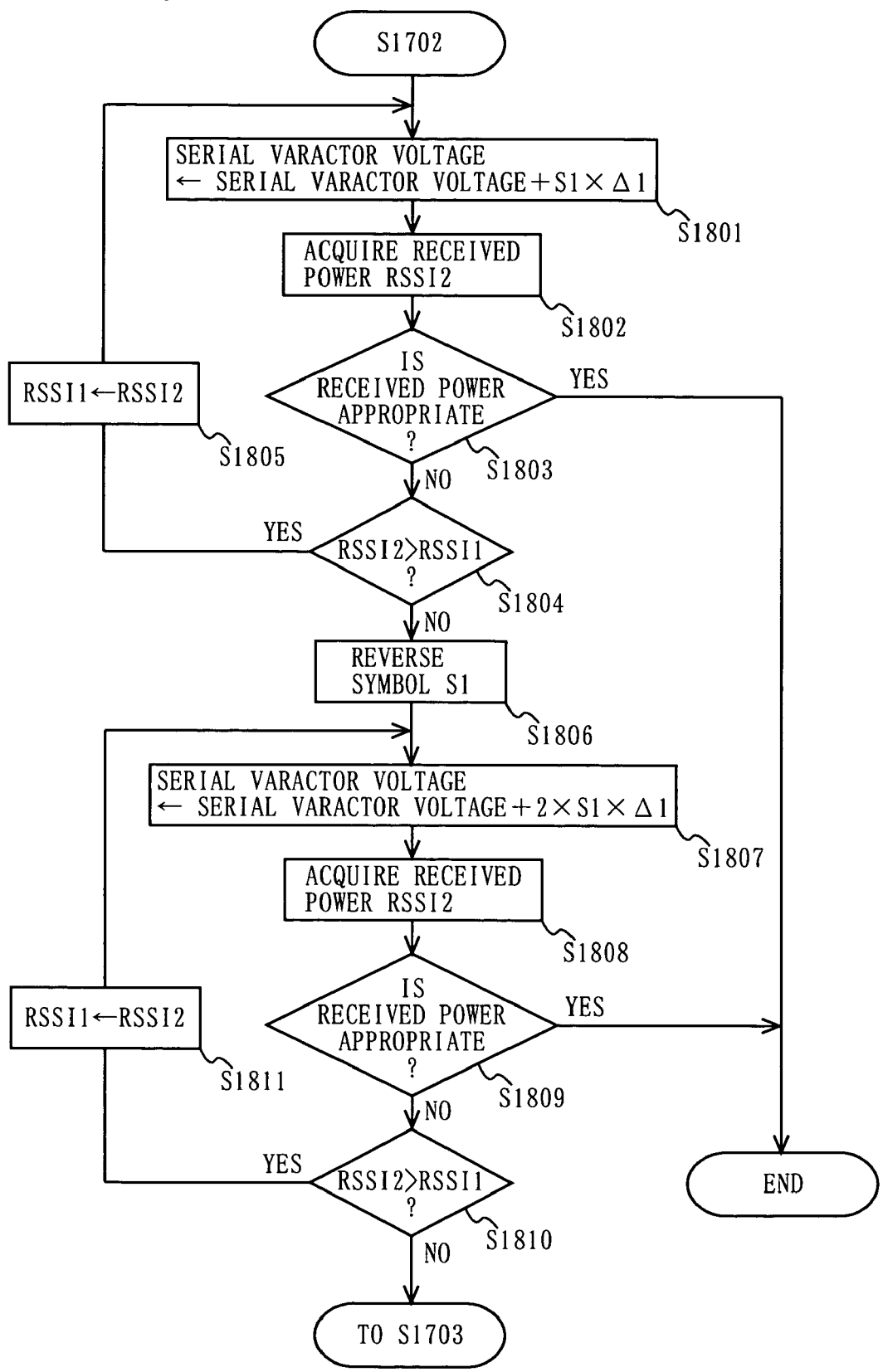
FIG. 30 is a flow chart illustrating the detailed operation of the control section 105 at Step S1702 in FIG. 29.

FIG. 30 is a flow chart illustrating the detailed operation of the control section 105 at Step S1702 in FIG. 29. Hereafter, the detailed operation of the control section 105 at Step S1702 in FIG. 29 will be described with reference to FIG. 30.

First, the control section 105 adds symbol S1xΔ1 to the current serial varactor voltage (Step S1801), and acquires the received power to set the acquired received power to RSSI2 (Step S1802). Next, the control section 105 determines whether or not the received power RSSI2 is the appropriate received power (Step S1803). The judgment criterion at Step S1803 is similar to that at Step S210 in FIG. 10.

If it is determined at Step S1803 that the received power RSSI2 is appropriate, the control section 105 completes the processing. The varactor voltage corresponding to the received power obtained at Step S1803 is of the matched load value information. Meanwhile, if it is determined that the received power RSSI2 is not appropriate, the control section 105 determines whether or not the received power RSSI2 is larger than the received power RSSI1 before changing the serial varactor voltage at Step S1801 (Step S1804).

If the received power RSSI2 is larger than the received power RSSI1, the control section 105 replaces the value of the received power RSSI1 with the value of the received power RSSI2 (Step S1805), and returns to the operation at Step S1801. Meanwhile, if the received power RSSI2 is not larger than the received power RSSI1, the control section 105 proceeds to operation at Step S1806.

At Step S1806, the control section 105 reverses symbol S1. Next, the control section 105 adds 2xS1xΔ1 to the current serial varactor voltage (Step S1807), and acquires the received power to set the acquired received power to RSSI2 (Step S1808). Next, the control section 105 determines whether or not the received power RSSI2 is the appropriate received power (Step S1809). The judgment criterion at Step S1809 is similar to that at Step S210 in FIG. 10.

If it is determined at Step S1809 that the received power RSSI2 is appropriate, the control section 105 completes the processing. The varactor voltage corresponding to the received power obtained at Step S1809 is of the matched load value information. Meanwhile, if it is determined that the received power RSSI2 is not appropriate, the control section 105 determines whether or not the received power RSSI2 is larger than the received power RSSI1 before changing the serial varactor voltage at Step S1807 (Step S1810).

If the received power RSSI2 is larger than the received power RSSI1, the control section 105 replaces the value of the received power RSSI1 with the value of the received power RSSI2 (Step S1811), and returns to the operation at Step S1807. Meanwhile, if the received power RSSI2 is not larger than the received power RSSI1, the control section 105 proceeds to operation at Step S1703.

Figure 31:
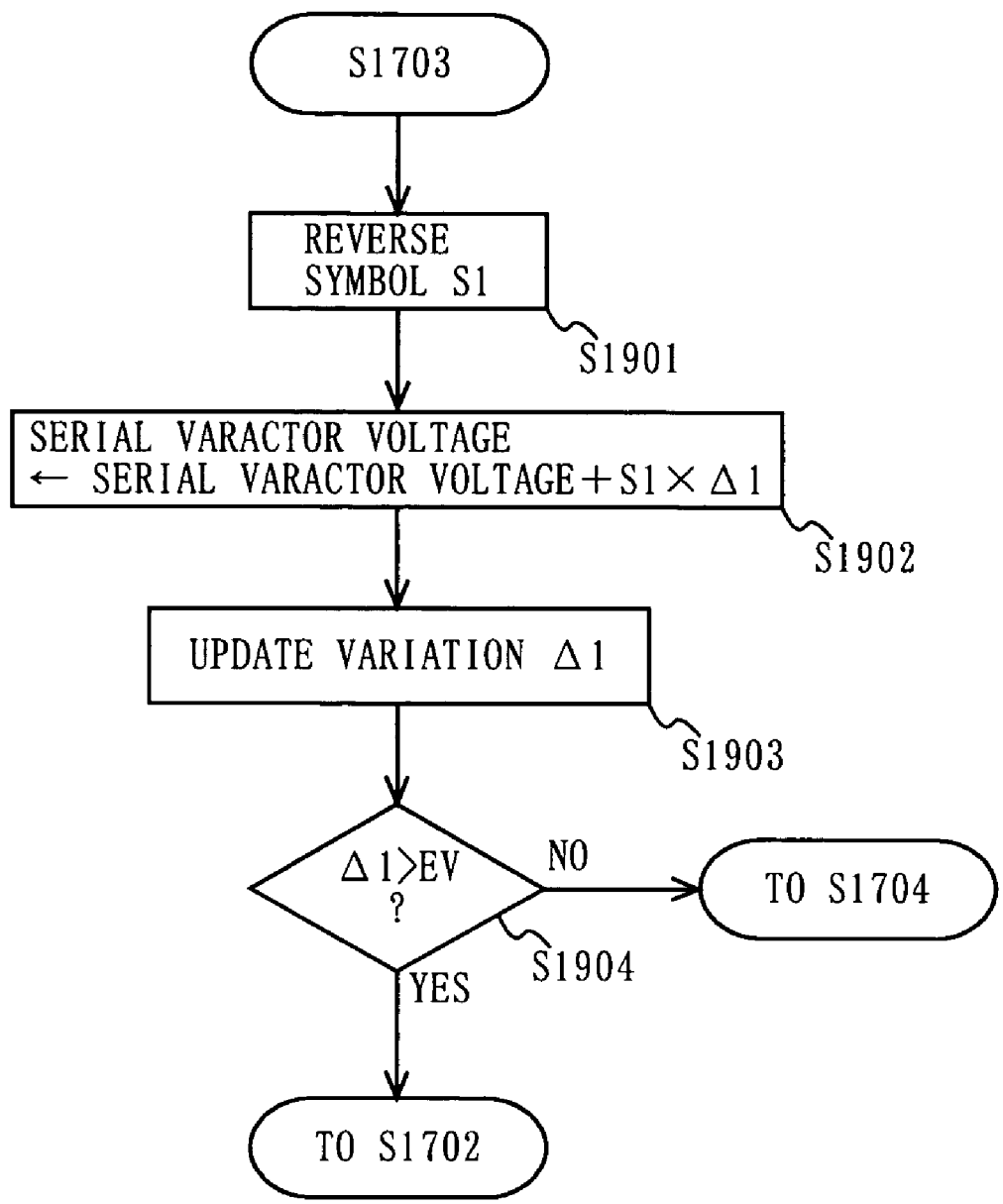
FIG. 31 is a flow chart illustrating the details of the operation of the control section 105 at Step S1703 in FIG. 29.

FIG. 31 is a flow chart illustrating the details of the operation of the control section 105 at Step S1703 in FIG. 29. Hereafter, the details of the operation of the control section 105 at Step S1703 in FIG. 29 will be described with reference to FIG. 31.

First, the control section 105 reverses symbol S1 (Step S1901). Next, the control section 105 adds S1xΔ1 to the current serial varactor voltage (Step S1902). Next, the control section 105 updates the variationΔ1 (Step S1903). For example, the control section 105 updates the variationΔ1 by multiplying the variationΔ1 by 1/n. Next, the control section 105 determines whether or not the variationΔ1 is larger than the end value EV (Step S1904). If the variationΔ1 is larger than the end value EV, the control section 105 returns to the operation at Step S1702. Meanwhile, if the variationΔ1 is not larger than the end value EV, the control section 105 proceeds to operation at Step S1704.

Figure 32:
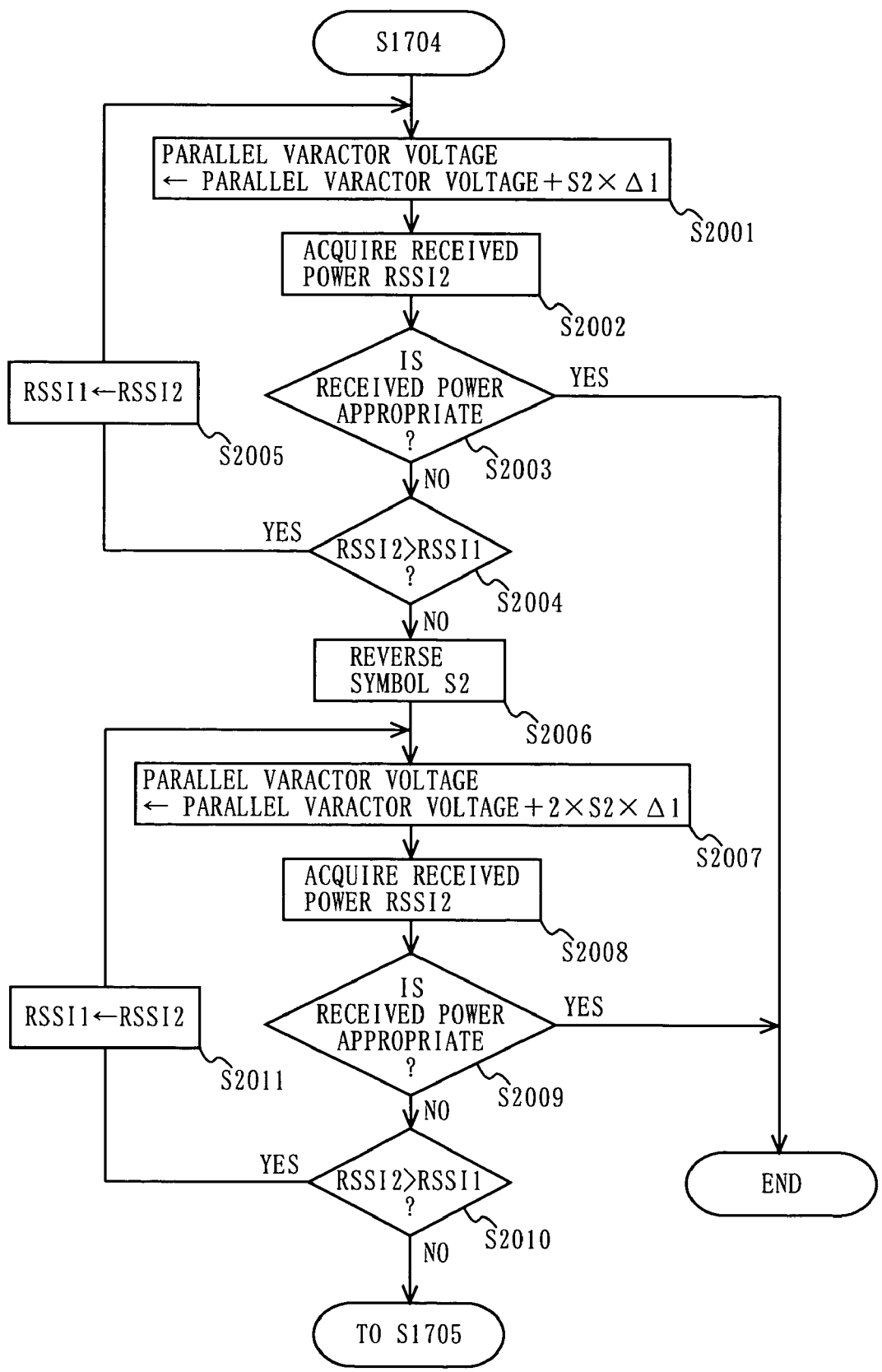
FIG. 32 is a flow chart illustrating the details of the operation of the control section 105 at Step S1704 in FIG. 29.

FIG. 32 is a flow chart illustrating the details of the operation of the control section 105 at Step S1704 in FIG. 29. Hereafter, the details of the operation of the control section 105 at Step S1704 in FIG. 29 will be described with reference to FIG. 32.

First, the control section 105 adds symbol S2$x$Δ1 to the current parallel varactor voltage (Step S2001), and acquires the received power to set the acquired received power to RSSI2 (Step S2002). Next, the control section 105 determines whether or not the received power RSSI2 is the appropriate received power (Step S2003). The judgment criterion at Step S2003 is similar to that at Step S210 in FIG. 10.

If it is determined at Step S2003 that the received power RSSI2 is appropriate, the control section 105 completes the processing. The varactor voltage corresponding to the received power obtained at Step S2003 is of the matched load value information. Meanwhile, if it is determined that the received power RSSI2 is not appropriate, the control section 105 determines whether or not the received power RSSI2 is larger than the received power RSSI1 before changing the parallel varactor voltage at Step S2001 (Step S2004).

If the received power RSSI2 is larger than the received power RSSI1, the control section 105 replaces the value of the received power RSSI1 with the value of the received power RSSI2 (Step S2005), and returns to the operation at Step S2001. Meanwhile, if the received power RSSI2 is not larger than the received power RSSI1, the control section 105 proceeds to operation at Step S2006.

At Step S2006, the control section 105 reverses symbol S2. Next, the control section 105 adds 2$x$S2$x$Δ1 to the current parallel varactor voltage (Step S2007), and acquires the received power to set the acquired received power to RSSI2 (Step S2008). Next, the control section 105 determines whether or not the received power RSSI2 is the appropriate received power (Step S2009). The judgment criterion at Step S2009 is similar to that at Step S210 in FIG. 10.

If it is determined at Step S2009 that the received power RSSI2 is appropriate, the control section 105 completes the processing. The varactor voltage corresponding to the received power obtained at Step S2009 is of the matched load value information. Meanwhile, if it is determined that the received power RSSI2 is not appropriate, the control section 105 determines whether or not the received power RSSI2 is larger than the received power RSSI1 before changing the parallel varactor voltage at Step S2007 (Step S2010).

If the received power RSSI2 is larger than the received power RSSI1, the control section 105 replaces the value of the received power RSSI1 with the value of the received power RSSI2 (Step S2011), and returns to the operation at Step S2007. Meanwhile, if the received power RSSI2 is not larger than the received power RSSI1, the control section 105 proceeds to operation at Step S1705.

Figure 33:
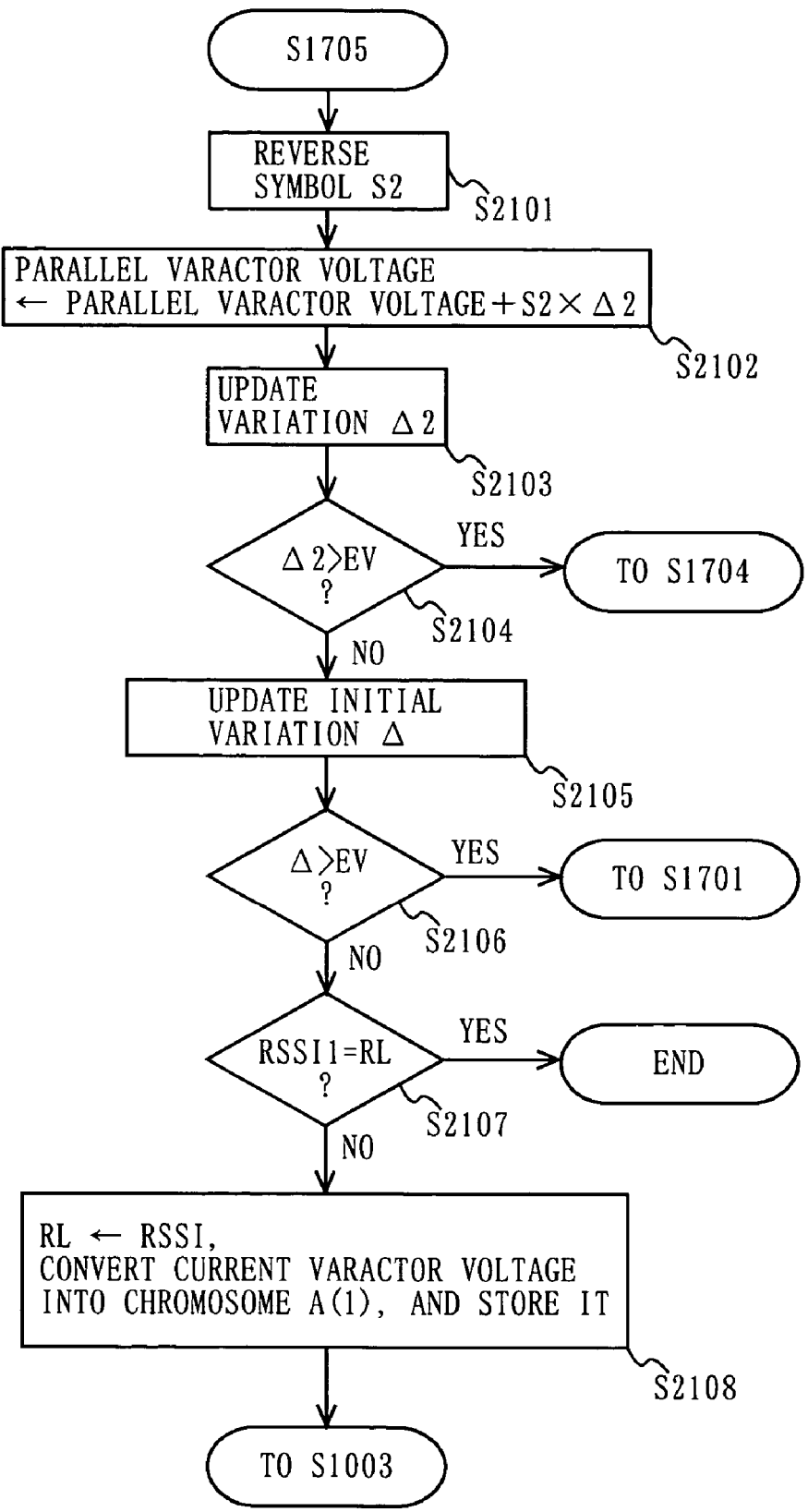
FIG. 33 is a flow chart illustrating the details of the operation of the control section 105 at Step S1705 in FIG. 29.

FIG. 33 is a flow chart illustrating the details of the operation of the control section 105 at Step S1705 in FIG. 29. Hereafter, the details of the operation of the control section 105 at Step S1705 in FIG. 29 will be described with reference to FIG. 33.

First, the control section 105 reverses symbol S2 (Step S2101), and adds S2$x$Δ2 to the current parallel varactor voltage (Step S2102).

Next, the control section 105 updates the variationΔ2 (Step S2103). For example, the control section 105 updates the variationΔ2 by multiplying the variationΔ2 by 1/n. Next, the control section 105 determines whether or not the variationΔ2 is larger than the end value EV (Step S2104). If the variationΔ2 is larger than the end value EV, the control section 105 returns to the operation at Step S1704. Meanwhile, if the variationΔ2 is not larger than the end value EV, the control section 105 proceeds to operation at Step S2105.

At Step S2105, the control section 105 updates the initial variations. For example, the control section 105 updates the initial variationΔ by multiplying the initial variationΔ by 1/n.

Next, the control section 105 determines whether or not the initial variationΔ larger than the end value EV (Step S2106). The condition whether or not the initial variationΔ larger than the end value EV is a condition to indicate a limit that the appropriate received power can be obtained by fine adjustment of the varactor voltage, so that it is called the limiting condition. Incidentally, the limiting condition may be a condition other than that at Step S2106.

If the initial variationΔ is larger than the end value EV, the control section 105 returns to the operation at Step S1701. Thus, the varactor voltage will be adjusted using the smaller variation. Meanwhile, if the variationΔ not larger than the end value EV, the control section 105 determines whether or not the received power RSSI1 is the same as the end reference power RL (Step S2107). As a result of this, if there is no difference between the maximum received power of the solutions obtained by the local search processing at Step S1002, and the maximum received power of the solutions obtained by the initial processing at Step S1001, it considers that the convergence is achieved, and will not proceed to the global search processing at Step S1003, but control will be completed.

Figure 34:
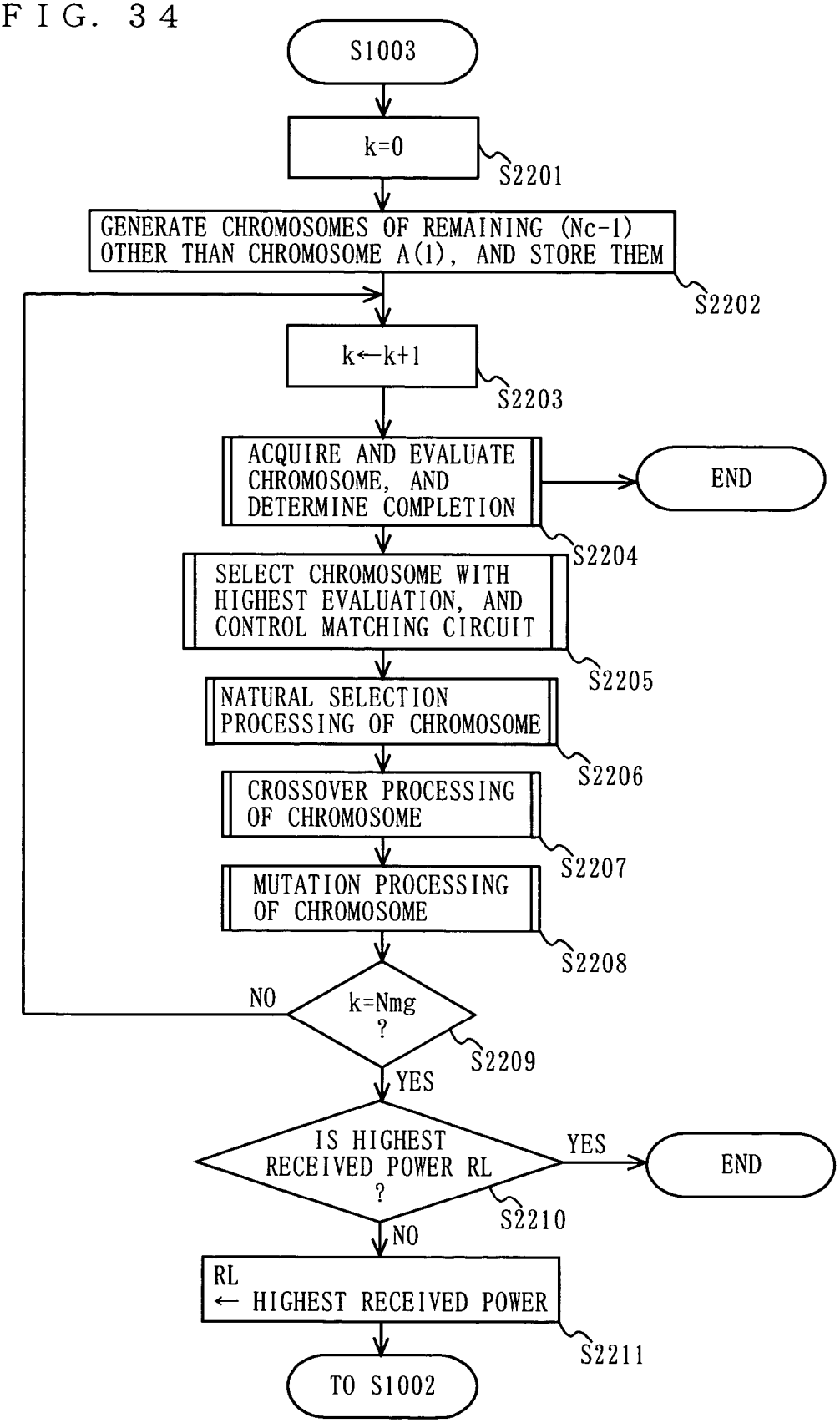
FIG. 34 is a flow chart illustrating the details of the operation of the control section 105 at Step S1003 in FIG. 22.

If the received power RSSI1 is the same as the end reference power RL, the control section 105 completes the processing. Meanwhile, if the received power RSSI1 is not the same as the end reference power RL, The control section 105 updates the end reference power RL to the received power RSSI1, converts the current varactor voltage into the chromosome to store the obtained chromosome as the chromosome A(1) in the storage section 106 (Step S2108), and proceeds to operation at Step S1003. The chromosome A(1) obtained at Step S2108 is not a chromosome which could provide the optimal received power, but is a chromosome which could provide the highest received power by the local search processing at Step S1002. Hence, the chromosome A(1) serves as a chromosome with the highest evaluation at present. As shown in FIG. 34 in the following, evolution of the chromosome is performed using the chromosome A(1).

As described above, at Step S1002, the control section 105 derives the varactor voltage (matched load value information) for providing the impedance matching by means of finely adjusting the load value of the matching circuit 102 corresponding to the chromosome with the highest evaluation among the chromosomes obtained by evolving the initial chromosome and the random chromosome.

FIG. 34 is a flow chart illustrating the details of the operation of the control section 105 at Step S1003 in FIG. 22. Hereafter, the details of the operation of the control section 105 at Step S1003 in FIG. 22 will be described with reference to FIG. 34.

First, the control section 105 sets to k=0 as the initial setting (Step S2201), and generates remaining (Nc−1) chromosomes other than the chromosome A(1) stored at Step S2108 at random as the chromosomes A(2) through A(Nc) to then store them in the storage section 106 (Step S2202). How to generate the chromosome is similar to that at Step S1129 in FIG. 23B. At Step S2202, the control section 105 sets the highest received power as the end reference value RL.

Next, the control section 105 increments k by 1 (Step S2203).

Next, the control section 105 acquires the chromosome A(i) stored in the storage section 106 in a manner similar to Step S1104 in FIG. 23A to evaluate it (Step S2204). At Step S2204, if there is an appropriate chromosome, the control section 105 completes the processing. Meanwhile, if there is no appropriate chromosome at Step 2204, the control section 105 proceeds to operation at Step S2205.

At Steps S2205 through S2208, the control section 105 evolves the chromosome A(i) in a manner similar to that at Steps S1105 through S1108 shown in FIG. 23A, and obtains the chromosome D(i) after mutation to replace chromosome after mutation D(i) with the chromosome A(i).

Next, the control section 105 determines whether or not k is the upper limit generation number Nmg (Step S2209). If k is not the upper limit generation number Nmg, the control section 105 returns to the operation at Step S2203 to perform the evaluation of chromosomes of the next generation. Meanwhile, if k is the upper limit generation number Nmg, the control section 105 proceeds to operation at Step S2210.

At Step S2210, the control section 105 determines whether or not the highest received power is the end reference value RL. If the highest received power is the same as the end reference power RL, the control section 105 completes the processing. Meanwhile, if the highest received power is not the same as the end reference power RL, the control section 105 sets the highest received power as the end reference power RL (Step S2211), and proceeds to the local search processing at Step S1002. As a result of this, if there is no difference between the maximum received power of the solutions obtained by the local search processing at Step S1002, and the maximum received power of the solutions obtained by the global search processing at Step S1003, it will consider that the convergence is achieved, and the control will be completed.

The global search processing at Step S1003 will be performed if a predetermined limiting condition (here, condition at Step S2106) is satisfied. At Step S1003, the control section 105 generates a new chromosome to derive a chromosome (matched load value information) which can provide the impedance matching, using this new chromosome.

In the global search processing at Step S1003, first, the control section 105 newly generates a chromosome (it is called load value information), evaluates the generated new chromosomes (load value information), and if there is a chromosome for providing the impedance matching, controls the matching circuit 102 so as to have the load value corresponding to this chromosome. If there is no such a chromosome, the control section 105 evolves a new chromosome (load value information) using a genetic algorithm to derive the matched load value information using the evolved chromosome. The chromosome A(1) which has obtained the highest evaluation by the local search processing at Step S1002 is used at Step S1003. Additionally, chromosomes completely unrelated to the chromosome A(1) are generated at random. Since evolution is performed using these chromosomes, the chromosome influenced by the chromosomes for providing the high received power will be generated. If a local solution obtained by the local search processing is not appropriate, the chromosome is reevaluated by the global search processing, and search for more suitable chromosome is performed. If the appropriate chromosome is found by the global search processing, the control section 105 completes the processing. If the appropriate chromosome (matched load value information) is not found by the global search processing, the local search processing will be performed again, and the varactor voltage will be finely adjusted.

After the chromosome used by the local search processing has been determined by the processing at Step S1001, the global search processing and the local search processing alternately perform the processing using the chromosome obtained by each processing until an end condition is satisfied. As a result of this, in a case where change control of the varactor voltage has been started under a certain environment, even when the environment changes during the control, response of the varactor voltage according to the environment change is achieved in a short time by the global search processing being provided.

In the initial control processing, if there is no initial chromosome (initial load value information) for providing the impedance matching, in the processing at Step S1001 after the second generation, and in the processing at Step S1002 and the processing at Step S1003, the control section 105 derives a chromosome or a varactor voltage (matched load value information) corresponding to the load value of the matching circuit 102 for providing the impedance matching to control the matching circuit 102. The combined processing of the processing at Step S1001, the processing at Step S1002, and the processing at Step S1003, after the second generation, will be called the matched load value deriving processing.

Thus, the mobile radio apparatus in accordance with the third embodiment can adaptively control the impedance, corresponding to various environments where the antenna is placed. Hence, a loss due to a mismatching loss can be reduced, thus making it possible to always maintain the stable received power.

Incidentally, the upper limit generation number Nmg is a generation number indispensable to avoid the local solution. Accordingly, it is possible to further reduce the operation time by setting the upper limit generation number Nmg to be lower. It is similar also to another embodiment.

If the appropriate varactor voltage could be obtained in the middle of the processing shown in FIG. 22, the control section 105 may store the chromosome corresponding to this varactor voltage as the initial chromosome in the storage section 106. Specifically, after Step S1207 in FIG. 24, after Steps S1803 and S1809 in FIG. 30, and after Steps S2003 and S2009 in FIG. 32, the control section 105 stores the chromosome corresponding to the varactor voltage for controlling the matching circuit 102, in the storage section 106. In this case, at Step S1102 in FIG. 23A, the control section 105 takes out the initial chromosomes stored in the storage section 106, and operates so that total Nc chromosomes may be obtained. The initial chromosomes are accumulated in the storage section 106 by the impedance adjustment being repeatedly performed by the control section 105. If the number of chromosomes accumulated in the storage section 106 is Nc, the control section 105 may further accumulate the chromosomes, or may delete an unnecessary chromosome and then accumulates new chromosomes. As a result of this, the mobile radio apparatus will accumulate the chromosomes which can provide the varactor voltages suitable for the user by means of repeatedly performing the impedance matching. Accordingly, as the processing by the control section 105 is repeated performed, the time for impedance matching will be reduced.

Incidentally, when moving from the local search processing (Step S1002) to the global search processing (Step S1003), and from the global search processing (Step S1003) to the local search processing (Step S1002), it has been determined that the received power and the end reference power RL has been matched. Herein, it is assumed that, when an absolute value of a difference between the received power and the end reference power RL is equal to a predetermined reference value or less, the control section 105 determines that they are matched. Note herein that, also in another embodiment, it is assumed that whether or not certain values are match is determined based on whether or not an absolute value of the difference between them is lower a predetermined reference value.

FOURTH EMBODIMENT

In a fourth embodiment, since the basic constitution of the mobile radio apparatus is similar to that in the first embodiment, FIG. 1 will be employed. In the fourth embodiment, however, the configuration of the matching circuit is different from that in the first embodiment.

Figures 35, 36:
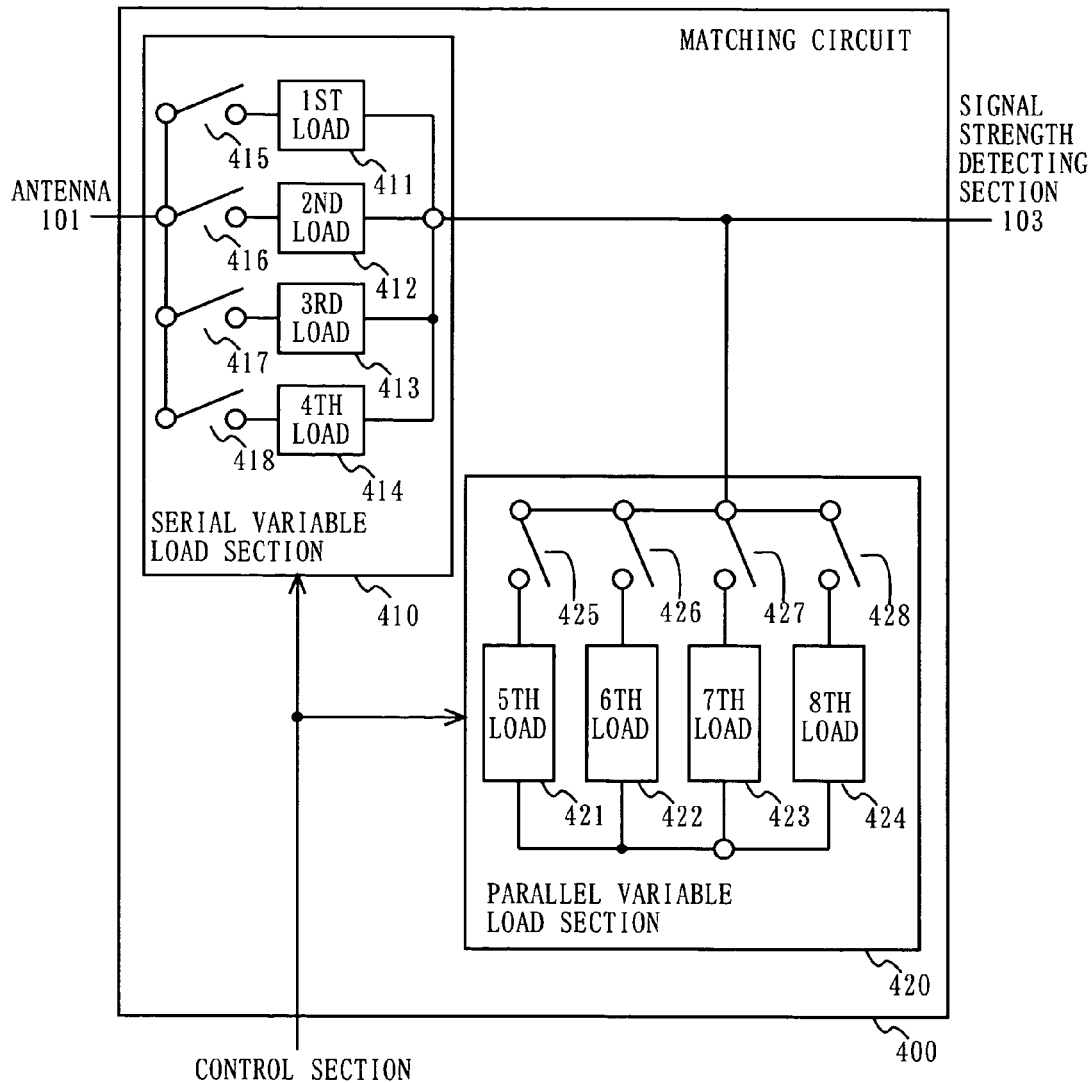
FIG. 35 is a block diagram illustrating a configuration of a matching circuit 400 in accordance with a fourth embodiment.
FIG. 36 is a diagram illustrating an example of the initial parameter table for use situation.

FIG. 35 is a block diagram illustrating a configuration of a matching circuit 400 in accordance with a fourth embodiment. In FIG. 35, the matching circuit 400 includes a serial variable load section 410, and a parallel variable load section 420. The serial variable load section 410 has a first load 411, a second load 412, a third load 413, a fourth load 414, a first switch 415, a second switch 416, a third switch 417, and a fourth switch 418. The parallel variable load section 420 has a fifth load 421, a sixth load 422, a seventh load 423, an eighth load 424, a fifth switch 425, a sixth switch 426, a seventh switch 427, and an eighth switch 428. Incidentally, there may be at least one load. There may also be at least one switch. As described above, the matching circuit 400 includes at least one reactive element and/or at least one inductance element, which are the load, and at least one switch for selecting the load.

In the fourth embodiment, the operation of the control section 105 is similar to that in the first embodiment, except for the control method of the matching circuit 400. In the first embodiment, the control section 105 has calculated for the serial varactor voltage and parallel varactor voltage corresponding to the chromosome, and determined to apply these varactor voltages to the matching circuit 102. In the fourth embodiment, the control section 105 controls the impedance of the whole matching circuit 400 by turning on and off the switch in the matching circuit 400 depending on each gene in the chromosome. For example, if the gene of the n-th (n=1, 2, . . . , 8) bit is "1", the control section 105 turns on an n-th switch, while, if the gene of the n-th bit is "0", it turns off the n-th switch.

In the fourth embodiment, steps for the control section 105 to convert the chromosome into the varactor voltage in the first embodiment (S207, S217) are replaced with a step for the control section 105 to convert the chromosome into the information on on/off of the switch (henceforth switch information) in the matching circuit 400. Moreover, in the fourth embodiment, steps for the control section 105 to apply the varactor voltage to the matching circuit 102 based on the chromosome in the first embodiment (S208, S218, S303) are replaced with a step for the control section 105 to turn on and off the switch in the matching circuit 400 based on the switch information corresponding to the chromosome.

As described above, as far as the impedance of the matching circuit can be controlled by the control section 105, the configuration of the matching circuit may not be limited to the aforementioned configuration. The matching circuit may be a circuit which can change the impedance according to the instructions from the control section. Moreover, although it has been described that the control section 105 has controlled the matching circuit based on the chromosome or the parameter in the aforementioned embodiment, information required for controlling the matching circuit is not limited to this.

The impedance is changed by switching the switches in the matching circuit 400. Hence, the impedance will be switched at high speed.

Moreover, since the impedance is changed by switching the switches in the matching circuit 400, a loss due to a variable capacitance element, such as a varactor diode, can be reduced as compared with a case of changing the impedance with the varactor diode, thus making it possible to provide the better received power steadily. Preferably, the loss can further be reduced by using a MEMS (Micro-Electro-Mechanical System) switch for the switch in the matching circuit 400.

Incidentally, the matching circuit 400 shown in FIG. 35 can also be diverted for the third embodiment. In this case, the control section 105 operates like the third embodiment except the control method of the matching circuit 400. In this embodiment, steps for the control section 105 to convert the chromosome into the varactor voltage in the third embodiment (S1204, S1302, S2108) are replaced with a step for the control section 105 to convert the chromosome into the switch information in the matching circuit 400. Moreover, in this embodiment, steps for the control section 105 to apply the varactor voltage to the matching circuit 102 based on a chromosome in the third embodiment (S1205, S1303) are replaced with a step for the control section 105 to turn on and off the switch in the matching circuit 400 based on the switch information corresponding to the chromosome. Moreover, in this embodiment, steps of obtaining the chromosome corresponding to the varactor voltage applied to the matching circuit 102 in the third embodiment (after S1803, S1809, S2003, S2009, and S2107) are replaced with a step of obtaining the chromosome corresponding to the switch information in the matching circuit 400.

Note herein that, it has been described that the matching circuit 400 has been provided with four loads in the serial variable load section 410 and the parallel variable load section 420, respectively, it is not limited to this. Needless to say, at least two or more loads may be provided. Moreover, it cannot be overemphasized that the numbers of the loads provided in the serial variable load section 410 and in the parallel variable load section 420 may not be the same. Naturally, the number of genes in the chromosome may be changed depending on the number of loads. Moreover, while one load has been allocated to one gene in the aforementioned description, it is needless to say that a pattern of association between the gene and the load is not limited to this. These can be said to all of the embodiments that use the matching circuit 400.

FIFTH EMBODIMENT

In a fifth embodiment, since the basic configuration of the mobile radio apparatus is similar to that in the first embodiment, FIG. 1 will be employed. However, since the matching circuit is similar to that in the fourth embodiment, FIG. 35 will be employed.

In the fifth embodiment, the initial parameter table for use situation is stored in the storage section 106. FIG. 36 is a diagram illustrating an example of the use condition initial parameter table. As shown in FIG. 36, a parameter expected to provide the impedance matching is registered in the initial parameter table for use situation, corresponding to the use situation. In each parameter, each bit indicates on/off of each switch in the matching circuit 400 like the fourth embodiment. That is, if an i-th bit is "0", an i-th switch turns off, while, if the i-th bit is "1", the i-th switch turns on.

Figure 37:
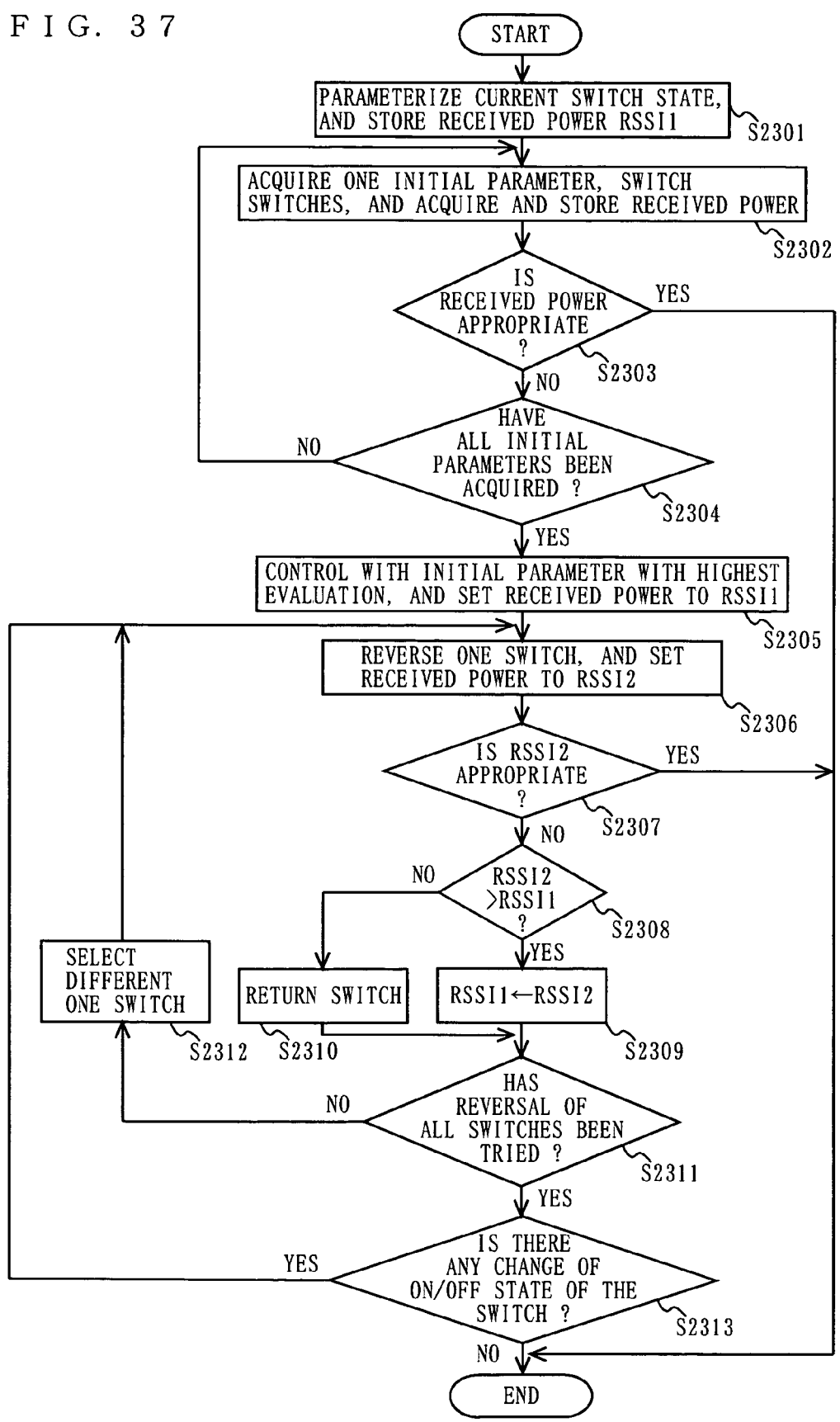
FIG. 37 is a flow chart illustrating the operation of the control section 105 in accordance with a fifth embodiment.

FIG. 37 is a flow chart illustrating the operation of the control section 105 in accordance with a fifth embodiment. Hereafter, the operation of the control section 105 in accordance with the fifth embodiment will be described with reference to FIG. 37. Incidentally, the operation shown in FIG. 37 is started at a timing similar to that in FIG. 4 according to the first embodiment.

First, the control section 105 parameterizes the current on/off state of the switch in the matching circuit 400, and stores the current received power as the received power RSSI1 in the storage section 106 in association with the obtained parameter (Step S2301).

Next, the control section 105 acquires one initial parameter from the initial parameter table for use situation to switch the switches in the matching circuit 400 based on the acquired initial parameter, and acquires the received power from the signal strength detecting section 103 to thereby store it in the storage section 106 in association with the acquired initial parameter (Step S2302).

Next, the control section 105 determines whether or not the received power acquired at Step S2302 is appropriate (Step S2303). The judgment criterion at Step S2303 is similar to that at Step S210 in FIG. 10. If the received power acquired at Step S2302 is appropriate, the control section 105 completes the processing. Meanwhile, if the received power acquired at Step S2302 is not appropriate, the control section 105 proceeds to operation at Step S2304.

At Step S2304, the control section 105 acquires all the initial parameters registered in the initial parameter table for use situation, and determines whether or not the received power is evaluated. If all of the initial parameters are acquired, the control section 105 returns to operation at Step S2302, and acquires the other initial parameter to evaluate the received power. Meanwhile, if all the initial parameters are acquired, the control section 105 proceeds to operation at Step S2305.

At Steps S2302 through S2304, the control section 105 evaluates the initial parameters (initial load value information) stored in the storage section 106, and if there is an initial parameter (initial load value information) for providing the impedance matching, it controls the matching circuit 400 so as to obtain the load value corresponding to this initial parameter (initial load value information). The processing at Steps S2302 through S2304 is called the initial control processing.

At Step S2305, the control section 105 recognizes the highest received power among the received powers stored at Steps S2301 and S2302, acquires the initial parameter corresponding to the recognized received power to control the matching circuit 400 using the acquired initial parameter, and sets the received power obtained by it to RSSI1.

Next, the control section 105 reverses any one switch in the matching circuit 400, and sets the received power obtained by it to RSSI2 (Step S2306). Incidentally, reversing the switch means switching on/off of the switch. However, if all the switches in the serial variable load section 410 are turned off by reversing one switch, the control section 105 decides not to reverse the switch.

Next, the control section 105 determines whether or not the received power RSSI2 is appropriate (Step S2307). The judgment criterion at Step S2307 is similar to that at Step S210 in FIG. 10. If the received power RSSI2 is appropriate, the control section 105 completes the processing. Meanwhile, if the received power RSSI2 is not appropriate, the control section 105 proceeds to operation at Step S2308.

At Step S2308, the control section 105 determines whether or not the received power RSSI2 is larger than the received power RSSI1. In other words, the control section 105 determines whether or not larger received power come to be obtained by reversing the switch. If RSSI2 is larger than RSSI1, the control section 105 replaces the value of RSSI1 with the value of RSSI2 (Step S2309), and proceeds to operation at Step S2311. Meanwhile, if RSSI2 is not larger than RSSI1, the control section 105 returns the switch reversed at Step S2306 (Step S2310), and proceeds to operation at Step S2311.

At Step S2311, the control section 105 determines whether or not all the switch have been tried to be reversed. If the reversals of all the switches has not been tried, the control section 105 selects one different switch to which the reversal has not been tried yet (Step S2312), returns to the operation at Step S2306 to reverse the selected switch, and continues the processing of evaluating the received power. Meanwhile, if the reversals of all the switches have been tried, the control section 105 proceeds to operation at Step S2313.

At Step S2313, the control section 105 determines whether or not the on/off state of the switch before trying to reverse the switch (before Step S2306), and the on/off state of the switch after trying to reverse all the switches (after Step S2311) are matched. If they are matched, it means that the received power larger than that before being reversed cannot be obtained even when all the switches are reversed, the control section 105 completes the processing. Meanwhile, if they are not matched, it means that the received power larger than that before being reversed could be obtained once all the switches are tried to be reversed. Hence, in this case, if the reversal of the switch is further tried, it means that larger received power may be obtained. Accordingly, if they are not matched, the control section 105 returns to the operation at Step S2306 to perform the reversal processing of the switch again.

In the initial control processing, if there is no initial parameter (initial load value information) for providing the impedance matching, the control section 105, while switching the switches so that the impedance matching may be obtained, derives information (matched load value information) on on/off of the optimal switch to control the matching circuit 102 at Steps S2305 through S2313. The processing at Steps S2305 through S2313 is called the matched load value deriving processing. Incidentally, Step S2305 is a starting point of the matched load value deriving processing.

As is understood, according to the fifth embodiment, if the change of the received power is detected, the control section 105 first switches the switches in the matching circuit 400 using the parameter stored in the initial parameter table for use situation. If there is an initial parameter which can provide the appropriate received power, the control section 105 switches the switches in the matching circuit 400 so as to correspond to this initial parameter to thereby match the impedance. Meanwhile, if there is no initial parameter which can provide the appropriate received power, the control section 105 selects an initial parameter which can provide the highest received power, and switches the switches in the matching circuit 400 so as to correspond to this parameter. Thereafter, the control section 105 finely adjusts the impedance of the matching circuit 400 while switching on/off of each switch, and makes it possible to obtain the optimal received power. Hence, the impedance of the matching circuit 400 can be changed to the appropriate value in a short time. As a result of this, since the impedance can be always controlled adaptively in various environments where the antenna is placed, a loss due to a mismatching loss can be reduced, so that the mobile radio apparatus which can always obtain the stable received power will be provided.

Incidentally, if the appropriate received power could be obtained in the middle of the processing shown in FIG. 37, the control section 105 may store a parameter corresponding to the switch state of the matching circuit 400, which could provide this received power, as the initial parameter in the storage section 106. Specifically, the control section 105 stores the parameter corresponding to the switch state of the matching circuit 400 in the storage section 106 after Steps S2303 and S2307 in FIG. 37. In this case, at Step S2302 in FIG. 37, the control section 105 may operate so as to select the newly stored initial parameter. The initial parameters are accumulated in the storage section 106 by the impedance adjustment being repeatedly performed by the control section 105. As a result of this, the mobile radio apparatus will accumulate the parameters suitable for the user by means of repeatedly performing the impedance matching. Accordingly, as the processing by the control section 105 is repeated performed, the time for impedance matching will be reduced.

SIXTH EMBODIMENT

In a sixth embodiment, since the basic configuration of the mobile radio apparatus is similar to that in the first embodiment, FIG. 1 will be employed. However, since the matching circuit is similar to that in the fourth embodiment, FIG. 35 will be employed.

Figures 38, 39:
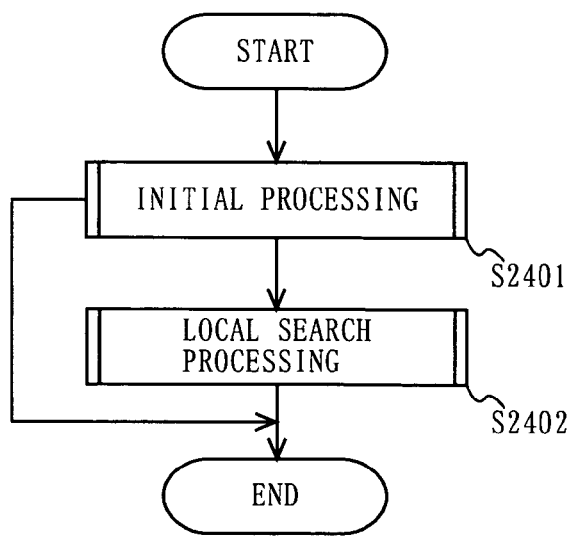
FIG. 38 is a diagram illustrating an example of the use situation initial chromosome table.
FIG. 39 is a flow chart illustrating an operation of a control section 105 in accordance with a sixth embodiment.

In the sixth embodiment, the use situation initial chromosome table is stored in the storage section 106. FIG. 38 is a diagram illustrating an example of the use condition initial chromosome table. As shown in FIG. 38, a chromosome expected to provide the impedance matching is registered in the initial chromosome table for use situation, corresponding to the use situation. In each initial chromosome, each gene indicates on/off of each switch in the matching circuit 400. That is, if an n-th gene is "0", an n-th switch turns off, while, if the n-th gene is "1", the n-th switch turns on.

FIG. 39 is a flow chart illustrating an operation of a control section 105 in accordance with a sixth embodiment. Hereafter, the operation of the control section 105 in accordance with the sixth embodiment will be described with reference to FIG. 39. The operation shown in FIG. 39 is started at a timing similar to that in FIG. 4 according to the first embodiment.

First, at Step S2401, the control section 105 switches the switches in the matching circuit 400 using the initial chromosome stored in the use situation initial chromosome table, and if there is an initial chromosome which can provide the appropriate received power, it controls the matching circuit 400 using this initial chromosome to complete the process. If there is no initial chromosome which can provide the appropriate received power, the control section 105 generates a new chromosome, while, if there is a chromosome which can provide the appropriate received power in the new chromosomes, it controls the matching circuit 400 using this chromosome to complete the process. Moreover, the control section 105 evolves the chromosome, and if there is a chromosome which can provide the appropriate received power in the evolved chromosomes, it controls the matching circuit 400 using this chromosome to complete the process. If there is no chromosome which can provide the appropriate received power also in the evolved chromosomes, the control section 105 proceeds to the local search processing at Step S2402 to finely adjust the impedance of the matching circuit 400.

At Step S2402, the control section 105 finely adjusts the switch state in the matching circuit 400 in which the switches are being switched by the chromosome determined that the received power thereof is the highest at Step S2401 to thereby obtain the more appropriate switch state, and then completes the process.

Figure 40:
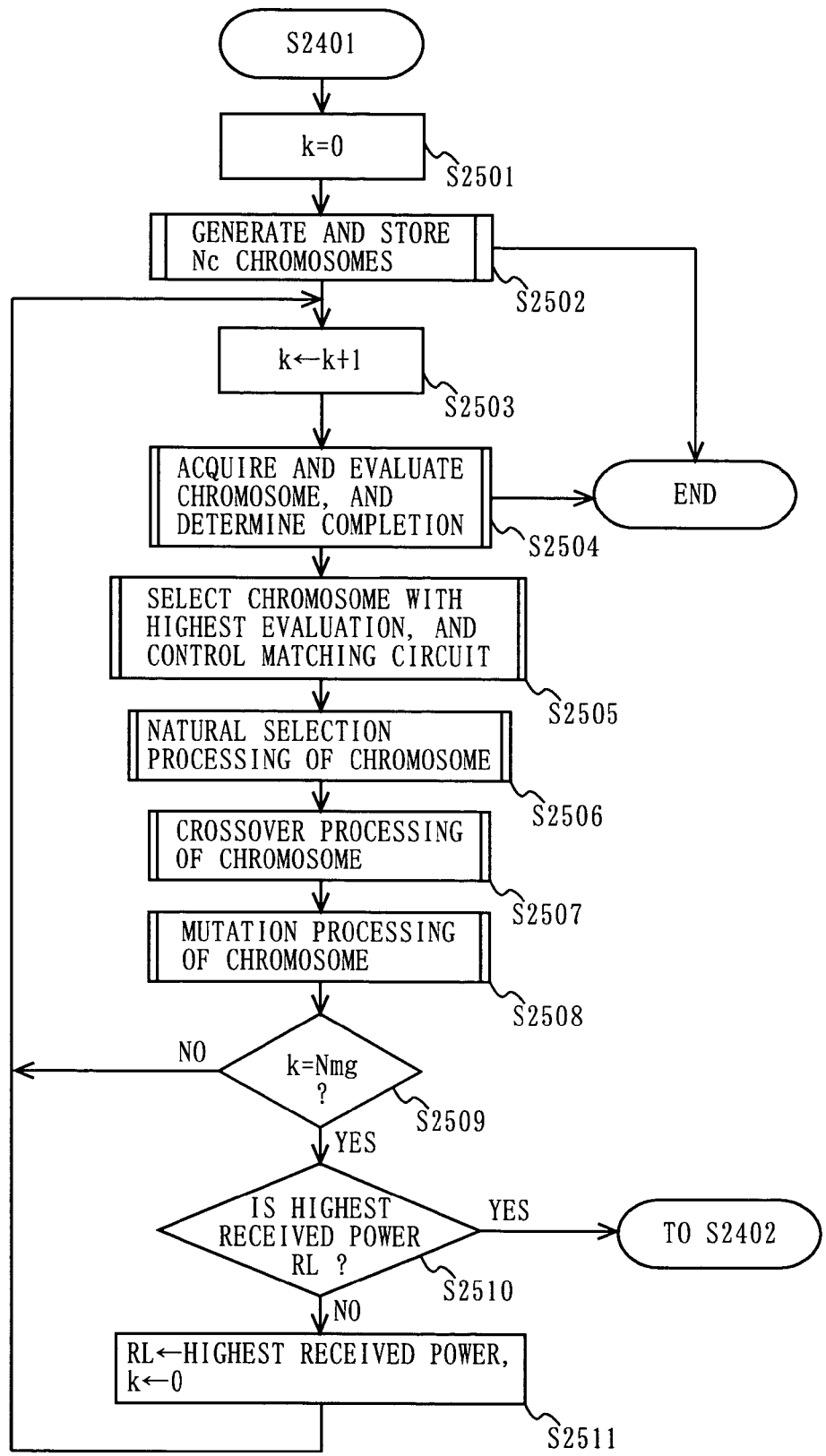
FIG. 40 is a flow chart illustrating the details of the operation of the control section 105 at Step S2401.

FIG. 40 is a flow chart illustrating the details of the operation of the control section 105 at Step S2401. Hereafter, the details of the operation of the control section 105 at Step S2401 will be described with reference to FIG. 40.

First, the control section 105 sets to k=0 as the initial setting (Step S2501).

Next, the control section 105 generates at random total Nc chromosomes including the initial chromosomes stored in the use situation initial chromosome table, and stores the generated chromosomes in the storage section 106 (Step S2502). At Step S2502, the control section 105 sets the highest received power as the end reference value RL.

Next, the control section 105 increments k by 1 (Step S2503).

Next, the control section 105 evaluates Nc chromosomes stored in the storage section 106 (Step S2504). At Step S2504, if there is a chromosome which can provide the appropriate received power, the control section 105 completes the processing. Meanwhile, at Step S2504, if there is no chromosome which can provide the appropriate received power, the control section 105 proceeds to operation at Step S2505.

At Step S2505, the control section 105 selects the chromosome which has obtained the highest evaluation in the evaluation at Step S2504, and controls the matching circuit 400 so that the switch state corresponding to the selected chromosome may be obtained.

Next, the control section 105 naturally selects the chromosome stored in the storage section 106 (Step S2506).

Since the method of natural selection is similar to that in the third embodiment, FIG. 26 will be employed.

Next, the control section 105 crosses over the chromosomes obtained by the natural selection at Step S2506 (Step S2507). Since the method of crossover is similar to that in third embodiment similar, FIG. 27 will be employed.

Next, the control section 105 mutates the chromosome obtained by the crossover at Step 2507 (Step S2508). Since the method of mutation is similar to that in the third embodiment, FIG. 28 will be employed.

Next, the control section 105 determines whether or not k is the upper limit generation number Nmg (Step S2509). If k is not the upper limit generation number Nmg, the control section 105 returns to the operation at Step S2503 to perform the evaluation of chromosomes of the next generation. Meanwhile, if k is the upper limit generation number Nmg, the control section 105 proceeds to operation at Step S2510.

At Step S2510, the control section 105 determines whether or not the highest received power is the same as the end reference value RL. If the highest received power is the same as the end reference power RL, the control section 105 proceeds to the local search processing (Step S2402). Meanwhile, if the highest received power is not the same as the end reference power RL, the control section 105 proceeds to operation at Step S2511.

At Step S2511, the control section 105 sets the highest received power to the end reference power RL, and sets k to 0 to then return to the operation at Step S2503.

In a manner described above, a chromosome with the highest received power among the chromosomes obtained resulting from evolving the chromosomes by the upper limit generation number will be selected.

Figure 41:
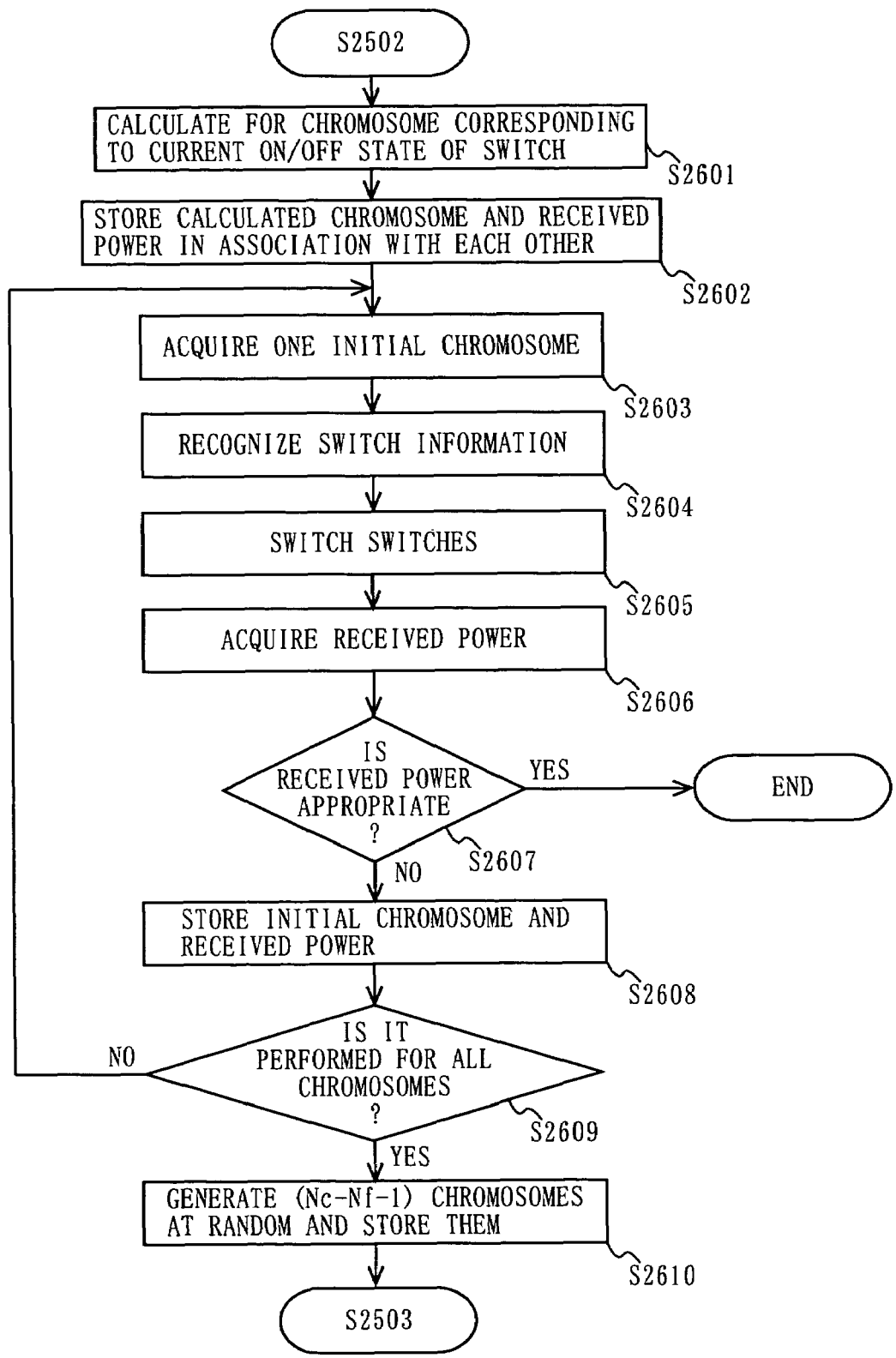
FIG. 41 is a flow chart illustrating the details of the operation of the control section 105 at Step S2502 in FIG. 40.

FIG. 41 is a flow chart illustrating the details of the operation of the control section 105 at Step S2502 in FIG. 40. Hereafter, the details of the operation of the control section 105 at Step S2502 in FIG. 40 will be described with reference to FIG. 41.

First, the control section 105 calculates for a chromosome corresponding to the current on/off state of the switch in the matching circuit 400 (Step S2601), and causes the storage section 106 to store the calculated chromosome and the current received power in association with each other (Step S2602).

Next, the control section 105 acquires one initial chromosome from the use situation initial chromosome table (Step S2603), recognizes the switch information of the matching circuit 400 corresponding to the acquired initial chromosome (Step S2604), and switches the switches in the matching circuit 400 based on the recognized switch information (Step S2605). Next, the control section 105 acquires the received power after switching the switches (Step S2606).

The control section 105 determines whether or not the received power acquired at Step S2506 is appropriate (Step S2607). The judgment criterion here is similar to that at Step S210 in FIG. 10. If the received power is appropriate, the control section 105 completes the processing. Meanwhile, if the received power is not appropriate, the control section 105 proceeds to operation at Step S2608.

At Step S2608, the control section 105 stores the initial chromosome and the received power corresponding to it in the storage section 106.

Next, the control section 105 determines whether or not the processing Step S2603 through S2608 has been performed for all the initial chromosomes registered in the use situation initial chromosome table (Step S2609). if the operation has not been performed for all the initial chromosomes, The control section 105 acquires different initial chromosome, and performs the operation at Step S2603. Meanwhile, if the operation has been performed for all the initial chromosomes, the control section 105 generates (Nc—Nf- 1) chromosomes at random to store them as the random chromosome in the storage section 106 (Step S2610), and proceeds to the processing at Step S2503. Here, Nf means the number of initial chromosomes registered in the use situation initial chromosome table.

At Steps S2602 through S2609, the control section 105 evaluates the initial parameters (initial load value information) stored in the storage section 106, and if there is an initial parameter (initial load value information) for providing the impedance matching, switches the switches so that the matching circuit 400 may have this load value corresponding to the initial parameter (initial load value information). The processing at Steps S2602 through S2609 is called the initial control processing.

The method of generating the chromosome at random at Step S2610 is similar to the method of generating the chromosome at random at Step S1129 in FIG. 23B. Thus, the chromosome corresponding to the switch state before the operation shown in FIG. 41 starts, the chromosome registered in the use situation initial chromosome table, and the chromosomes generated at random will be stored in the storage section 106.

Figure 42:
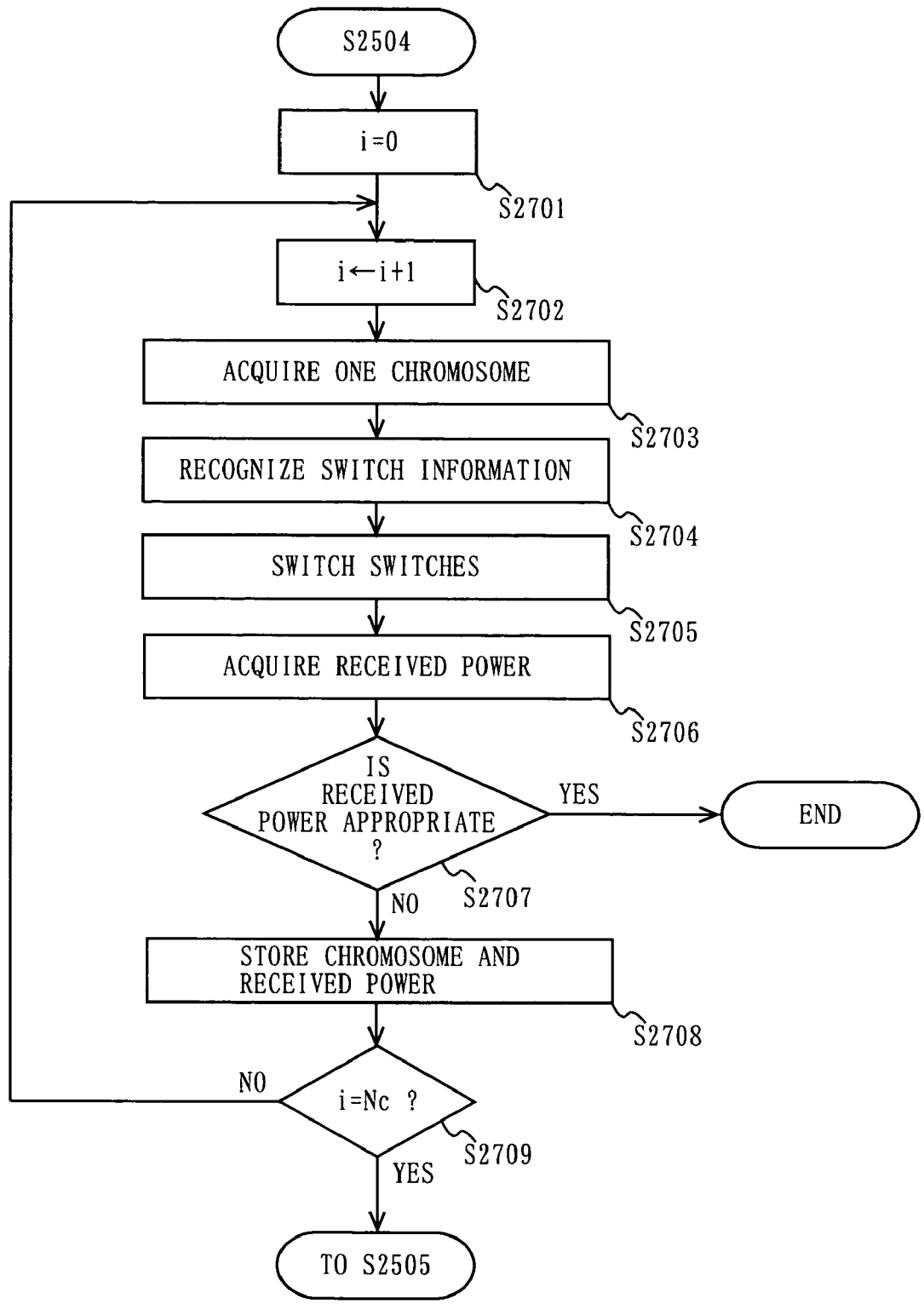
FIG. 42 is a flow chart illustrating the details of the operation of the control section 105 at Step S2504 in FIG. 40.

FIG. 42 is a flow chart illustrating the details of the operation of the control section 105 at Step S2504 in FIG. 40. Hereafter, the details of the operation of the control section 105 at Step S2504 in FIG. 40 will be described with reference to FIG. 42.

First, the control section 105 sets to i=0 as the initial setting (Step S2701).

Next, the control section 105 increments i by 1 (Step S2702).

Next, the control section 105 acquires one chromosome stored in the storage section 106 (Step S2703), recognizes the switch information corresponding to the acquired chromosome (Step S2704), and switches the switches in the matching circuit 400 based on the recognized switch information (Step S2705).

Next, the control section 105 acquires the received power obtained after reversing the switch (Step S2706), and determines whether or not the acquired received power is appropriate (Step S2707). The judgment criterion at Step S2707 is similar to that at Step S210 in FIG. 10.

If the received power is appropriate, the control section 105 completes the processing. Meanwhile, if the received power is not appropriate, the control section 105 causes the storage section 106 to store the chromosome acquired at Step S2703 and the received power acquired at Step S2706 in association with each other (Step S2708), and proceeds to operation at Step S2709.

At Step S2709, the control section 105 determines whether or not it is i=Nc, namely, the received power has been evaluated for all the chromosomes. If it is not i=Nc, the control section 105 returns to the operation at Step S2702 to continue evaluations of other chromosomes. Meanwhile, if it is i=Nc, the control section 105 proceeds to operation at Step S2505.

Thus, at Steps S2702 through 2709, the control section 105 evaluates the random chromosomes (random load value information), and if there is a random chromosome (random load value information) for providing the impedance matching, it controls the matching circuit 400 so that the load value corresponding to this random chromosome (random load value information) may be obtained. If there is no random chromosome (random load value information) for providing the impedance matching, the control section 105 proceeds to the processing after Step S2505, and derives a chromosome for providing the impedance matching (matched load value information), using the initial chromosome (initial load value information) and the random chromosome (random load value information).

Figure 43:
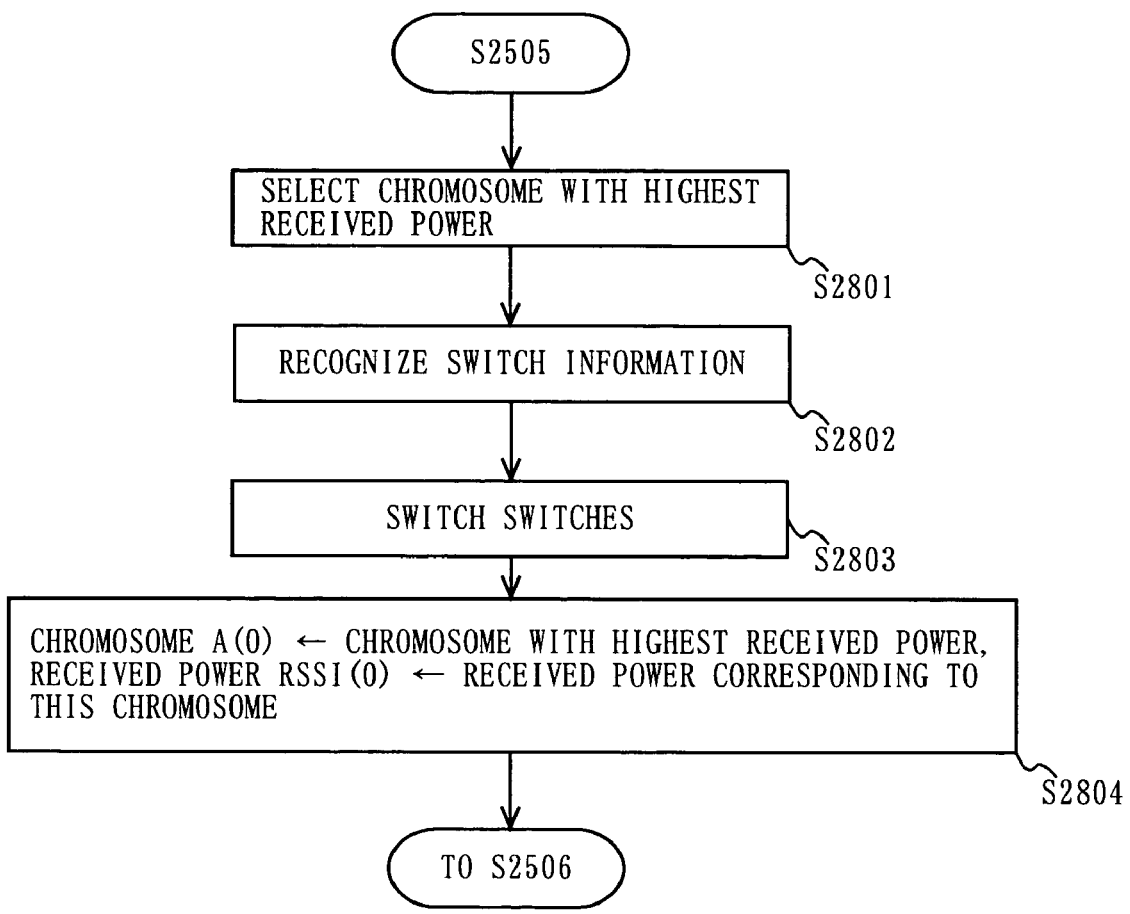
FIG. 43 is a flow chart illustrating the details of the operation of the control section 105 at Step S2505 in FIG. 40.

FIG. 43 is a flow chart illustrating the details of the operation of the control section 105 at Step S2505 in FIG. 40. Hereafter, the details of the operation of the control section 105 at Step S2505 in FIG. 40 will be described with reference to FIG. 43.

First, the control section 105 selects a chromosome with the highest received power among the received powers stored at Step S2708 in FIG. 42 (Step S2801). Next, the control section 105 recognizes the switch information of the selected chromosome (Step S2802), and switches the switches in the matching circuit 400 (Step S2803).

Next, the control section 105 stores the chromosome with the highest received power as the chromosome A(0), and the received power corresponding to this chromosome as RSSI (0) in the storage section 106 (Step S2804), and proceeds to operation at Step S2506. As a result of this, a chromosome considered to have the highest priority will be stored in the top of the array.

Figure 44:
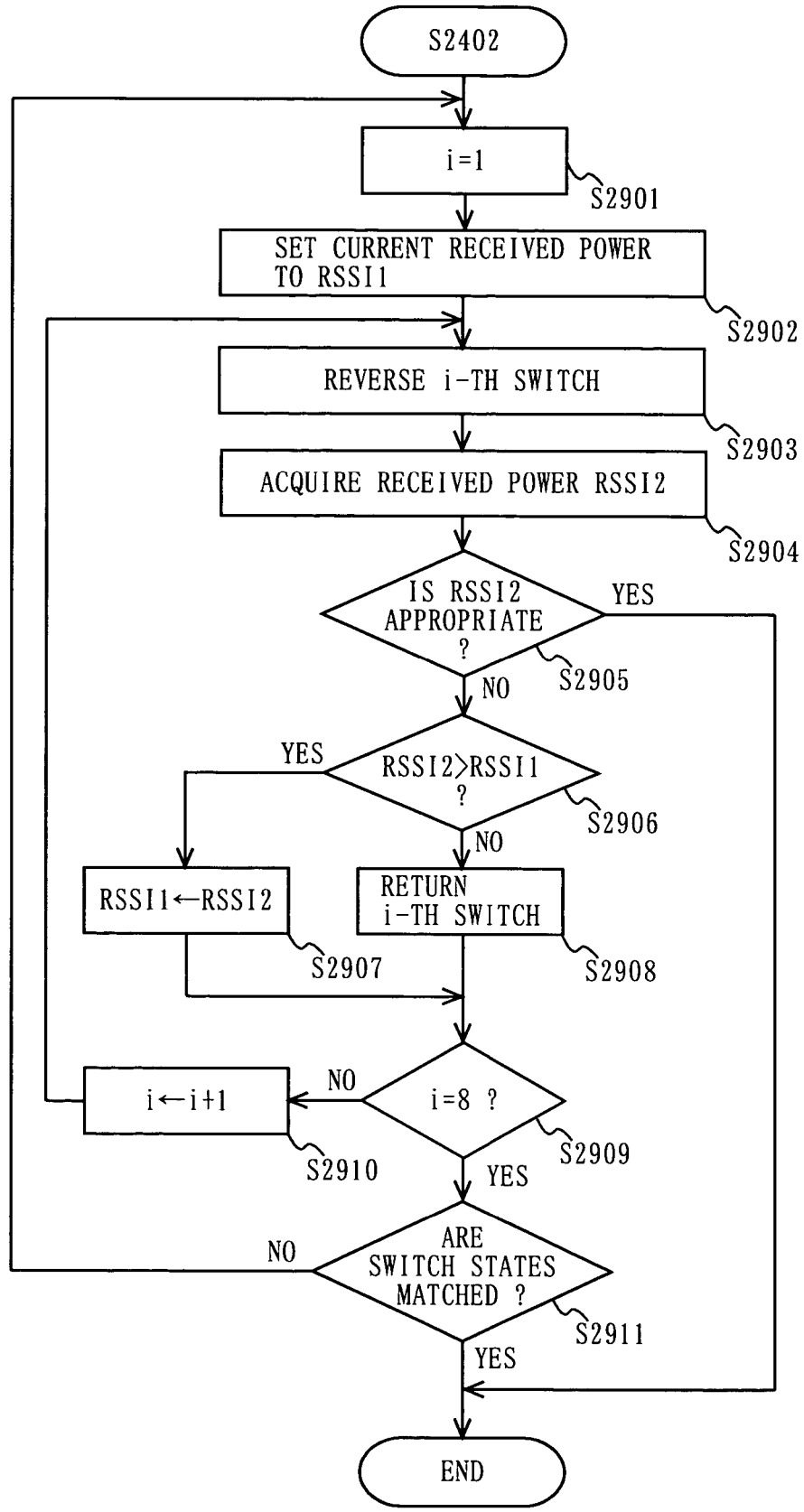
FIG. 44 is a flow chart illustrating the details of the operation of the control section 105 at Step S2402 in FIG. 39.

FIG. 44 is a flow chart illustrating the details of the operation of the control section 105 at Step S2402 in FIG. 39. Hereafter, the details of the operation of the control section 105 at Step S2402 in FIG. 40 will be described with reference to FIG. 44.

First, the control section 105 sets to i=1 as the initial setting (Step S2901). Next, the control section 105 sets the current received power to RSSI1 (Step S2902).

Next, the control section 105 reverses the situation of the i-th switch (Step S2903). However, if all the switches in the serial variable load section 410 are turned off, the control section 105 will not reverse the switch.

Next, the control section 105 acquires the received power, and sets the acquired received power to RSSI2 (Step S2904). Next, the control section 105 determines whether or not the received power RSSI2 is the appropriate received power (Step S2905). The judgment criterion at Step S2905 is similar to that at Step S210 in FIG. 10.

If the received power RSSI2 is appropriate, the control section 105 completes the processing. Meanwhile, if the received power RSSI2 is not appropriate, the control section 105 proceeds to operation at Step S2906.

The control section 105 determines at Step S2906 whether or not RSSI2 is larger than RSSI1. As a result, it will be determined whether or not the matching circuit 400 has been controlled so that the received power might be further increased by reversing the switch.

If RSSI2 is larger than RSSI1, the control section 105 replaces the value of RSSI1 with the value of RSSI2 (Step S2907), and proceeds to operation at Step S2909. Meanwhile, if RSSI2 is not larger than RSSI1, the control section 105 returns the i-th switch reversed at Step S2903 (Step S2908), and proceeds to operation at Step S2909.

At Step S2909, the control section 105 determines whether or not it is i=8. Incidentally, since the number of switches are eight, the judgment criterion of i=8 is used, whereas if the number of switches changes, naturally the judgment criterion will also change depending on it.

If it is not i=8, the control section 105 increments i by 1 (Step S2910), and returns to the operation at Step S2903 to perform the reversing processing to the other switch. Meanwhile, if it is i=8, the control section 105 determines whether or not the on/off state of the switch before trying to reverse the switch (at Step S2902), and the on/off state of the switch after trying to reverse all the switches are matched (Step S2911). If the situations are matched, the control section 105 completes the processing. Meanwhile, if the situations are not matched, the control section 105 returns to the operation at Step S2901.

If there is no initial chromosome (initial load value information) for providing the impedance matching in the initial control processing, the control section 105 derives a chromosome or switch information (matched load value information) for providing the impedance matching using the initial chromosome (initial load value information), and controls the matching circuit 400, in the processing after Step S2610. The processing after Step S2610 is called the matched load value deriving processing.

As is understood, according to the sixth embodiment, if the change of the received power is detected, the control section 105 first switches the switches in the matching circuit 400 using the chromosome stored in the use situation initial chromosome table. If there is an initial chromosome which can provide the appropriate received power, the control section 105 switches the switches in the matching circuit 400 so as to correspond to this initial chromosome to thereby match the impedance. Meanwhile, if there is no initial chromosome which can provide the appropriate received power, the control section 105 newly generates chromosomes at random, and determines whether or not there is a chromosome which can provide the appropriate received power. If there is a chromosome which can provide the appropriate received power, the control section 105 switches the switches in the matching circuit 400 so as to correspond to this chromosome to thereby match the impedance. Meanwhile, if there is no chromosome which can provide the appropriate received power, the control section 105 evolves a chromosome to obtain a new chromosome. If there is a chromosome which can provide the appropriate received power in the obtained chromosomes, the control section 105 switches the switches in the matching circuit 400 so as to correspond to this chromosome to thereby match the impedance. Meanwhile, if there is no chromosome which can provide the appropriate received power, the control section 105 selects a chromosome which can provide the highest received power, and switches the switches in the matching circuit 400 so as to correspond to this chromosome. Thereafter, the control section 105 finely adjusts the impedance of the matching circuit 400 while switching on/off of each switch, and makes it possible to obtain the optimal received power. Hence, the impedance of the matching circuit 400 can be changed to the appropriate value in a short time. As a result of this, since the impedance can be always controlled adaptively in various environments where the antenna is placed, a loss due to a mismatching loss can be reduced, so that the mobile radio apparatus which can always obtain the stable received power will be provided.

Incidentally, if the appropriate received power could be obtained in the middle of the processing shown in FIG. 39, the control section 105 may store a chromosome corresponding to the switch state of the matching circuit 400, which could provide this received power, as the initial chromosome in the storage section 106. Specifically, the control section 105 stores the chromosome corresponding to the switch state of the matching circuit 400 in the storage section 106 after Step S2607 in FIG. 41, and after Steps S2502 and S2504 in FIG. 40. In this case, at Step S2603 in FIG. 41, the control section 105 may operate so as also to select the newly stored initial chromosome. The initial chromosomes are accumulated in the storage section 106 by the impedance adjustment being repeatedly performed by the control section 105. As a result of this, the mobile radio apparatus will accumulate the parameters suitable for the user by means of repeatedly performing the impedance matching. Accordingly, as the processing by the control section 105 is repeated performed, the time for impedance matching will be reduced. Note herein that, in the sixth embodiment, the processing in FIG. 41 for evaluating the initial chromosome, and the processing in FIG. 42 for evaluating the chromosome will overlap in part in the first generation. This overlapped processing may be omitted in FIG. 42.

Incidentally, at the matched load value deriving processing in the first through the sixth embodiments, the matched load value information is derived by repeatedly changing the load value of the matching circuit.

SEVENTH EMBODIMENT

In a seventh embodiment, since the basic configuration of the mobile radio apparatus is similar to that in the first embodiment, FIG. 1 will be employed. Meanwhile, since the matching circuit is similar to that in the first embodiment, FIG. 2 will be employed. Note herein that, in the third embodiment, since the use situation initial chromosome table is not used, the storage section 106 do not store the use situation initial chromosome table.

Since the operation of the control section 105 in the seventh embodiment is similar to the operation of the control section 105 in accordance with the third embodiment, FIG. 22 through FIG. 34 will be employed. However, in the seventh embodiment, the processing is started by generating the initial chromosomes at random, without using the chromosome expected to provide the matching in the use situation.

Hereafter, the operation of the control section 105 in accordance with the seventh embodiment will be described focusing on a different point from the third embodiment.

The points that the third embodiment is different from the seventh embodiment are the processing details at Step S1102 in FIG. 23A. In the seventh embodiment, Nc chromosomes are generated at random at Step S1102.

Incidentally, also in the seventh embodiment, it is needless to say that if the appropriate received power could be obtained, the chromosome at that time may be registered in the initial chromosome table as the initial chromosome. In this case, when starting the processing in FIG. 22, the control section 105 may perform the processing using the newly registered initial chromosome. Thus, as the processing by the control section 105 is repeated performed, the time for impedance matching will be reduced.

EIGHTH EMBODIMENT

In an eighth embodiment, since the basic configuration of the mobile radio apparatus is similar to that in the first embodiment, FIG. 1 will be employed. Meanwhile, since the matching circuit is similar to that in the third embodiment, FIG. 35 will be employed.

Since the operation of the control section 105 in the eighth embodiment is similar to the operation of the control section 105 in accordance with the sixth embodiment, except for the procedure for generating Nc chromosomes at first, FIG. 39, FIG. 40, and FIG. 42 through FIG. 44 will be employed. While it has been described that the chromosome expected to provide the matching in the use situation has been used in the sixth embodiment, it is different in the eighth embodiment in that the chromosome expected to provide the matching in the use situation is not used.

Hereafter, the operation of the control section 105 in accordance with the eighth embodiment will be described focusing on a different point from the sixth embodiment.

The sixth embodiment is different from the eighth embodiment in that whether or not the use situation initial chromosome table is used in generating Nc chromosomes at Step S2502 in FIG. 40. In the eighth embodiment, when generating Nc chromosomes at Step S2502, Nc chromosomes are all generated at random, without using the use situation initial chromosome table. Specifically, the processing at Step S2502 in the eighth embodiment replaces the processing at Step S1102 in FIG. 23. By performing the processing at Step S1102 in FIG. 23, the control section 105 will generate Nc chromosomes at random to then store them in the storage section 106. Other processing is similar to that in the sixth embodiment.

Thus, in the eighth embodiment, since the initial chromosome table is not used, a matching parameter for various environments where the antenna is placed may not be stored as preliminary knowledge, thus making it possible to reduce the storage capacity.

Incidentally, also in the eighth embodiment, it is needless to say that if the appropriate received power could be obtained, the chromosome at that time may be registered in the initial chromosome table as the initial chromosome. In this case, when starting the processing in FIG. 39, the control section 105 may perform the processing using the newly registered initial chromosome. Thus, as the processing by the control section 105 is repeated performed, the time for impedance matching will be reduced.

NINTH EMBODIMENT

The mobile radio apparatus in accordance with the ninth embodiment is a mobile radio apparatus provided with the two or more antennas, and can perform diversity and impedance adaptive matching.

Figure 45:
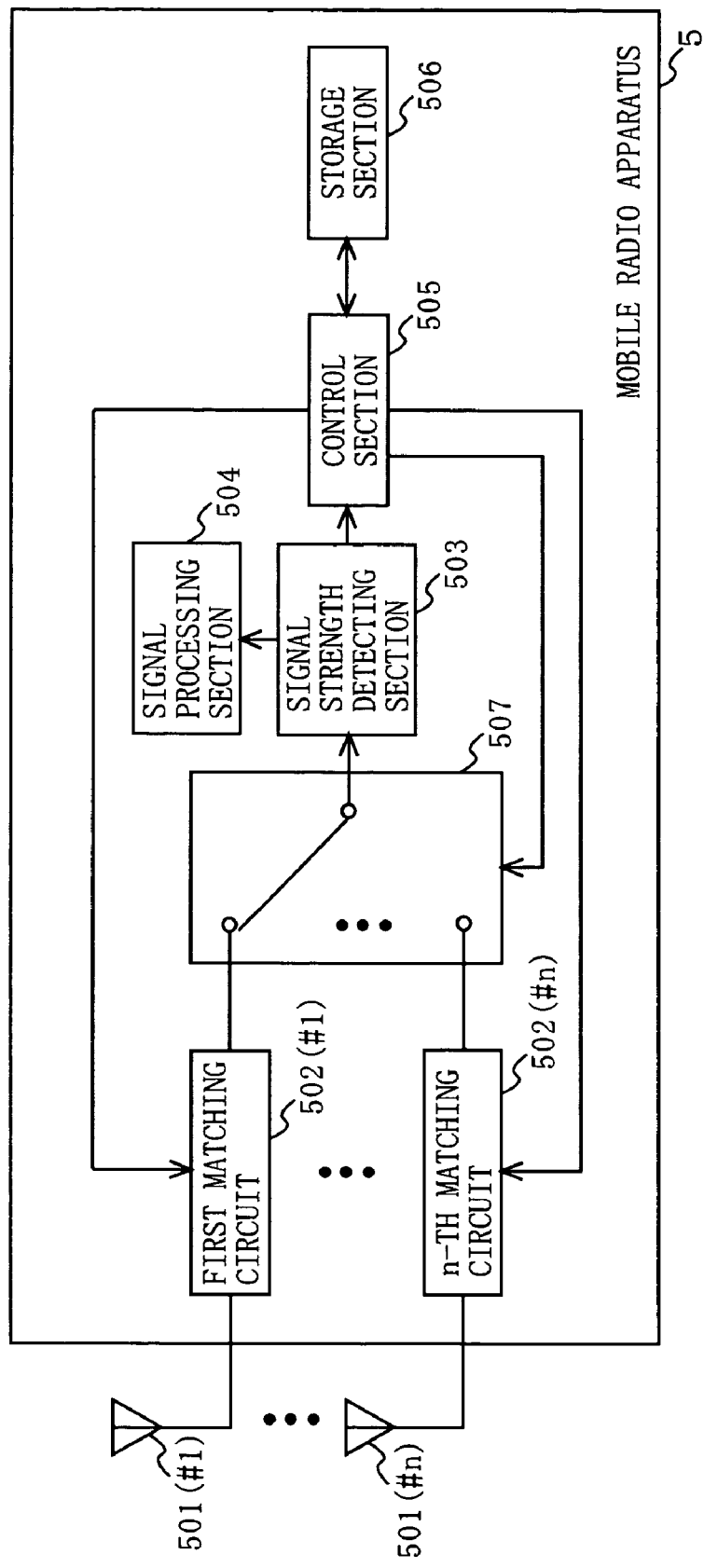
FIG. 45 is a block diagram illustrating a configuration of a mobile radio apparatus 5 in accordance with a ninth embodiment.

FIG. 45 is a block diagram illustrating a configuration of a mobile radio apparatus 5 in accordance with a ninth embodiment. In FIG. 45, the mobile radio apparatus 5 is provided with a first through n-th antennas 501 (#1) through 501 (#n), a first through n-th matching circuits 502 (#1) through 502 (#n), a switch circuit 507, a signal strength detecting section 503, a signal processing section 504, a control section 505, and a storage section 506.

The first through n-th matching circuits 502 (#1) through 502 (#n) are circuits which can change the impedance according to instructions from the control section 505. For example, the first through n-th matching circuits 502 (#1) through 502 (#n) are the matching circuit 102 shown in FIG. 2, and the matching circuit 400 shown in FIG. 35.

Depending on the instructions from the control section 505, the switch circuit 507 switches so that any one matching circuit among the first through n-th matching circuits 502 (#1) through 502 (#n) and the signal strength detecting section 503 may be electrically connected with each other.

The signal strength detecting section 503 sends a reception signal sent through any one of the antennas 501, any one of the matching circuits 502, and the switch circuit 507, to the signal processing section 504, and detects the received power to send it to the control section 505. The received power calculated for is the average value like the first embodiment.

The signal processing section 504 processes the received signal to be sent.

The control section 505 controls the switch circuit 507, in order to send the signal from the antenna which can obtain the highest received power, to the signal processing section 504. The control section 505 controls the impedance of the matching circuit 502 electrically connected to the signal strength detecting section 503 through the switch circuit 507.

The storage section 506 stores information required for the impedance control by the control section 505.

Figure 46:
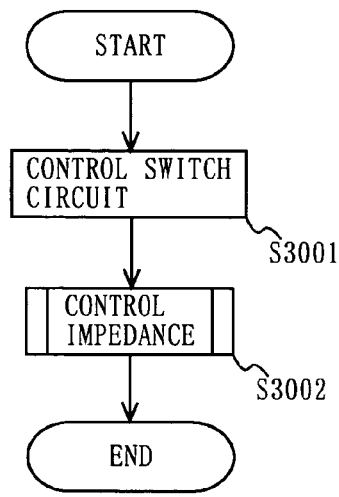
FIG. 46 is a flow chart illustrating an operation of a control section 505 in accordance with the ninth embodiment.

FIG. 46 is a flow chart illustrating an operation of a control section 505 in accordance with the ninth embodiment.

The processing shown in FIG. 46 is triggered by the received power being dropped, and the received power being a predetermined threshold or less. First, the control section 505 controls the switch circuit 507 so as to select the antenna 501 which can obtain the highest received power (Step S3001). Next, the control section 505 adjusts the impedance of the matching circuit 502 connected to the selected antenna 501 (Step S3002), and completes the process. The processing at Step S3002 is either of the control processing of the impedance shown in either of the first through eighth embodiments.

As is understood, in the ninth embodiment, the antenna which can provide the appropriate received power is selected, and the impedance for matching with the selected antenna is further adjusted by the control section. Hence, the time for impedance matching will be reduced.

Incidentally, in the ninth embodiment, if the antenna environment changes and the received power is deteriorated after completing the operation at Step S3002 to adaptively matching the impedance, the control section 505 will start the operation at Step S3001 again, and switch the antennas to adaptively match the impedance. However, while controlling the impedance at Step S3002, the control section 505 may switch the antennas. For example, in the middle of the processing at Step S3002, the control section 505 may periodically switches the antennas to investigate the antenna with high received power. If the antenna with high received power is found, the control section 505 returns to the operation at Step S3001 to switch to the new antenna, and may control the impedance of the matching circuit corresponding to the new antenna at Step S3002.

Incidentally, in the ninth embodiment, while the different matching circuits are provided for respective antennas, a common matching circuit may be used. In this case, the switch circuit may be provided between the antenna and the common matching circuit. Thus, mounting areas will be reduced.

Incidentally, since the processing in the first through ninth embodiments can be combined as variously as possible, examples of the processing combination are not limited to the aforementioned example.

TENTH EMBODIMENT

In the first through ninth embodiments, the impedance matching on the receiving side has been described. The impedance matching method according to the present invention may also be used for the impedance matching on the transmitting side. In the tenth embodiment, the impedance matching on the transmitting side will be described.

Figure 47A:
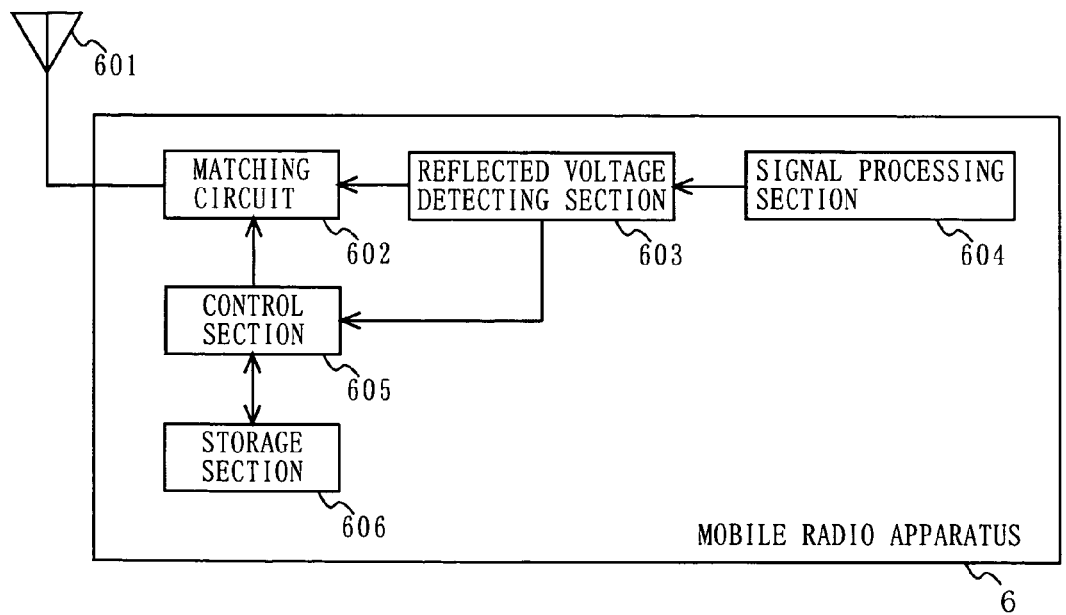
FIG. 47A is a block diagram illustrating a configuration of a mobile radio apparatus 6 in accordance with a tenth embodiment.

FIG. 47A is a block diagram illustrating a configuration of a mobile radio apparatus 6 in accordance with a tenth embodiment. In FIG. 47A, the mobile radio apparatus 6 is provided with an antenna 601, a matching circuit 602, a reflected voltage detecting section 603, a signal processing section 604, a control section 605, and a storage section 606.

A transmission signal generated in the signal processing section 604 is radiated from the antenna 601 through the reflected voltage detecting section 603 and the matching circuit 602. The reflected voltage detecting section 603 detects a reflected voltage of the transmission signal, and transmits the detected reflected voltage to the control section 605. The matching circuit 602 a circuit which can change the impedance according to instructions from the control section 605. For example, the matching circuit 602 is the matching circuit 102 shown in FIG. 2, or the matching circuit 400 shown in FIG. 35. The storage section 606 stores information required for the impedance control by the control section 605.

The control section 605 controls the impedance of the matching circuit 400 so that the reflected voltage may be reduced according to the reflected voltage provided from the reflected voltage detecting section 603. The control method of the impedance applies to either of the first through the eighth embodiments.

Specifically, at Steps of storing the received power in the first through eighth embodiments (S204, S211, S212, S221, S305, S406, S801, S806, S807, S1208, S1407, S2301, S2302, S2602, S2608, S2708), the control section 605 stores the reflected voltage.

In the first through eighth embodiments, at Steps of acquiring the received power (S209, S219, S304, S804, S904, S910, S919, S925, S1206, S1802, S1808, S2002, S2008, S2302, S2608, S2706, S2902, S2904), the control section 605 acquires the reflected voltage.

In the first through eighth embodiments, at Steps for determining whether or not the received power is appropriate (S210, S220, S805, S905, S911, S920, S926, S1207, S1803, S1809, S2003, S2009, S2303, S2307, S2607, S2707, S2905), the control section 605 determines whether or not the reflected voltage is appropriate. If the acquired reflected voltage is equal to the reflected voltage at the time of matching when the impedance has matched before the change, or more the control section 605 determines that the reflected voltage is appropriate. In addition to that, if the acquired reflected voltage is larger than the reflected voltage when the impedance changes by a predetermined amount or more, the control section 605 determines that the acquired reflected voltage is appropriate. Moreover, if the acquired reflected voltage is larger than a certain predetermined threshold, the control section 605 may determine that the reflected voltage is appropriate. The judgment criterion of the reflected voltage is not limited to the aforementioned judgment criterion.

At Steps of using the largest received power in the first through eighth embodiments (S214, S302, S702, S1110, S1111, S1301, S1304, 1305, S1402, S2210, S2211, S2305, S2510, S2511, S2801, S2804, S2805), the control section 605 uses the smallest reflected voltage.

At steps of comparing the received power in the first through eighth embodiments (S906, S912, S921, S927, S1804, S1810, S2004, S2010, S2308, S2906), the control section 605 performs a branch determination based on a determination that a smaller reflected voltage provides the impedance matching.

In addition to that, the control section 605 is to use the reflected voltage at Steps of using the received power in the first through eighth embodiments.

Since it is shown that the smaller the reflected voltage is, the further the impedance is matched, the selection probability p(i) used for a difference in natural selection of the chromosome will be given by Equation (7).

$$p(j) = \frac{\frac{1}{RSSI(j)}}{\sum_{i=0}^{Nc} \frac{1}{RSSI(i)}}$$ (Equation 7)

A chromosome with small reflected voltage will be preferentially selected by using the selection probability p(i) shown by Equation (7).

Incidentally, the mobile radio apparatus 6 may be provided with a VSWR (Voltage Standing Wave Ratio) detector instead of the reflected voltage detecting section 603. In this case, the control section 605 performs the control according to the first through eighth embodiments so that VSWR may become small.

As is understood, according to the tenth embodiment, since the impedance matching is performed in accordance with the first through the eighth embodiments, the impedance is always controlled adaptively in various environments where the antenna is placed, and a loss due to a mismatching loss can also be reduced, so that the mobile radio apparatus which can always obtain the stable transmission power will be provided.

Incidentally, it is needless to say that the present invention may be applied even to the mobile radio apparatus provided with both the transmitting section and the receiving section. Both FIG. 47B and FIG. 47C are block diagrams illustrating configurations of mobile radio apparatuses 7 and 8 provided with both of a transmitting section and a receiving section.

Figure 47B:
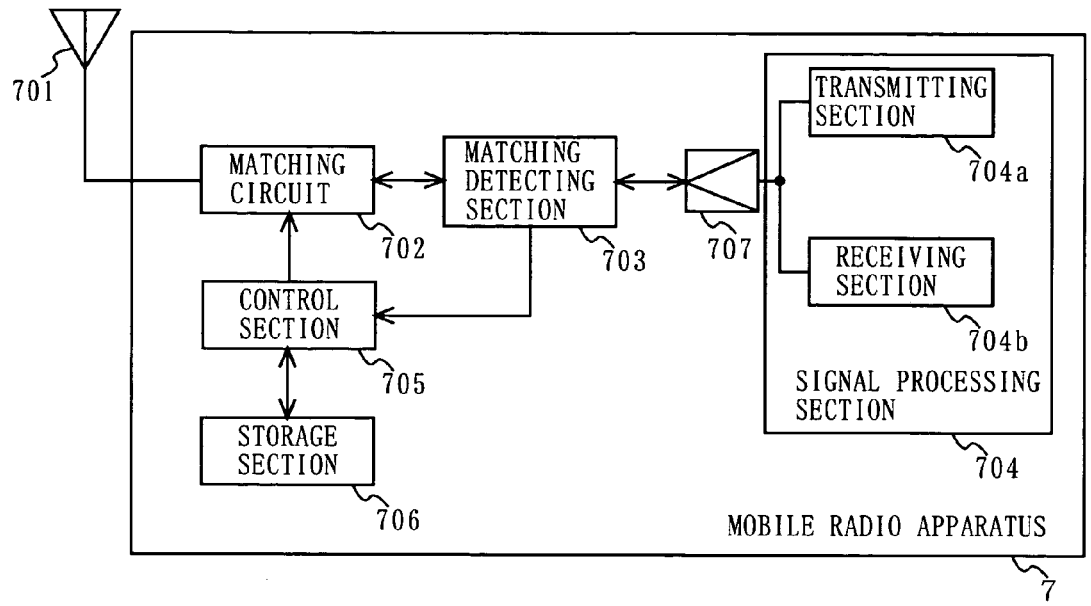
FIG. 47B is a block diagram illustrating a configuration of mobile radio apparatuses 7 and 8 provided with both a transmitting section and a receiving section.

In FIG. 47B, the mobile radio apparatus 7 is provided with an antenna 701, a matching circuit 702, a matching detecting section 703, a signal processing section 704, a control section 705, a storage section 706, and a shared unit 707. The signal processing section 704 includes a transmitting section 704a and a receiving section 704b. In the mobile radio apparatus 7, the matching detecting section 703 detects reflected power of the transmission signal or a receiving voltage of the received signal, namely, information for indicating an impedance matching rate, and transmits it to the control section 705. Upon reception of a radio signal, the control section 705 performs one of the processing shown in either of the first through eighth embodiments to thereby adjust the impedance of the matching circuit 702. Upon transmission of the radio signal, the control section 705 operates like the control section 605 shown in FIG. 47A to thereby adjust the impedance of the matching circuit 702. Thus, the impedance matching between the signal processing section 704 and the antenna 701 is obtained.

Figure 47C:
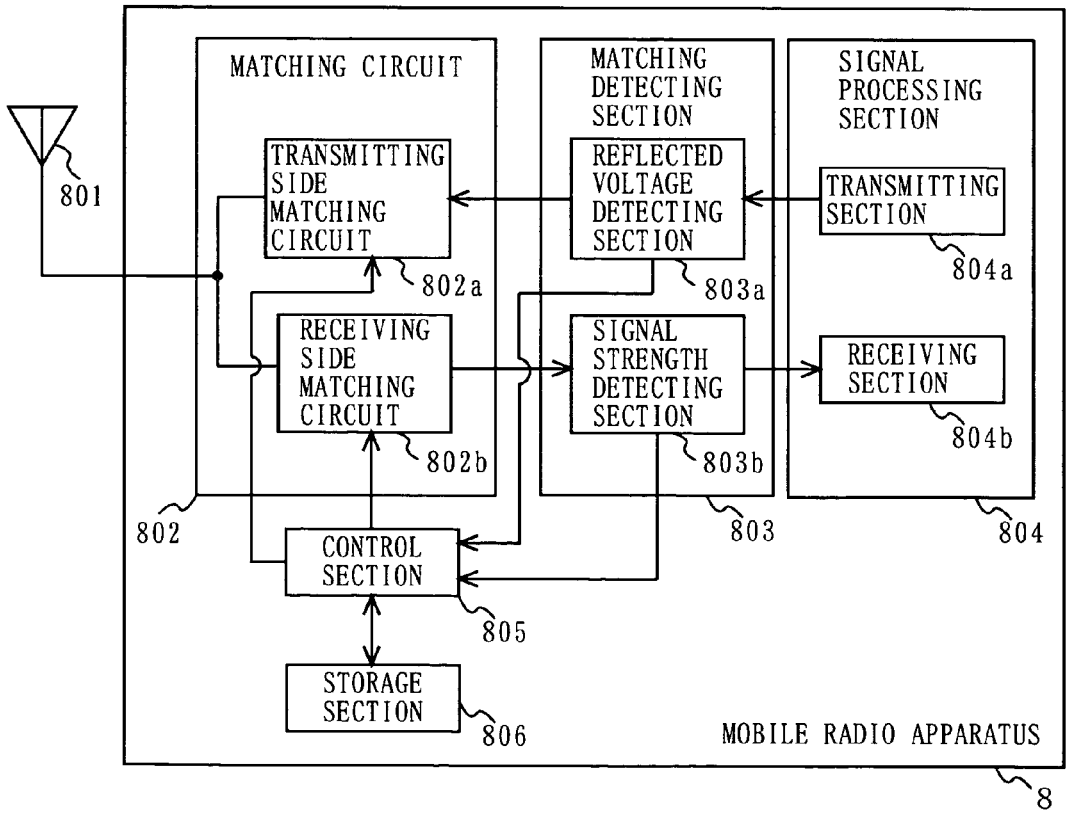
FIG. 47C is a block diagram illustrating the configuration of mobile radio apparatuses 7 and 8 provided with both the transmitting section and the receiving section.

In FIG. 47C, the mobile radio apparatus 8 is provided with an antenna 801, a matching circuit 802, a matching detecting section 803, a signal processing section 804, a control section 805, and a storage section 806. The signal processing section 804 includes a transmitting section 804a and a receiving section 804b. The matching detecting section 803 detects the information for indicating the impedance matching rate, and includes, for example, a reflected voltage detecting section 803a and a signal strength detecting section 803b. The reflected voltage detecting section 803a detects the reflected voltage of the transmission signal, and transmits it to the control section 805. The signal strength detecting section 803b detects the received power of the received signal, and transmits it to the control section 805. The matching circuit 802 includes a transmitting side matching circuit 802a, and a receiving side matching circuit 802b. The transmitting side matching circuit 802a has a variable load, and provides the impedance matching between the transmitting section 804a and the antenna 801. The receiving side matching circuit 802b has a variable load, and provides the impedance matching between the receiving section 804a and the antenna 801. Upon reception of the radio signal, the control section 805 performs one of the processing shown in either of the first through eighth embodiments to thereby adjust the impedance of the matching circuit 802b. Upon transmission of the radio signal, the control section 805 operates like the control section 605 shown in FIG. 47A to thereby adjust the impedance of the matching circuit 802a. Thus, the matching circuit 802 provides the impedance matching between the signal processing section 804 and the antenna 801.

Note herein that, also in the aforementioned embodiment, the mobile radio apparatus may have a diversity configuration like the ninth embodiment. The control section may select an antenna with smaller reflected voltage at a time of transmission.

ELEVENTH EMBODIMENT

Figures 48, 49:
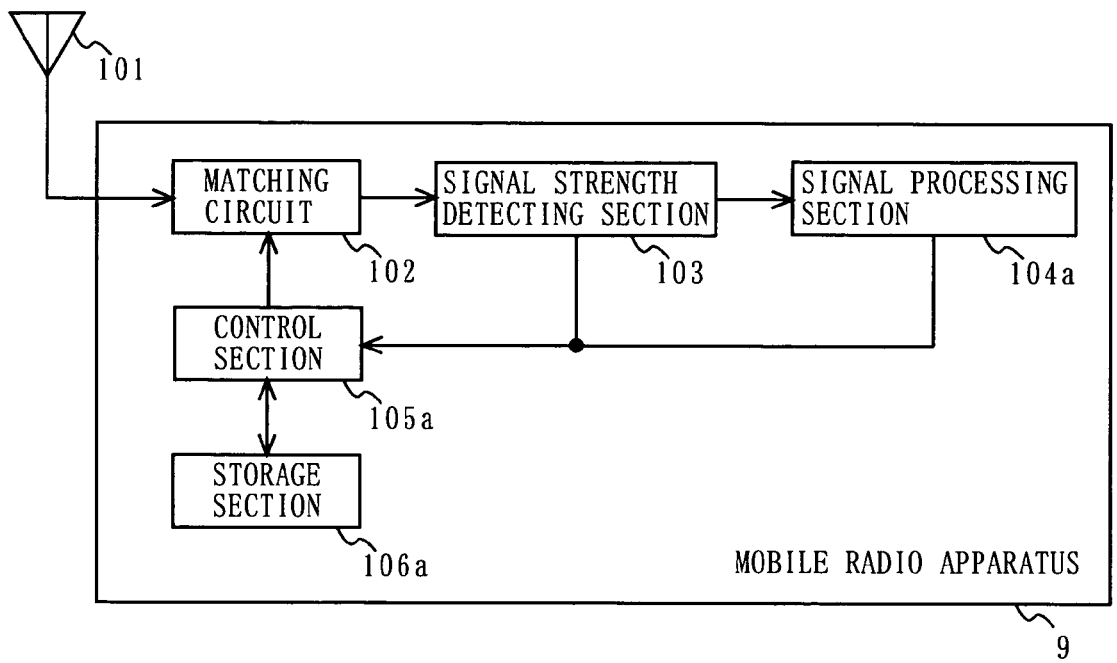
FIG. 48 is a block diagram illustrating a configuration of a mobile radio apparatus 9 in accordance with an eleventh embodiment of the present invention.
FIG. 49 is a diagram illustrating an example of an initial load value table of the use situation for mobile phone function.

FIG. 48 is a block diagram illustrating a configuration of a mobile radio apparatus 9 in accordance with an eleventh embodiment of the present invention. In FIG. 48, the mobile radio apparatus 9 is provided with an antenna 101, a matching circuit 102, a signal strength detecting section 103, a signal processing section 104a, a control section 105a, and a storage section 106a.

A signal received by the antenna 101 is sent to the signal processing section 104a through the matching circuit 102 and the signal strength detecting section 103 to be subjected to the signal processing. The matching circuit 102 has a variable load value. The signal strength detecting section 103 detects an electric power (received power) of the received signal, and transmits the detected received power to the control section 105a. The signal processing section 104a performs the signal processing of the signal received by the antenna 101, and also transmits to the control section 105a what function (for example, a mobile phone function, digital television (DTV), radio LAN) is to be used. The control section 105a controls the load value of the matching circuit 102 in accordance with the function to be used, in order to further increase the received power. The control section 105a may be implemented by a dedicated microprocessor, or may be implemented by a general purpose CPU which can read and perform a program product stored in the storage section 106a. The storage section 106a stores the information on the load value of the matching circuit 102 as the initial load value information, corresponding to the use situation of the mobile radio apparatus 9.

Since the block configuration of the matching circuit 102 is similar to that of the first embodiment, FIG. 2 will be employed.

In the eleventh embodiment, the storage section 106a stores in advance the varactor voltage expected to provide the impedance matching, as the initial load information corresponding to the typical use situation, in a typical use situation of the mobile radio apparatus 9. Hereinafter, a table in which the initial load value information and the typical use situation are associated with each other will be called initial load value table of the use situation. In the eleventh embodiment, for arrays representing the initial load value table of the use situation, it is assumed that an array for the mobile phone function is A(i), for DTV is AD(i), and for radio LAN is AW(i) (i is an integer).

In the eleventh embodiment, the varactor voltages 206 and 207 which can provide more appropriate impedance matching will be determined.

FIG. 49 is a diagram illustrating an example of an initial load value table of the use condition for mobile phone function. As the typical use condition of the mobile radio apparatus 9, there are, for example, a situation where there is the mobile phone in a free space apart from a human body, a situation where when the mobile phone is used during call, and a situation when using a mail function of the mobile phone. In FIG. 49, the initial load values A(1), A(2), and A(3) are defined corresponding to these use situations.

FIG. 50 is a diagram illustrating an example of the initial load value table of the use condition for DTV. As the typical use condition of the mobile radio apparatus 9, there are, for example, a situation when there is the mobile phone in a free space apart from a human body, a situation when the mobile phone is used with a single hand, a situation when the mobile phone is used with both hands, and a situation when the mobile phone is used while being put on a desk. In FIG. 50, the initial load values AD(1), AD(2), AD(3), and AD(4) are defined corresponding to these use situations.

FIG. 51 is a diagram illustrating an example of the initial load value table of the use condition for radio LAN. As the typical use condition of the mobile radio apparatus 9, there are, for example, a situation when there is the mobile phone in a free space apart from a human body, a situation when the mobile phone is used with a single hand, a situation when the mobile phone is used with both hands. In FIG. 51, the initial load values AW(1), AW(2), and AW(3) are defined corresponding to these use situations.

The storage section 106a has a writable area, corresponding to the load value used for controlling the matching circuit 102, for storing the received power when using this load value. A table stored in this area will be called a load value received power table. For arrays representing the load value received power table, it is assumed that an array for the mobile phone function is B(i), for DTV is BD(i), and for radio LAN is BW(i).

The storage section 106a has a writable area, corresponding to the load value after natural selection, for storing the received power when using this load value. A table stored in this area will be called a load value received power table after natural selection. For arrays representing the load value received power table after natural selection, it is assumed that an array for the mobile phone function is C(i), for DTV is CD(i), and for radio LAN is CW(i).

The storage section 106a has a writable area for storing the load value after crossover. A table stored in this area will be called a load value table after crossover. For arrays representing the load value table after crossover, it is assumed that an array for the mobile phone function is D(i), for DTV is DD(i), and for radio LAN is DW(i).

The storage section 106a has a writable area for storing the load value after mutation. A table stored in this area will be called a load value table after mutation. For arrays representing the load value table after mutation, it is assumed that an array for the mobile phone function is E(i), for DTV is ED(i), and for radio LAN is EW(i).

Incidentally, the areas for storing the aforementioned tables may be partially overlapped with each other, or may be overwritten with the overlapped area. Moreover, each table may be overwritten for every generation, or may newly be created for every generation.

There will be described a method taking a case as an example, where the load value A "varactor voltage 206: 1.7 V, varactor voltage 207: 2.3V", and the load value B "varactor voltage 206: 1.5 V, varactor voltage 207: 1.0 V" are crossed over.

Load values generated by the crossover between the load value A and the load value B will be defined as Ax and Bx, respectively. A difference L1 of the varactor voltage 206 between the load value A and the load value B is calculated for like Equation (8).

$$L1=|1.7-1.5| \qquad \text{Equation (8)}$$

A difference L2 of the varactor voltage 207 between the load value A and the load value B is calculated for like Equation (9).

$$L2=|2.3-1.0| \qquad \text{Equation (9)}$$

One half of the difference L1 is added to the smaller one of the varactor voltages 206 of the load value A and the load value B like Equation (10), and the resulting value is set as the varactor voltage 206 of the load value Ax.

$$\text{Varactor voltage 206 of load value } Ax=1.5+(L1)/2 \qquad \text{Equation (10)}$$

A quarter of the difference L1 is added to a smaller one of the varactor voltages 206 of load value A and load value B like Equation (11), and the resulting value is set as the varactor voltage 206 of the load value Bx.

$$\text{Varactor voltage 206 of load value } Bx=1.5+(L1)/4 \qquad \text{Equation (11)}$$

One half of the difference L2 is added to the smaller one of the varactor voltages 207 of the load value A and the load value B like Equation (12), and the resulting value is set as the varactor voltage 207 of the load value Ax.

$$\text{Varactor voltage 207 of load value } Ax=1.0+(L2)/2 \qquad \text{Equation (12)}$$

A quarter of the difference L2 is added to a smaller one of the varactor voltages 207 of load value A and load value B like Equation (13), and the resulting value is set as the varactor voltage 207 of the load value Bx.

$$\text{Varactor voltage 207 of load value } Bx=1.0+(L2)/4 \qquad \text{Equation (13)}$$

Where, round off to the second decimal point.

There will be described a method of mutation taking a case as an example, where the load value Ax "varactor voltage 206: 1.6 V, varactor voltage 207: 1.65 V". A load value generated by the mutation of load value Ax will be defined as Axx. The varactor voltages 206 and 207 of the load value Ax are changed at random to thereby generate the load value Axx.

Next, the operation of the mobile radio apparatus 9 in accordance with the eleventh embodiment will be described.

First, as a precondition, supposing that the signal strength detecting section 103 always detect the received power, and always transmit the detected received power to the control section 105a. The control section 105a averages the received power transmitted from the signal strength detecting section 103. Hereafter, when it is simply called the received power, it means the received power averaged by the control section 105a.

Moreover, supposing that when the function to be used is changed, the signal processing section 104a transmits its information to the control section 105a.

For example, it is supposed that, at first, the mobile radio apparatus 9 is used for the call, and the antenna 101 and the signal processing section 104a are matched in a free space. Let the received power at that time be a received power RSSIA in matching. It is supposed that the mobile radio apparatus 9 is used for radio LAN thereafter, and the antenna 101 closes to a human body, so that the received power is changed from the received power RSSIA in matching to RSSIB (hereinafter, referred to as received power RSSIB in change) to be a small value.

The control section 105a always determines whether or not the received power transmitted from the signal strength detecting section 103 became small. As described above, when the received power is changed from the received power RSSIA in matching to the received power RSSIB in change, the control section 105a acquires the varactor voltages 206 and 207 which can further increase the received power, and controls the matching circuit 102 based on the acquired load value.

Figures 52, 53:
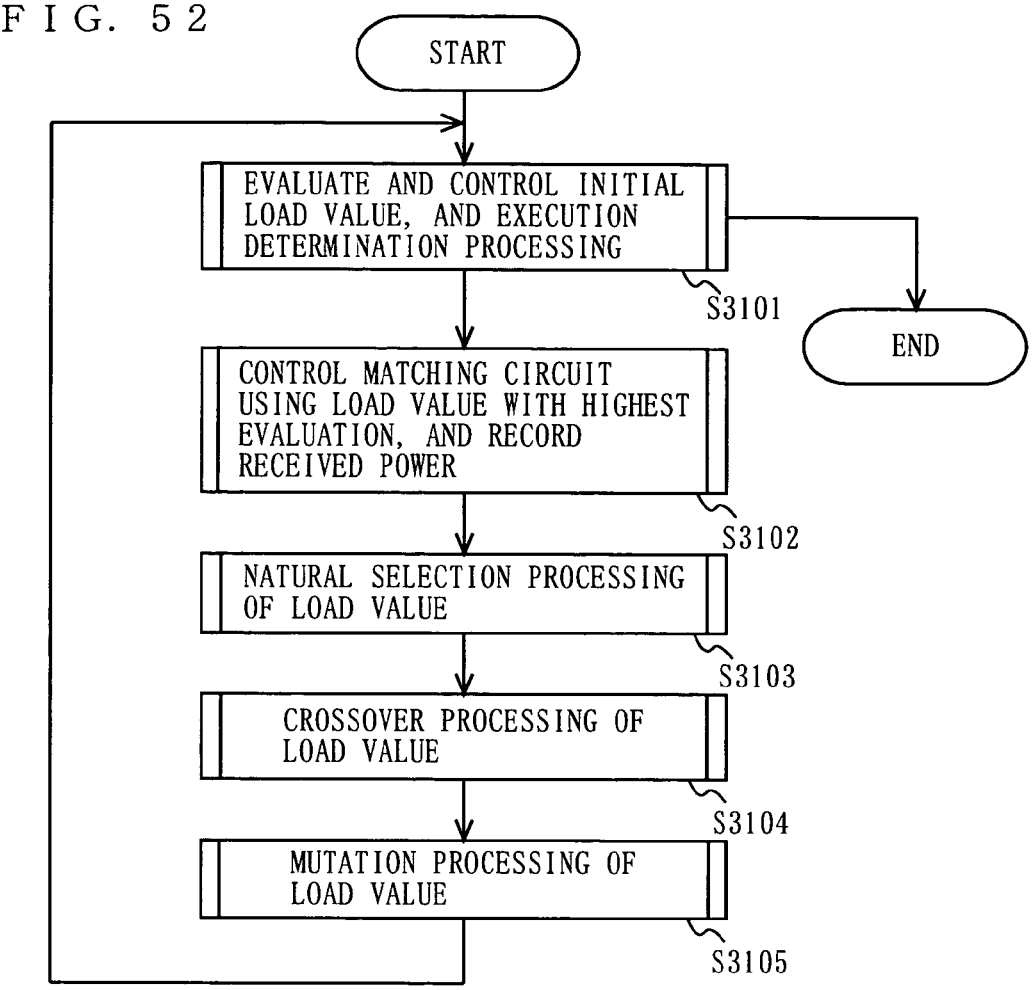
FIG. 52 is a flow chart illustrating an operation of a control section 105a in accordance with the eleventh embodiment.
FIG. 53 is a diagram illustrating an example of a load value received power table for radio LAN.

FIG. 52 is a flow chart illustrating an operation of a control section 105a in accordance with the eleventh embodiment. Hereafter, the operation of control section 105a will be described with reference to FIG. 52. The operation shown in FIG. 52 is triggered by the received power detected by the signal strength detecting section 103 being reduced. Note herein that, the operation shown in FIG. 52 may be triggered by the received power detected by the signal strength detecting section 103 being smaller than a threshold. Moreover, the operation shown in FIG. 52 may be started when the received power becomes small in more than a certain constant range.

First, at Step S3101 in the first generation, the control section 105a controls the matching circuit 102 using all the load value defined in the initial load value table of the use situation with reference to the initial load value table of the use situation for radio LAN stored in the storage section 106a, and determines whether or not there is a load value which can provide the appropriate received power. When using all the load values defined in the initial load value table of the use situation for radio LAN, the control section 105a stores the received power obtained from the signal strength detecting section 103 and the used load value in storage section 106a in association with each other. If there is the appropriate load value, the control section 105a completes the processing. Meanwhile, if there is no appropriate load value, the control section 105a proceeds to operations after Step S3102. Since the processing at Step S3101 is the processing for determining whether or not the evaluation and the control of the load value are performed, it is called the load value evaluation/control execution determining processing.

Next, at Step S3102, the control section 105a applies a bias voltage corresponding to a load value which has obtained the highest evaluation (received power) at Step S3101, to the matching circuit 102, and stores the received power obtained from the signal strength detecting section 103 and the used load value in storage section 106a in association with each other.

The load value received power table for radio LAN will be completed by the operation at Steps S3101 and S3102. FIG. 53 is a diagram illustrating an example of a load value received power table for radio LAN. As shown in FIG. 53, in the load value received power table, the load value and the received power are registered in association with each other. The load value received power table shown in FIG. 53 is a table created by the first generation. Since the load values BW(2), BW(3), and BW(4) are the load values registered at Step S3101, they are the same as initial load values AW(1), AW(2), and AW(3), respectively. The load value BW(1) is the load value registered at Step S3102, and serves as a load value which could obtain the highest received power among the initial load values AW(1), AW(2), and AW(3). Herein, it is assumed that the load value BW(1) is the same as the initial load value AW(1). Hence, the received powers RSSI1 and RSSI2 have the same value. It is supposed that the received power corresponding to the load value BW(i) is RSSI(i).

The reason for controlling the matching circuit using the load value with the highest received power at Step S3102 is to obtain the highest received power at a present stage for the time being. Moreover, the reason that the load value with the highest received power is stored in the storage section 106a at Step S3102 is to increase the probability that the superior load value will be selected in the case of the control.

Next, at Step S3103, the control section 105a naturally selects the load values by selecting a load value considered to have a high evaluation to some extent among the load values registered in the load value received power table. The control section 105a stores the load value after natural selection, and the received power when using it in the storage section 106a to thereby create a load value received power table after natural selection for radio LAN.

FIG. 54 is a diagram illustrating an example of the load value received power table for radio LAN after natural selection. As can be seen from comparing FIG. 53 with FIG. 54, by the natural selection at Step S3103, the load value BW(1) and BW(4) in the load value received power table are selected once, the load value BW(2) is selected twice, the load values CW(1), CW(2), and CW(3) and CW(4) are registered in the load value received power table after natural selection.

Next, at Step S3104, the control section 105a crosses over the load values registered in the load value received power table after natural selection, and registers the load values after the crossover as the load value table after crossover.

FIG. 55 is a diagram illustrating an example of the load value table after crossover. As can be seen from comparing FIG. 54 with FIG. 55, A load value CW(3) and a chromosome CW(4) are crossed over by the crossover at Step S3104, and a load value DW(3) and a load value DW(4) are registered in the load value table after crossover. Incidentally, a load value CW(1) and a load value CW(2) are registered in the load value table after crossover as the load values DW(1) and the DW(2) as they are, without being crossed over.

Next, at Step S3105, the control section 105a mutates the load value registered in the load value table after crossover, and registers the load value after the mutation as the load value table after mutation.

FIG. 56 is a diagram illustrating an example of the load value table after mutation. As can be seen from comparing FIG. 55 with FIG. 56, by the mutation at Step S3105, the load value DW(1) has been mutated and is registered as the load value EW(1). Incidentally, the load values DW(2), DW(3), and DW(4) are registered as the load values EW(2), EW(3), and EW(4) as they are, without being mutated.

After Step S3105, the control section 105a returns to the operation at Step S3101 to perform the processing after the second generation. In the processing after the second generation, the control section 105a controls the matching circuit 102, at Step S3101, not using the load value registered in the initial load value table of the use situation, but using all the load values registered in a load value table after mutation obtained at Step S3105, and determines whether or not there is a load value which can provide the appropriate received power. Also at Step S3102 after the second generation, the control section 105a stores the received power obtained from the signal strength detecting section 103 and the used load value in storage section 106a in association with each other. If there is the appropriate load value, the control section 105a completes the processing. Meanwhile, if there is no appropriate load value, the control section 105a proceeds to operation at Step S3102.

At Step S3102 after the second generation, the control section 105a applies the bias voltage corresponding to the load value which has obtained the highest evaluation at Step S3101 to the matching circuit 102, and stores the received power obtained from the signal strength detecting section 103, and the used the load value in the storage section 106a in association with each other.

The load value received power table after the second generation will be completed by the operation at Steps S3101 and S3102. FIG. 57 is a diagram illustrating an example of the load value received power table after the second generation. As shown in FIG. 57, the load values BW(2), BW(3), BW(4), and BW(5) are the load values registered at Step S3101, and are the same as the load values EW(1), EW(2), EW(3), and EW(4) in the load value table after mutation. The load value BW(1) is the load value registered at Step S3102, and is the load value which could obtain the highest received power in the load values EW(1), EW(2), EW(3), and EW(4). Herein, it is assumed that the load value BW(1) is the same as the load value BW(4). Hence, the received powers RSSI5 and RSSI8 have the same value.

Next, at Step S3103 after the second generation, the control section 105a naturally selects the load values registered in the load value received power table, selects a load value considered to have a high evaluation to some extent, and generates the load value received power table after natural selection. The number of the load value to be selected may be the same as the first generation, or may be different.

Next, at Step S3104 after the second generation, the control section 105a crosses the load values registered in the load value received power table after natural selection, and registers the load values after the crossover in the load value table after crossover.

Next, at Step S3105 after the second generation, the control section 105a mutates the load value registered in the load value table after crossover, and registers the load value after the mutation in the load value table after mutation.

Subsequently, the control section 105a returns to the operation at Step S3101 to evaluate the received power using the load values registered in the load value table after mutation, and if there is an appropriate load value, completes the processing, while, if there is no appropriate load value, repeats the operation for generating the load value for the next generation. Since this appropriate load value is of the information on the load value from which the impedance matching is obtained by the matching circuit 102, it is called the matched load value information. When it is determined at Step S3101 that the chromosome exceeds a predetermined generation number, the control section 105a controls the matching circuit 102 using the load value with the highest evaluation among the load values currently obtained, and then completes the process.

Figure 58:
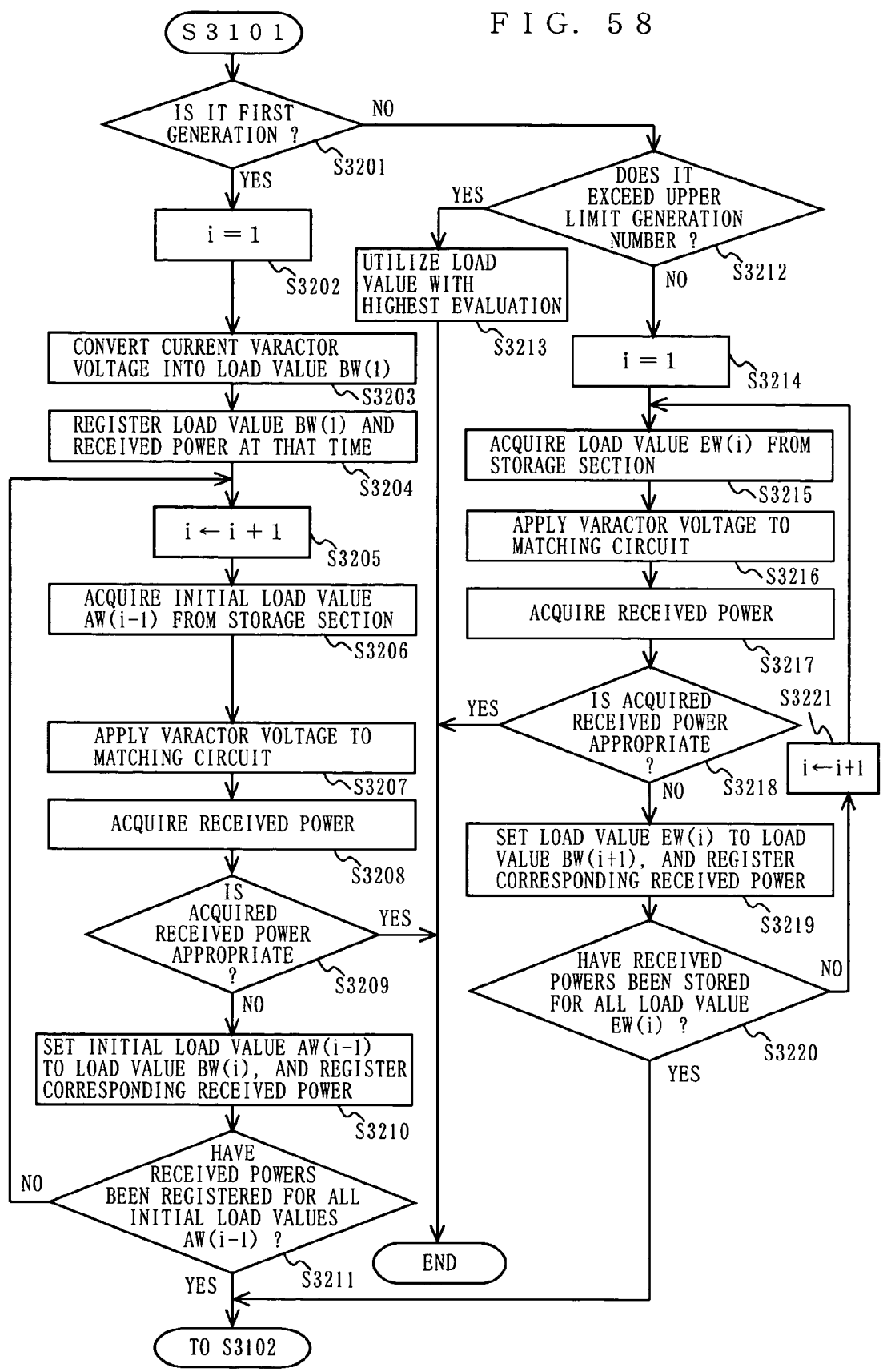
FIG. 58 is a flow chart illustrating details of the operation of the control section 105a at Step S3101.

FIG. 58 is a flow chart illustrating details of the operation of the control section 105a at Step S3101. Hereafter, the operation of the control section 105a at Step S3101 will be described with reference to FIG. 58.

First, the control section 105a determines whether or not the load value is the first generation (Step S3201). Incidentally, the generation number is managed by being stored in the storage section 106a whenever the load value changes the generation.

If the load value is the first generation, the control section 105a initializes as i=1 (Step S3202). If the load value is not the first generation, the control section 105a proceeds to operation at Step S3212.

After Step S3202, the control section 105a sets the varactor voltage currently provided to the matching circuit 102 as the load value BW(1) (Step S3203). Next, the control section 105a obtains the received power when using the load value BW(1) from the signal strength detecting section 103, and registers it in the load value received power table in association with the load value BW(1) (Step S3204). Note herein that, when the load value and the received power are newly registered in the load value received power table at Step S3204, the control section 105a is to clear the old load value received power table prior to it. However, if the load value received power table is managed so that the generation number may be identified, it is not necessary to clear the load value received power table at Step S3204.

Next, the control section 105a increments i by 1 (Step S3205), and acquires the initial load value AW(i−1) from the initial load value table of the use situation in the storage section 106a (Step S3206).

Next, the control section 105a applies the varactor voltage to the matching circuit 102 based on the acquired initial load value AW(i−1) (Step S3207).

Next, the control section 105a acquires the received power from the signal strength detecting section 103 (Step S3208), and determines whether or not the acquired received power is the appropriate received power (Step S3209).

At Step S3209, for example, if the received power acquired at Step S3208 is equal to the received power RSSIA in matching or more, the control section 105a determines that the received power acquired at Step S3208 is appropriate. In addition to that, the control section 105a may determine whether or not the received power acquired at Step S3208 is appropriate using the following judgment criteria. For example, if the received power acquired at Step S3208 is larger than the received power RSSIA at the time of change by a predetermined amount, the control section 105a may determine that the received power acquired at Step S3208 is appropriate. Moreover, if the received power acquired at Step S3208 is larger than a certain predetermined threshold, the control section 105a may determine that the received power acquired at Step S3208 is appropriate. The judgment criterion at Step S3209 is not limited to the aforementioned judgment criterion.

If it is determined at Step S3209 that the received power is appropriate, the control section 105a completes the processing, and continues applying the varactor voltage which can provide this received power to the matching circuit 102. Meanwhile, if it is determined that the received power is not appropriate, the control section 105a proceeds to operation at Step S3210.

At Step S3210, the control section 105a stores the initial load value AW(i−1) as the load value BW(i) in the storage section 106a, along with the received power corresponding to the initial load value AW(i−1), and registers it in the load value received power table.

After Step S3210, the control section 105a determines whether or not the received power is stored for all the initial load value AW(i−1). If it is not stored, the control section 105a returns to the operation at Step S3205. If it is stored, the control section 105a proceeds to operation at Step S3102. Thus, in the first generation, the varactor voltage when the operation at Step S3101 is just started is registered as the load value BW(1), and all the initial load values AW(i) are registered as load value BW(i+1) in association with the received power.

At Steps S3206 through S3211, the control section 105a evaluates the initial load values stored in the storage section 106a, and if there is an initial load value for providing the impedance matching, applies the varactor voltage corresponding to this initial load value to the matching circuit 102 so that the matching circuit 102 may have this initial load value. The processing at Steps S3206 through S3211 is called the initial control processing.

At Step S3212, the control section 105a determines whether or not it exceeds the upper limit of the generation number. If it exceeds the upper limit of the generation number, the control section 105a controls the matching circuit 102 using the load value that obtains the largest received power with reference to the load value received power table (Step S3213), and completes the processing. Note herein that, at Step S3102, since the control section 105a controls the matching circuit 102 using the load value with the highest evaluation, the operation at Step S3213 is not indispensable.

Meanwhile, at Step S3212, if it does not exceed the upper limit of the generation number, the control section 105a proceeds to operation at Step S3214 to initialize as i=1.

After Step S3214, the control section 105a acquires the load value EW(i) with reference to the load value table after mutation stored in the storage section 106a (Step S3215). Next, the control section 105a applies this varactor voltage to the matching circuit 102 based on the load value EW(i) (Step S3216).

Next, the control section 105a acquires the received power from the signal strength detecting section 103 (Step S3217), and determines whether or not the acquired received power is appropriate (Step S3218). The concrete judgment criterion at Step S3218 is similar to that at Step S3209. If the received power is appropriate, the control section 105a applies the varactor voltage which can provide this received power to the matching circuit 102. Since the varactor voltage which can provide the appropriate received power is of the information on the load value of the matching circuit 102 from which the impedance matching is obtained, it is called the matched load value information. Meanwhile, if it is determined that the received power is not appropriate, the control section 105a proceeds to operation at Step S3219.

At Step S3219, the control section 105a sets the load value EW(i) as the load value BW(i+1), caused the storage section 106a to store the corresponding received power, and registers it in the load value received power table. Next, the control section 105a determines whether or not the received power is stored for all the load values EW(i) (Step S3220). If the received power is stored for all the load values EW(i), the control section 105a proceeds to operation at Step S3102.

Meanwhile, if the received power is not stored for all the load values EW(i), the control section 105a increments i by 1 (Step S3221), and returns to the operation at Step S3215. Thus, in the second generation or subsequent ones, the load value EW(i) registered in the load value table after mutation is registered as the load value BW (i+1) in association with the received power. Note herein that, when the load value and the received power are newly registered in the load value received power table at Step S3219, the control section 105a is to clear the old load value received power table prior to it. However, if the load value received power table is managed so that the generation number may be identified, it is not necessary to clear the load value received power table at Step S3219.

Figure 59:
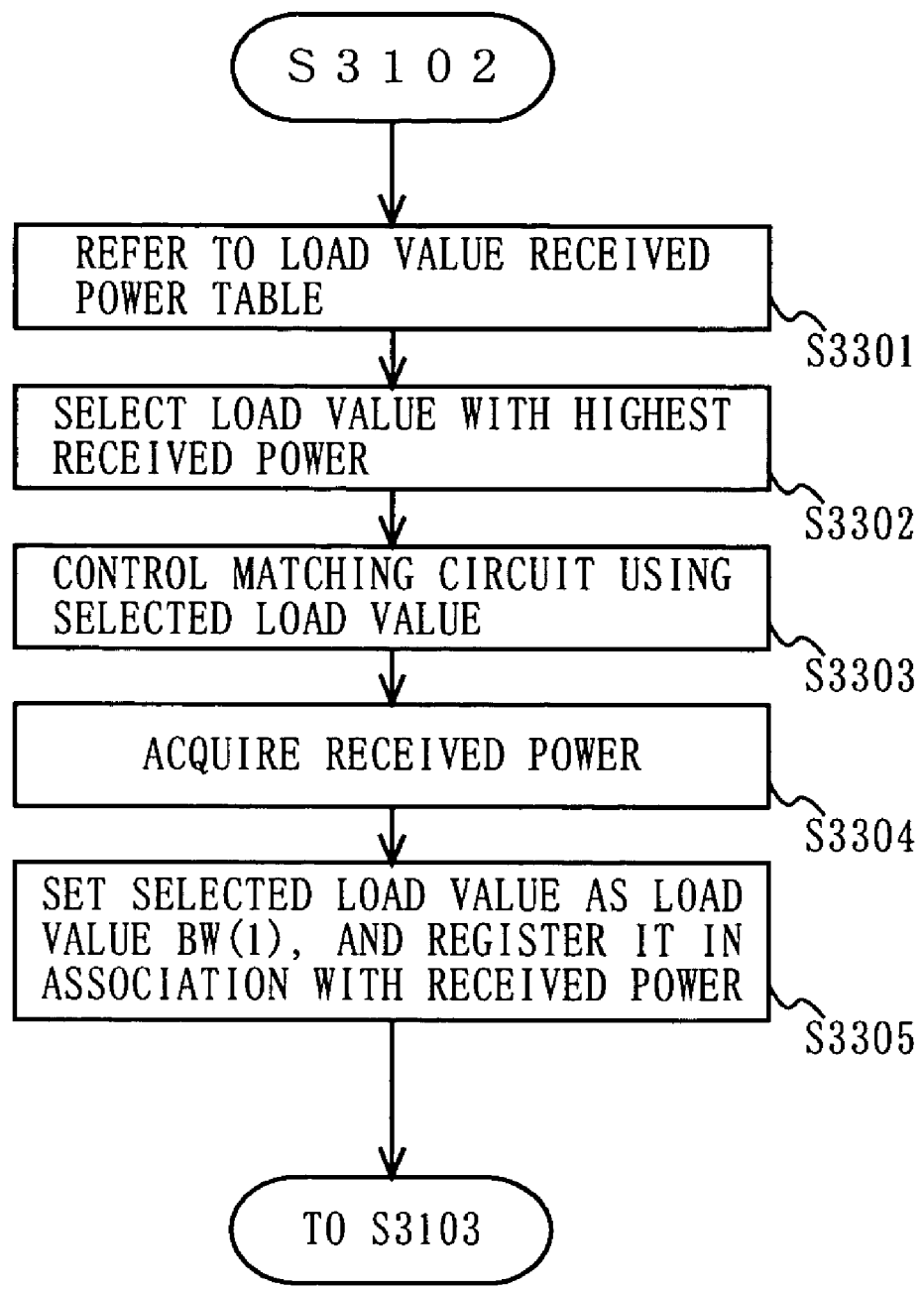
FIG. 59 is a flow chart illustrating the detailed operation of the control section 105a at Step S3102 in FIG. 52.

FIG. 59 is a flow chart illustrating the detailed operation of the control section 105a at Step S3102 in FIG. 52. Hereafter, the detailed operation of the control section 105a at Step S3102 in FIG. 52 will be described with reference to FIG. 59.

First, the control section 105a refers to the load value received power table (Step S3301). Next, the control section 105a selects a load value with the highest received power among the load values registered in the load value received power table (Step S3302). Next, the control section 105a controls the matching circuit using the selected load value (Step S3303), and acquires the received power (Step S3304). Next, the control section 105a registers the selected load value as the load value BW(1) in the load value received power table in association with this received power (Step S3305), and proceeds to operation at Step S3103. As a result of this, a load value with the highest received power among the load values included in the load value received power table generated at Step S3101 will certainly be registered as the load value BW(1).

Incidentally, in the first generation, the load value BW(1) has been the received power corresponding to the load value at the time when Step S3101 has started in a stage at Step S3101. Additionally, in the second generation or subsequent ones, the load value BW(1) has been empty in a stage at Step S3101.

Figure 60:
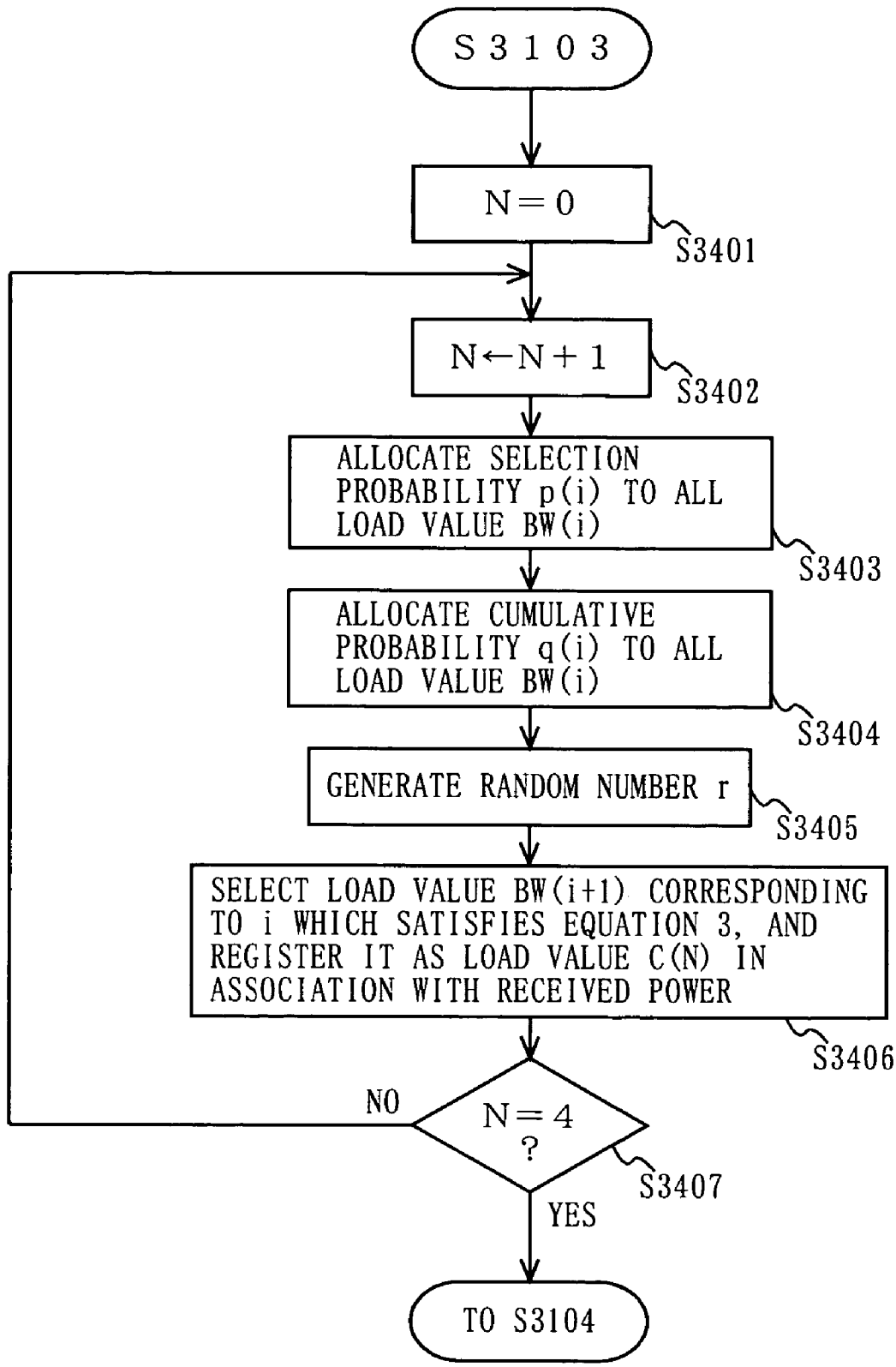
FIG. 60 is a flow chart illustrating the detailed operation of the control section 105a at Step S3103 in FIG. 52.

FIG. 60 is a flow chart illustrating the detailed operation of the control section 105a at Step S3103 in FIG. 52. Hereafter, the detailed operation of the control section 105a at Step S3103 in FIG. 52 will be described with reference to FIG. 60.

First, the control section 105a initializes as N=0 (Step S3401). Here, N is a value for counting how many load values have been chosen by natural selection.

Next, the control section 105a increments N by 1 (Step S3402), and allocates the selection probability p(j) represented by aforementioned Equation (1) to all the load values BW(i) in the load value received power table (Step S3403). Thus, for example, the selection probability q(1) will be allocated to the load value BW(1), and the selection probability q(2) will be allocated to the load value BW(2).

As represented in Equation (1), the higher the received power is, the higher the selection probability (adaptive value) becomes.

Next, the control section 105a allocates the cumulative probability q(i) represented by aforementioned Equation (2) to all the load values BW(i) in the load value received power table (Step S3404). Thus, for example, the cumulative probability q(1) will be allocated to the load value BW(1), and the cumulative probability q(2) will be allocated to the load value BW(2).

By using Equation (1) and Equation (2), a probability that the load value with high received power is selected will be increased.

Next, the control section 105a generates the random number r (0<r<1) (Step S3405).

Next, the control section 105a calculates for i which satisfies aforementioned Equation (3) for the generated random number r, select the load value BW(i+1) corresponding to q(i+1), and registers the selected load value BW(i+1) as a load value CW(N) in the load value received power table after natural selection along with the received power corresponding to the selected load value BW(i+1) (Step S3406).

Next, the control section 105a determines whether or not it is N=4 (Step S3407). Note herein that, N=4 is an upper limit number of the load value selected by natural selection, but this upper limit number is not limited to this. However, when the upper limit number is set other than N=4, the number of load values registered in the load value received power table after natural selection accordingly changes, and the number of load values registered in the load value table after crossover and the load value table after mutation changes, so that the judgment criteria at below-mentioned Step S3506, and below-mentioned Step S3605 will change according to the number of registered load values together with it.

Moreover, in the present embodiment, N=4 for mobile phone function, and N=5 for DTV.

At Step S3407, if it is determined that it is not N=4, the control section 105a returns to the operation at Step S3402 to perform the processing of registering the load value CW(N) for N incremented by 1. Meanwhile, if it is determined that it is N=4, the control section 105a proceeds to operation at Step S3104. Thereby, the load value received power table after natural selection will be completed.

Figure 61:
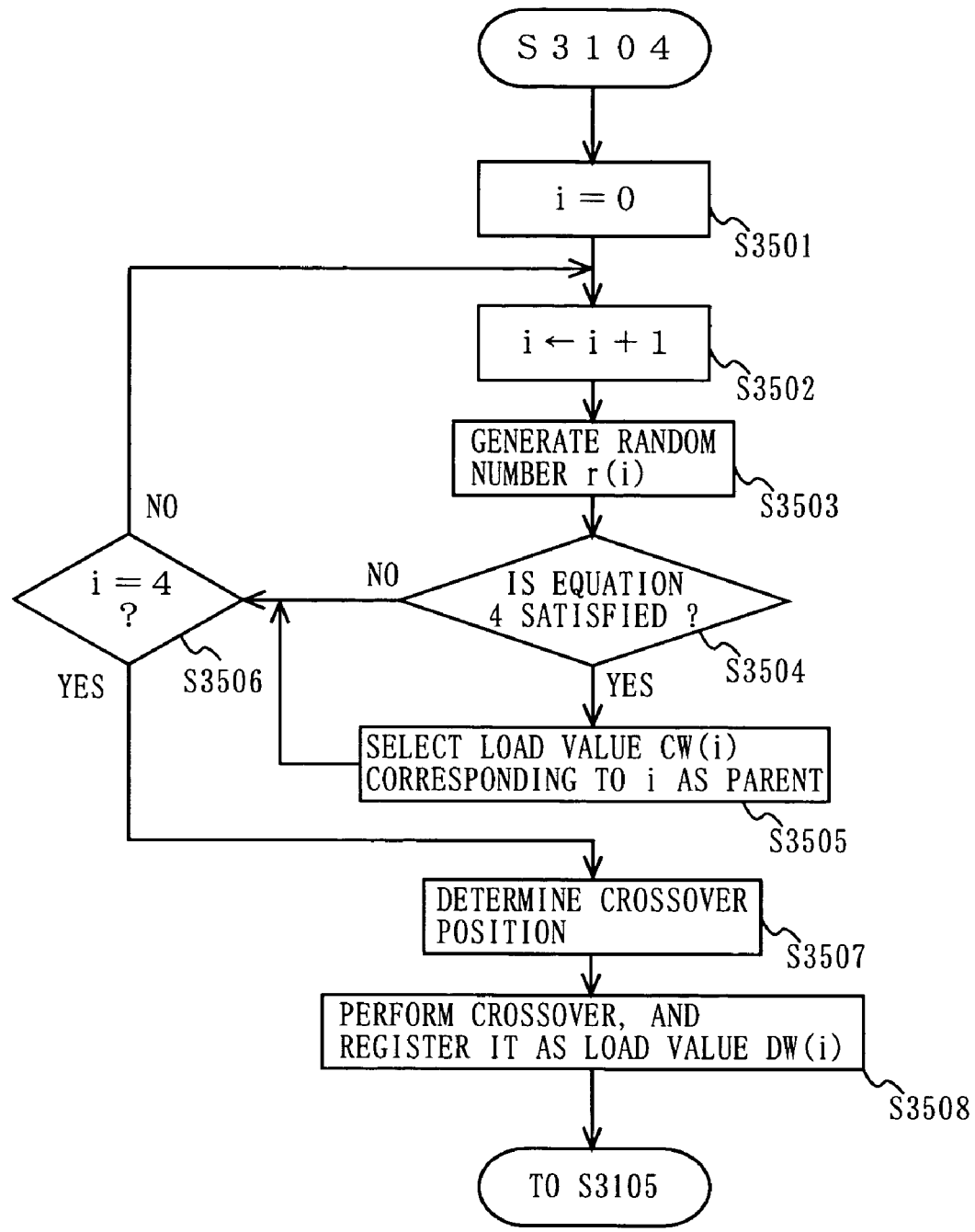
FIG. 61 is a flow chart illustrating the detailed operation of the control section 105a at Step S3104 in FIG. 52.

FIG. 61 is a flow chart illustrating the detailed operation of the control section 105a at Step S3104 in FIG. 52. Hereafter, the detailed operation of the control section 105a at Step S3104 in FIG. 52 will be described with reference to FIG. 61.

First, the control section 105a initializes as i=0 (Step S3501). Next, the control section 105a increments i by 1 (Step S3502), and generates the random number r(i) (0<r(i)<1) (Step S3503). Next, the control section 105a determines whether or not Equation (4) described above is satisfied (Step S3505).

If Equation (4) is satisfied, the control section 105a selects a load value CW(i) corresponding to i as the parent from the load value received power table after natural selection (Step S3505), and proceeds to operation at Step S3506. Meanwhile, if Equation (4) is not satisfied, the control section 105a proceeds to operation at Step S3506 as it is, without selecting the parent.

At Step S3506, the control section 105a determines whether or not it is i=4. As described above, the condition of i=4 is a condition to be changed in accordance with the number of load values registered in the load value received power table after natural selection.

If it is not i=4, the control section 105a returns to the operation at Step S3502, and continues the parent selection. Meanwhile, if it is i=4, the control section 105a proceeds to operation at Step S3507.

At Step S3507, The control section 105a chooses and performs crossover two arbitrary load values among the parent load values selected at Step S3505. The control section 105a register the load values after the crossover, and the load values without the crossover as the load value DW(i) in the load value table after crossover, and proceeds to operation at Step S3105. Incidentally, if the number of parent load values selected at Step S3505 is one, the control section 105a will not cross over the load values selected as the parent. Meanwhile, if the number of parent load values selected at Step S3505 is odd, there are odd load values to which the crossover is not performed although they are selected as the parents. Thereby, the load value table after crossover will be completed.

Figure 62:
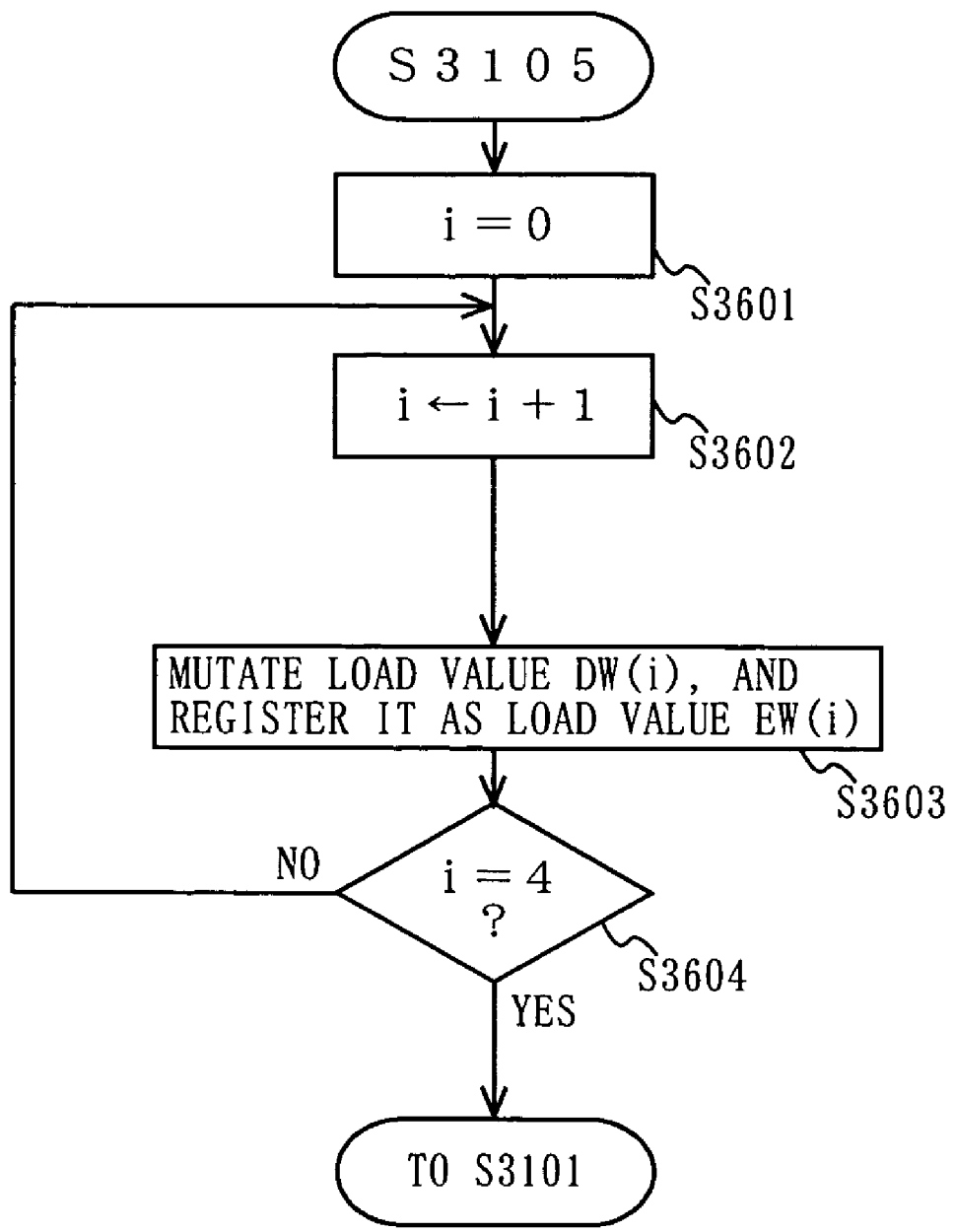
FIG. 62 is a flow chart illustrating the detailed operation of the control section 105a at Step S3105 in FIG. 52.

FIG. 62 is a flow chart illustrating the detailed operation of the control section 105a at Step S3105 in FIG. 52. Hereafter, the details of the operation of the control section 105a at Step S3105 in FIG. 52 will be described with reference to FIG. 62.

First, the control section 105a initializes as i=0 (Step S3601). Next, the control section 105a increments i by 1 (Step S3602). Next, the control section 150a determines at random whether or not to mutate the load value DW(i) in the load value table after crossover.

If it is mutated, the control section 105a performs mutation and register it in the load value table after mutation as the load value EW(i) (Step S3603).

Subsequently, the control section 105a determines whether or not it is i=4 (Step S3604). If it is not i=4, the control section 105a returns to the operation at Step S3602, and performs mutation for the remaining load values DW(i). Meanwhile, if it is i=4, it means that the load value table after mutation has been completed. The load value table after mutation will indicate a next generation load value. The control section 105a returns to the operation at Step S3101, and proceeds to the processing of the next generation. Incidentally, as described above, the condition of i=4 is a condition to be changed in accordance with the number of load values registered in the load value received power table after natural selection.

In the initial control processing. If there is no initial load value for providing the impedance matching, the control section 105a evolves the initial load value, derives a load value of the matching circuit 102 for providing the impedance matching, and controls the matching circuit 102 so as to have the derived load value, at Steps S3101 through S3105 after the second generation. The processing at Steps S3101 through S3105 after the second generation is called the matched load value deriving processing.

For example, when the antenna 101 changes from the situation where the impedance is matched in a free space, to the situation in close proximity to a human body, a varactor voltage which can provide the appropriate received power is calculated, so that the impedance will be matched. Subsequently, when the antenna 101 changes from the situation in close proximity to a human body to the situation in a free space, the control section 105a detects the change of the received power, performs the processing shown in FIG. 52, and calculates for the varactor voltage which can provide the impedance matching between the antenna 101 and signal processing section 104a to thereby match the impedance.

Moreover, also when the function to be used is changed, a varactor voltage which can provide the appropriate received power is calculated, and the impedance between the antenna 101 and signal processing section 104a will be matched corresponding to each function.

As is understood, according to the eleventh embodiment, if the change of the received power is detected, and if the function to be used is changed, the control section 105a first applies the varactor voltage to the matching circuit 102 using the load value stored in the initial load value table of the use situation corresponding to respective functions. If there is an initial load value which can provide the appropriate received power, the control section 105a applies the varactor voltage corresponding to this initial load value to the matching circuit 102 to thereby match the impedance. Meanwhile, if there is no initial load value which can provide the appropriate received power, the control section 105a evolves the initial load value, and operates so as to obtain the appropriate load value. The control section 105a preferentially selects a load value with high received power among the initial load values in the case of evolution of the initial load value. Hence, the initial load value can be evolved to the appropriate load value in a short time. Consequently, the impedance matching will be performed quickly. As a result of this, since the impedance can be always controlled adaptively in various environments where the antenna is placed, a loss due to a mismatching loss can be reduced, so that the mobile radio apparatus which can always obtain the stable received power will be provided.

Moreover, the mobile radio apparatus 9 can adaptively match the impedance only by storing only the load value corresponding to the use situation, thus making it possible to reduce the information to be stored.

Furthermore, the mobile radio apparatus 9 uses the averaged received power, thus making it possible to achieve the stable operation.

Note herein that, if the appropriate load value is found in the process of evolving the load value, the control section 105a may register the newly found load value as the initial load value in the initial load value table of the use situation. Specifically, the control section 105a registers the load value used for the control of the matching circuit 102 as the initial load value in the storage section 106a after Steps S3218 and/or S3213 in FIG. 58.

Figure 63:
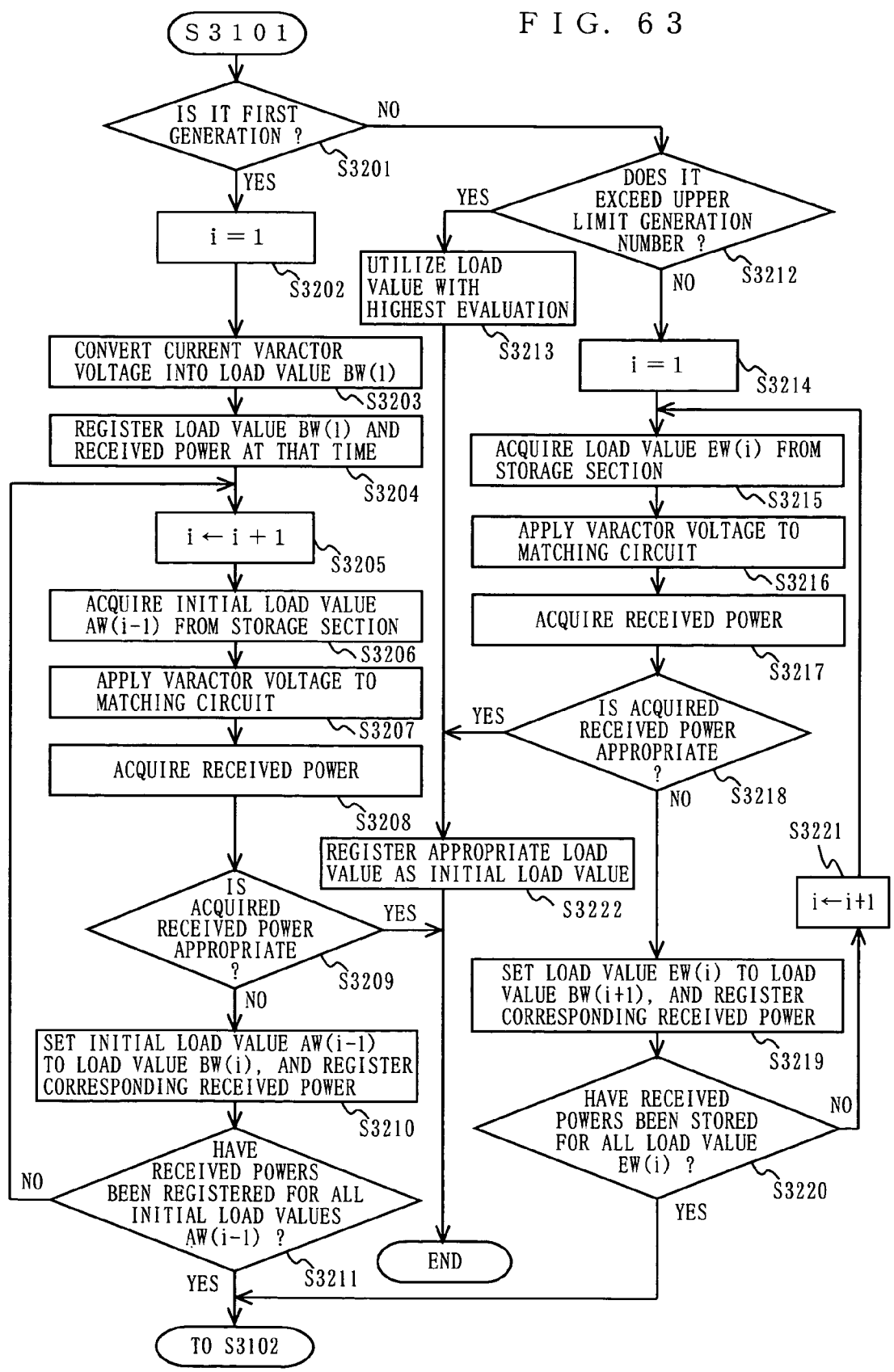
FIG. 63 is a flow chart illustrating the details of the operation at Step S3101 in FIG. 52.

FIG. 63 is a flow chart illustrating the details of the operation at Step S3101 in FIG. 52, where if the appropriate load value is found, then this load value is registered in the initial load value table as the initial load value. FIG. 63 is different from FIG. 58 in that the Step S3222 which newly registers the initial load value in the initial load value table of the use situation is added. Note herein that, the control section 105a may set the use situation of the load value selected at Step S3302 in the first generation as the use situation of the newly registered initial load value. The control section 105a may determine the varactor voltage for impedance matching also using the newly registered initial load value, at the processing in FIG. 52 which will be performed next time. As a result of this, load values suitable for the user who uses the mobile radio apparatus 9 will be accumulated as the initial load value by repeating the evolution of the load value. Accordingly, as the processing by the control section 105a is repeated performed, the time for impedance matching will be reduced.

The algorithm described in the eleventh embodiment is only an example.

TWELFTH EMBODIMENT

The impedance matching of the receiving side has been described in the eleventh embodiment. The impedance matching method according to the present invention may also be used for the impedance matching on the transmitting side. In the twelfth embodiment, the impedance matching on the transmitting side will be described.

Figure 64A:
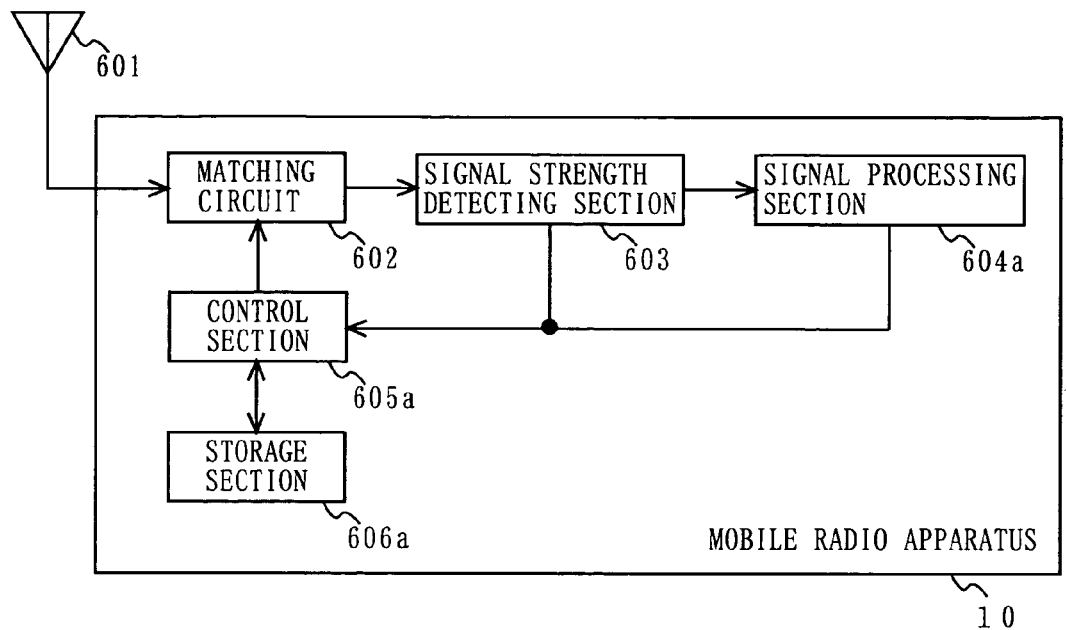
FIG. 64A is a block diagram illustrating a configuration of a mobile radio apparatus 10 in accordance with a twelfth embodiment.

FIG. 64A is a block diagram illustrating a configuration of a mobile radio apparatus 10 in accordance with a twelfth embodiment. In FIG. 64A, the mobile radio apparatus 10 is provided with the antenna 601, the matching circuit 602, the reflected voltage detecting section 603, a signal processing section 604a, a control section 605a, and a storage section 606a.

A transmission signal generated in the signal processing section 604a is radiated from the antenna 601 through the reflected voltage detecting section 603 and the matching circuit 602. The reflected voltage detecting section 603 detects a reflected voltage of the transmission signal, and transmits the detected reflected voltage to the control section 605a. The matching circuit 602 is a circuit which can change the impedance according to instructions from the control section 605a. For example, the matching circuit 602 is the matching circuit 102 shown in FIG. 2. The storage section 606a stores information required for the impedance control by the control section 605a.

The control section 605a controls the impedance of the matching circuit 102 so that the reflected voltage may be reduced according to the reflected voltage provided from the reflected voltage detecting section 603. The control method of the impedance applies to the eleventh embodiment.

Specifically, in the eleventh embodiment, at Steps of storing the received power (S3204, S3210, S3219, S3305, S3406), the control section 605a stores the reflected voltage.

In the eleventh embodiment, at Steps of acquiring the received power (S3208, S3217, S3304), the control section 605a acquires the reflected voltage.

In the eleventh embodiment at Steps of determining whether or not the received power is appropriate (S3209, S3218), the control section 605a determines whether or not the reflected voltage is appropriate. If the acquired reflected voltage is equal to the reflected voltage at the time of matching when the impedance has matched before the change, or more the control section 605a determines that the reflected voltage is appropriate. In addition to that, if the acquired reflected voltage is larger than the reflected voltage when the impedance changes by a predetermined amount or more, the control section 605a determines that the acquired reflected voltage is appropriate. Moreover, if the acquired reflected voltage is larger than a certain predetermined threshold, the control section 605a may determine that the reflected voltage is appropriate. The judgment criterion of the reflected voltage is not limited to the aforementioned judgment criterion.

In the eleventh embodiment, at Steps of using the largest received power (S3213, S3302), the control section 605a uses the smallest reflected voltage.

In addition to that, in the eleventh embodiment, the control section 605a is to use the reflected voltage at Step of using the received power.

Since it is shown that the smaller the reflected voltage is, the further the impedance is matched, the selection probability p(i) used for a difference in natural selection of the load value will be given by aforementioned Equation (7).

A load value with small reflected voltage will be preferentially selected by using the selection probability p(i) shown by Equation (7).

Incidentally, the mobile radio apparatus 10 may be provided with a VSWR (Voltage Standing Wave Ratio) detector instead of the reflected voltage detecting section 603. In this case, the control section 605 performs the control according to the eleventh embodiment so that VSWR may become small.

As is understood, according to the twelfth embodiment, since the impedance matching is performed in accordance with the eleventh embodiment, the impedance is always controlled adaptively in various environments where the antenna is placed, and a loss due to a mismatching loss can also be reduced, so that the mobile radio apparatus which can always obtain the stable transmission power will be provided.

Figure 64B:
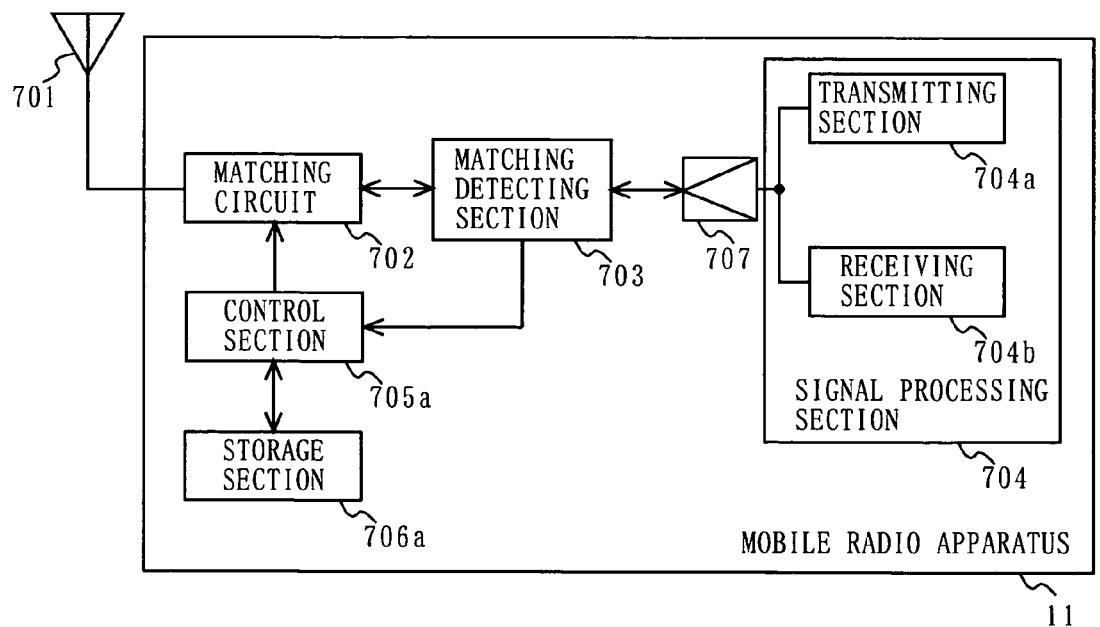
FIG. 64B is a block diagram illustrating a configuration of a mobile radio apparatus 11 provided with both a transmitting section and a receiving section.

Incidentally, it is needless to say that the present invention may be applied even to the mobile radio apparatus provided with both the transmitting section and the receiving section. FIG. 64B is a block diagram illustrating a configuration of a mobile radio apparatus 11 provided with both a transmitting section and a receiving section.

In FIG. 64B, the mobile radio apparatus 11 is provided with the antenna 701, the matching circuit 702, the matching detecting section 703, the signal processing section 704, a control section 705a, a storage section 706a, and the shared unit 707. The signal processing section 704 includes a transmitting section 704a and a receiving section 704b. In the mobile radio apparatus 11, the matching detecting section 703 detects reflected power of the transmission signal or a receiving voltage of the received signal, namely, information for indicating an impedance matching rate, and transmits it to the control section 705a. The signal processing section 704 transmits information on what function is to be used to the control section 705a. Upon reception of the radio signal, the control section 705a performs the processing in the eleventh embodiment to thereby adjust the impedance of the matching circuit 702. Upon transmission of the radio signal, the control section 705a operates like the control section 605a shown in FIG. 64A to thereby adjust the impedance of the matching circuit 702. Thus, the impedance matching between the signal processing section 704 and the antenna 701 is obtained.

Note herein that, also in the aforementioned embodiment, the mobile radio apparatus may have a diversity configuration like the ninth embodiment. The control section may select an antenna with smaller reflected voltage at a time of transmission.

Various Modification of Embodiment

In addition to that, the aforementioned embodiments may be variously modified. Hereafter, the aforementioned modification of the embodiment will be described.

In the aforementioned embodiments, while it has been described that the parameter for indicating the chromosome or the varactor voltage, and the parameter for indicating on/off state of the switch as the information on the load value of the matching circuit (the initial load value information, the matched load value information, the load value information) has been used, it is only an example and the information on the load value is not limited to these.

In the aforementioned embodiments, while it has been described that the control section has determined whether or not the impedance matching has been obtained using the received power and the reflected voltage supplied from the signal strength detecting section 103 and the reflected voltage detecting section 603, and the matching detecting sections 703, 803, the method of determining whether or not the impedance matching is obtained is not limited to these. For example, the control section may determine whether or not the impedance matching is obtained based on whether or not the signal is normally demodulated in the signal processing section, or may determine whether or not the impedance matching is obtained based on the response contents indicating whether or not the transmission signal supplied from the apparatus of the receiving side is properly received. Moreover, as will be described hereinbelow, the control section can determine whether or not to start the impedance control by using the use situation change detecting section. Hence, the signal strength detecting section 103, the reflected voltage detecting section 603, and the matching detecting sections 703 and 803 are not the indispensable components for the present invention.

In FIG. 2, the varactor diode whose capacitance value had been changed by applying the voltage has been used for the matching circuit 102. However, in the matching circuit 102, another variable capacitance other than the varactor diode may be used. In addition to the variable capacitance, a variable inductor may be used. A variable inductor may also be used instead of the variable capacitance. In other words, the matching circuit 102 may just include at least one variable reactive element and/or at least one variable inductance element. The information for controlling the capacitance value and/or the inductance may just be indicated by the parameter or the chromosome in any case.

In the aforementioned embodiments, if the chromosome has been used, the series and the parallel varactor voltages have been converted into binary numbers to define the chromosome, but a definition rule of the chromosome is not limited to this. Moreover, in the aforementioned embodiments, if the chromosome has been used, the chromosome has been defined correspond to on/off of the switch in the matching circuit 400, but a definition rule of the chromosome is not limited to this.

Needless to say, the number of chromosomes or parameters is not limited to the example of the aforementioned embodiments.

While it has been described such that the control section 105 and the storage section 106 have been different parts in FIG. 1, FIG. 45, FIG. 47, and FIG. 48, the storage section 106 may be incorporated inside the control section 105.

In the aforementioned embodiments, the control section 105 (605) has averaged the received power (reflected voltage) transmitted from the signal strength detecting section 103 (reflected voltage detecting section 603) to determine whether or not to start the impedance matching. However, the averaging technique is not limited to this. For example, an RC integrating circuit or an RL integrating circuit may be provided between the signal strength detecting section 103 (reflected voltage detecting section 603) and the control section 105 (605).

Figure 65A:
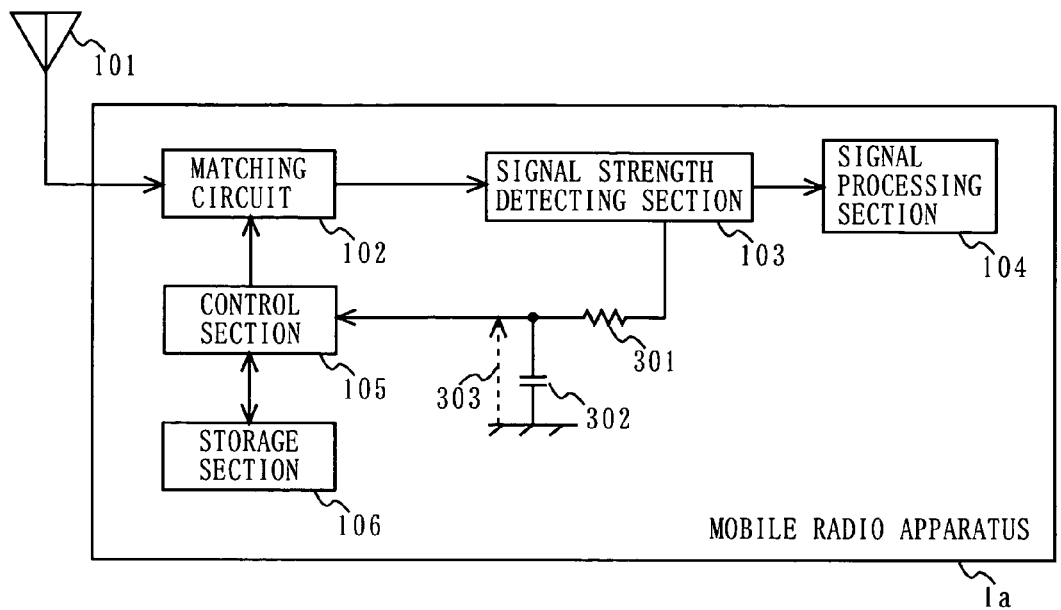
FIG. 65A is a block diagram illustrating a configuration of a mobile radio apparatus 1a provided with an RC integrating circuit.
Figure 65B:
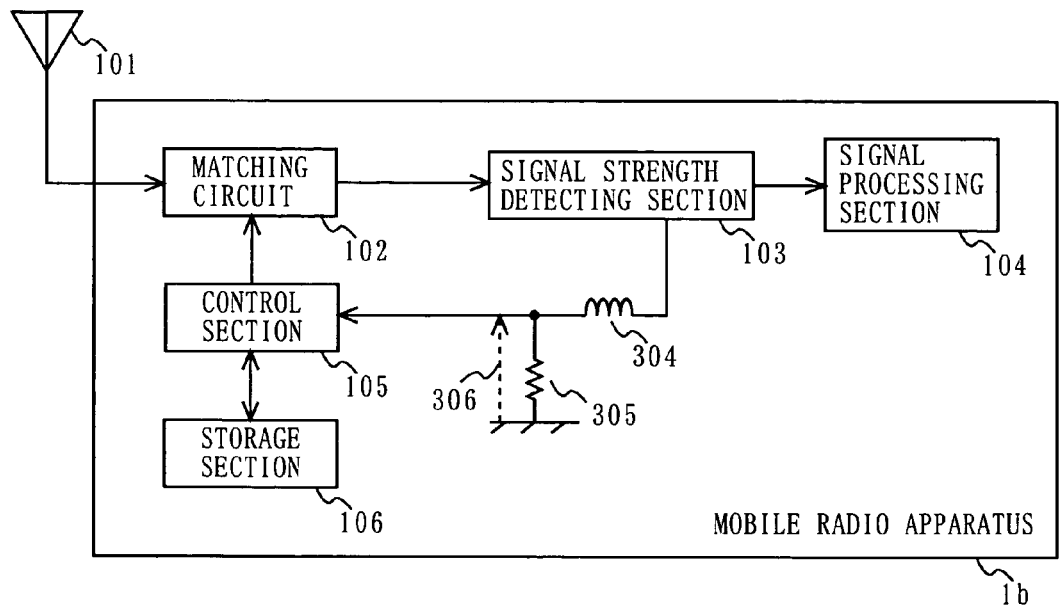
FIG. 65B is a block diagram illustrating a configuration of a mobile radio apparatus 1b provided with an RL integrating circuit.
Figure 65C:
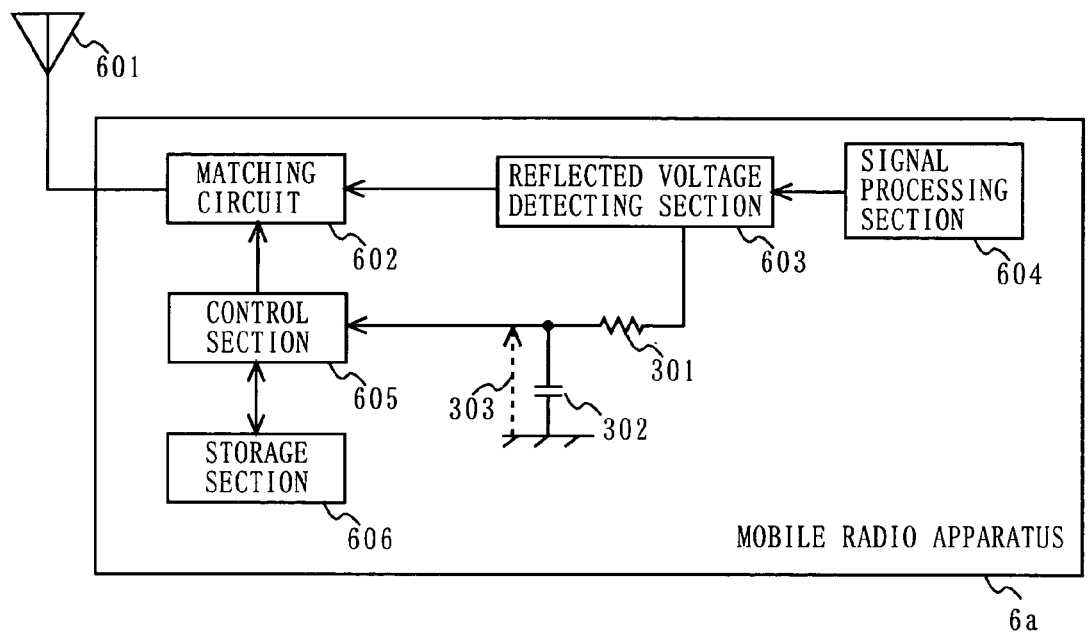
FIG. 65 C is a block diagram illustrating a configuration of a mobile radio apparatus 6a provided with an RC integrating circuit.
Figure 65D:
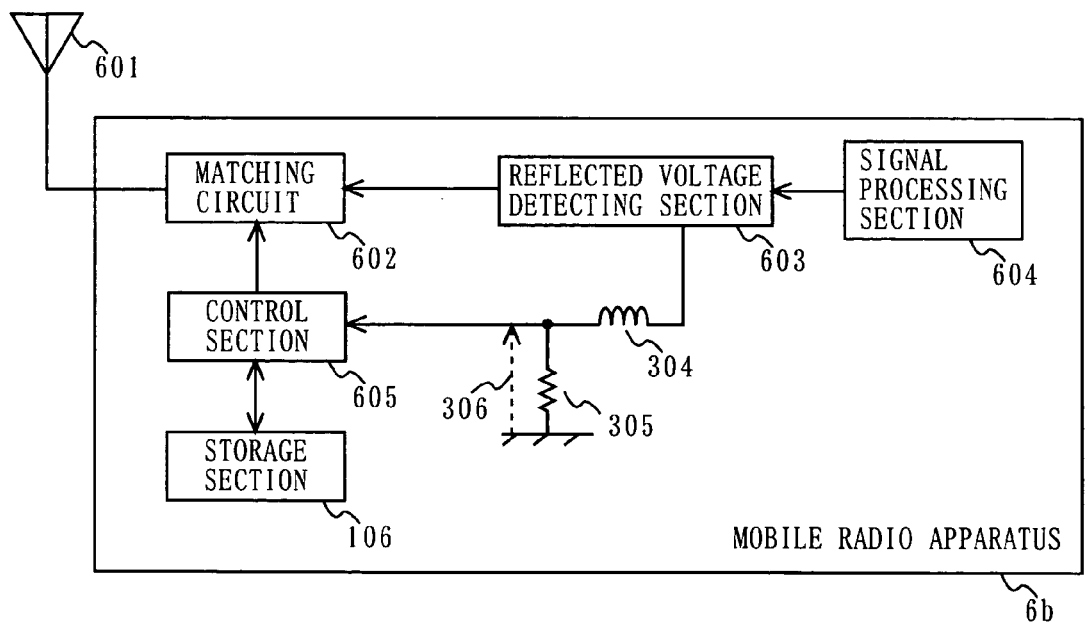

FIG. 65A is a block diagram illustrating a configuration of a mobile radio apparatus 1a provided with an RC integrating circuit. In FIG. 65A, between the signal strength detecting section 103 and the control section 105, a resistor 301 is connected in series, and a capacitor 302 is connected in parallel. The control section 105 detects the received power by detecting a voltage 303 of the capacitor 302. FIG. 65B is a block diagram illustrating a configuration of a mobile radio apparatus 1b provided with an RL integrating circuit. In FIG. 65B, between the signal strength detecting section 103 and the control section 105, an inductor 304 is connected in series, and a resistor 305 is connected in parallel. The control section 105 detects the received power by detecting a voltage 306 of the resistor 305. As a result of these, the control section 105 can detect the received power which changes smoothly, allowing the stable received power to be acquired. It is similar when using the reflected voltage detecting section 603. FIG. 65 C is a block diagram illustrating a configuration of a mobile radio apparatus 6a provided with an RC integrating circuit. Between the reflected voltage detecting section 603 and the control section 605, the resistor 301 is connected in series, and the capacitor 302 is connected in parallel. The control section 605 detects the reflected voltage by the detecting voltage 303 of the capacitor 302. FIG. 65 D is a block diagram illustrating a configuration of a mobile radio apparatus 6b provided with an RL integrating circuit. In FIG. 65D, between the signal strength detecting section 603 and the control section 605, the inductor 304 is connected in series, and the resistor 305 is connected in parallel. The control section 605 detects the received power by detecting the voltage 306 of the resistor 305. As a result of these, the control section 605 can detect the reflected voltage which changes smoothly, allowing the stable reflected voltage to be acquired. Incidentally, it is needless to say that the integrating circuit can be applied also to the mobile radio apparatus shown in FIG. 47B, FIG. 47C, FIG. 48, FIG. 64A, and FIG. 64B.

In the embodiments using the table in which the chromosome or the parameter is registered in association with the use situation, use situations other than a free space, a call posture, and an E-mail posture may be used as the use situation. For example, by setting the use situations such that distances between a human body and the antenna are 1 cm, 2 cm, and 3 cm, a chromosome or a parameter which can provide the matching for respective situations may be used. Moreover, a chromosome or a parameter which can provide the matching for other situations may be used. In other words, information for controlling the impedance of the matching circuit may be stored in the storage section in association with the typical use situation of the mobile radio apparatus.

Note herein that, in the aforementioned embodiments, in the processing of finely adjusting the impedance of the matching circuit using the genetic algorithm, the impedance may be finely adjusted using another optimization algorithm, such as a steepest descent method algorithm.

The determining method of the crossover position is not limited to the determining method in the aforementioned embodiments. For example, the mobile radio apparatus may determine only one crossover position in one certain chromosome to then exchange the gene with that of one different chromosome, or may determine a plurality of crossover positions to then exchange the gene.

Naturally, the chromosome registered in the use situation initial chromosome table or the initial parameter table for use situation is not limited to the aforementioned example. Additionally, the number of chromosomes or parameters registered therein is not limited to the aforementioned example, either.

In the aforementioned embodiments, the timing for the impedance matching control to start is not limited to the aforementioned example. For example, it may be started periodically, or may be started depending on the change of the use situation of the mobile radio apparatus. When the impedance matching control is started depending on the change of the use situation, The mobile radio apparatus will be provided with the use situation change detecting section for detecting the change of the use situation. Meanwhile, when the use situation change detecting section is used, the control section may first evaluate the initial load value information corresponding to the use situation after the change detected by the use situation change detecting section.

Figure 66A:
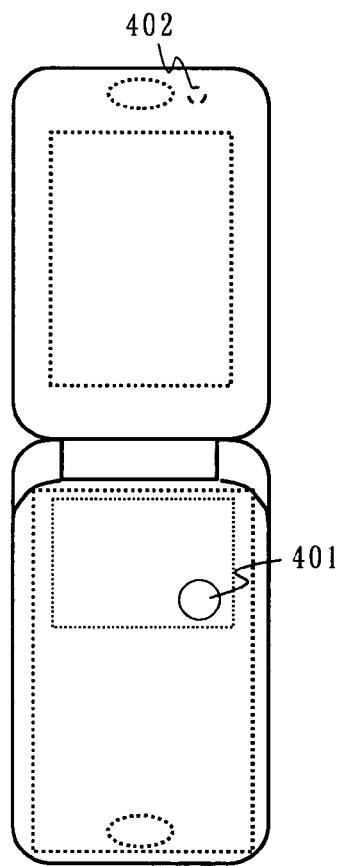
FIG. 66A is a front view of the mobile phone.
Figure 66B:
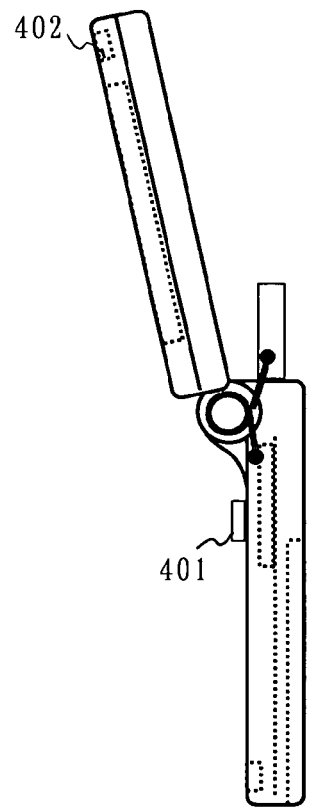
FIG. 66B is a side view of the mobile phone.
Figure 67:
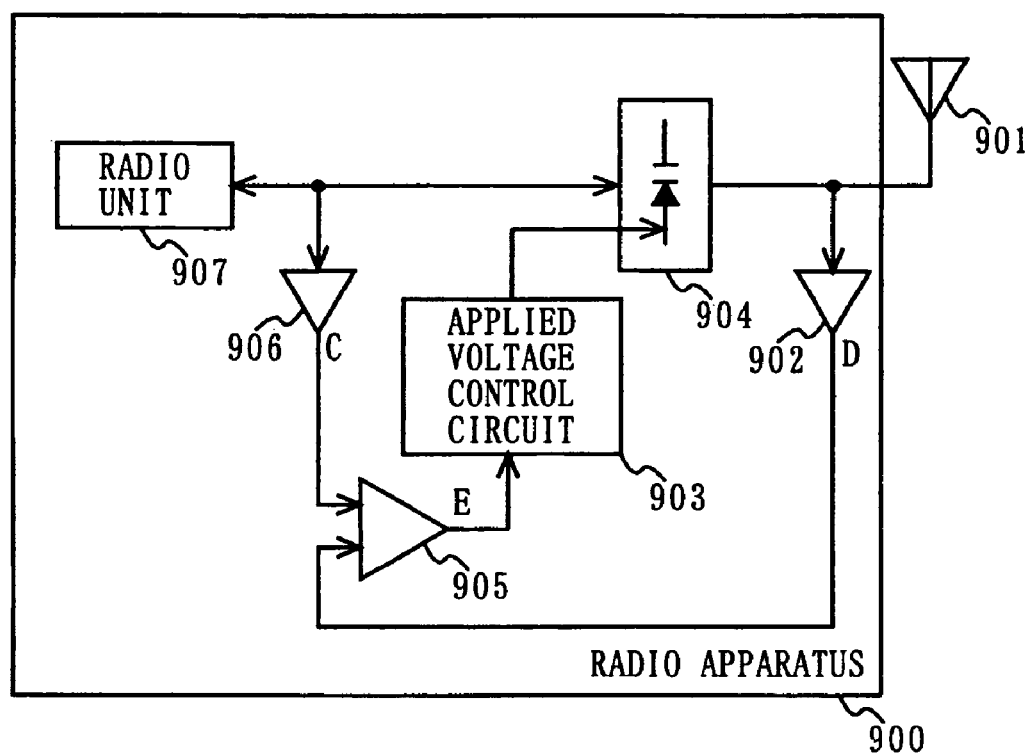
FIG. 67 is a block diagram illustrating a configuration of a conventional radio apparatus 900 described in Patent Document 1.

For example, there will be considered a case where the mobile radio apparatus is assumed to be the mobile phone. FIG. 66A is a front view of the mobile phone. FIG. 66B is a side view of the mobile phone. For example, the use situation change detecting section determines whether or not a call button 401 is pressed. The use situation change detecting section detects that the use situation turned into a talk state by detecting that the call button 401 has been pressed. If the use situation change detecting section detects that it is in a talk state, the control section starts the impedance matching control. In this case, the initial chromosome "call" or the initial parameter "call" expected to provide the matching in a talk state may be registered in the use situation initial chromosome table or the initial parameter table for use situation. Subsequently, if the impedance matching control is started, the control section first chooses the initial chromosome "call" or the initial parameter "call" corresponding to the talk state to acquire the received power, and determines whether or not the acquired received power is appropriate (for example, at Step S210 in FIG. 10). If it is not appropriate, the appropriate chromosome will be obtained by an optimization algorithm, such as a genetic algorithm, a steepest descent method, or the like. When the change of the use situation is detected by the use situation change detecting section like this, the control section first controls the matching circuit using the initial chromosome or the initial parameter corresponding to the use situation after change, so that it becomes possible to match the impedance in a shorter time.

Moreover, when the mobile radio apparatus is, for example, a folding-type flip mobile phone, the use situation change detecting section may detect whether the use situation is in an open state or a close state by detecting open/close of this mobile phone. When the mobile phone is opened, or when the mobile phone is closed, the control section starts the impedance matching control. In this case, the initial chromosome "open" or the initial parameter "open" expected to provide the matching in a situation where the mobile phone is opened, and the initial chromosome "close" or the initial parameter "close" expected to provide the matching in a situation where the mobile phone is closed may be registered in the use situation initial chromosome table or the initial parameter table for use situation. Subsequently, if the open state is detected by the use situation change detecting section, the control section chooses the initial chromosome "open" or the initial parameter "open" first to acquire the received power, and determines whether or not the acquired received power is appropriate (for example, at Step S210 in FIG. 10). if the close state is detected by the use situation change detecting section, the control section chooses the initial chromosome "close" or the initial parameter "close" first to acquire the received power, and determines whether or not the acquired received power is appropriate (for example, at Step S210 in FIG. 10). If it is not appropriate, the control section will obtain the appropriate chromosome by an optimization algorithm, such as a genetic algorithm, a steepest descent method, or the like. When the change of the use situation is detected by the use situation change detecting section like this, the control section first controls the matching circuit using the initial chromosome or the initial parameter corresponding to the use situation after change, so that it becomes possible to match the impedance in a shorter time.

Moreover, the use situation change detecting section may be, for example, a temperature sensor 402 for determining whether or not the human body closes to the mobile phone. If the temperature sensor 402 determines that a human body has closed to the mobile phone, the control section starts the impedance matching control. In this case, a relation between a distance when it has closed to a human body and a temperature detected by the temperature sensor 402 at that time may be investigated in advance. The initial chromosome or the initial parameter expected to provide the matching in that situation is registered in the use situation initial chromosome table or the initial parameter table for use situation in association with the temperature. The control section chooses the initial chromosome corresponding to the temperature detected by the temperature sensor 402 from the use situation initial chromosome table to acquire the received power, and determines whether or not the acquired received power is appropriate (for example, at Step S210 in FIG. 10). If it is not appropriate, the control section will obtains the appropriate chromosome by an optimization algorithm, such as a genetic algorithm, a steepest descent method, or the like. Specifically, it is assumed that when a distance between the human body and the antenna is 1 cm, the temperature sensor 402 detects 25 degree C. At this time, the initial chromosome "temperature 25" which can provide the matching when the distance between the antenna and the human body is 1 cm is registered in advance in the use situation initial chromosome table. In addition to that, the initial chromosome is registered in association with the temperature detected by the temperature sensor 402. When a temperature of 25 degree C. is detected by the temperature sensor 402, the control section 105 selects the initial chromosome "temperature 25". Thus, it becomes possible to adaptively match the impedance in a short time.

Incidentally, the mobile radio apparatus may be provided with an antenna environment change detecting section for detecting the change of the environment around the antenna. In this case, when the antenna environment change detecting section detects the change of the environment around the antenna, the control section may start the impedance matching control. In this case, the storage section may store in advance the initial chromosome or the initial parameter expected to provide the matching in various environments where the antenna are placed. Thus, the impedance matching and control will be performed using this initial chromosome or the initial parameter, so that the impedance will be matched in a short time.

Incidentally, in the aforementioned embodiments, it has been described that the antenna and the signal processing section have originally been matched in a free space, but as a matter of course, it does not limit to this. For example, the antenna and the signal processing section may be originally matched in the situation used for call (at the time of a call posture). Additionally, needless to say, the antenna and the signal processing section may be set to be matched under other environments.

Incidentally, while it has been exemplified focusing on the mobile phone as the example of the mobile radio apparatus in the aforementioned description, the mobile radio apparatus according to the present invention is applicable other than the mobile phone. For example, as the mobile radio apparatus, the present invention is applicable to any mobile radio apparatus such as a compact communication device for radio LAN, an inquiry device and a reply device of a RFID (Radio Frequency Identification) system, a transmitter of a keyless entry system or the like.

INDUSTRIAL APPLICABILITY

Since the present invention can solve the mismatching of the impedance caused by the antenna closing to a human body or a thing, deterioration of the received power or the transmission power can be prevented, thus, it can be applied to an apparatus used in any communications, including the mobile phone.

The invention claimed is:

1. A mobile radio apparatus for a radio communication, comprising
   an antenna;
   a signal processing section for processing a signal;
   a matching circuit for matching an impedance between said antenna and said signal processing section, the matching circuit being connected between said antenna and said signal processing section, and having a variable load value;
   a control section for controlling the load value of said matching circuit; and
   a storage section for storing information on the load value of said matching circuit as initial load value information, corresponding to a use situation of said mobile radio apparatus,
   said control section includes
   initial control means for evaluating said initial load value information stored in said storage section upon starting control of said matching circuit, and if there is initial load value information for providing impedance matching, for controlling said matching circuit so as to have a load value corresponding to this initial load value information; and
   if there is no initial load value information for providing the impedance matching, matched load value deriving means for deriving matched load value information which is information on the load value for providing the impedance matching, using said initial load value information stored in said storage section, and controlling said matching circuit so as to have a load value corresponding to said derived matched load value information.

2. The mobile radio apparatus according to claim 1, further comprising a matching detecting section for detecting an impedance matching rate between said antenna and said signal processing section, the matching detecting section being connected between said matching circuit and said signal processing section, wherein
- said matching detecting section includes a signal strength detecting section for detecting signal strength of a first frequency band corresponding to a frequency band of a received signal received through said antenna and said matching circuit,
- said initial control means evaluates said initial load value information stored in said storage section based on the signal strength of the first frequency band detected by said signal strength detecting section, and
- if there is no initial load value information for providing the impedance matching, said matched load value deriving means, while changing the load value of said matching circuit, evaluates the changed load value of said matching circuit based on the signal strength of the first frequency band detected by said signal strength detecting section, and derives said matched load value information.

3. The mobile radio apparatus according to claim 1, further comprising a matching detecting section for detecting the impedance matching rate between said antenna and said signal processing section, the matching detecting section being connected between said matching circuit and said signal processing section, wherein
- said matching detecting section includes a reflected voltage detecting section for detecting a reflected voltage of a second frequency band corresponding to a frequency band of a transmission signal generated in said signal processing section,
- said initial control means evaluates said initial load value information stored in said storage section based on the reflected voltage of the second frequency band detected by said reflected voltage detecting section,
- while, if there is no initial load value information for providing the impedance matching, said matched load value deriving means, while changing the load value of said matching circuit, evaluates said changed initial load value information based on the reflected voltage of the second frequency band detected by said reflected voltage detecting section, and derives said matched load value information.

4. The mobile radio apparatus according to claim 1, wherein
- said signal processing section transmits a function to be used to said control section, and
- said control section controls the load value of said matching circuit, along with the function transmitted from said signal processing section, so that received power of the received signal received through said antenna and said matching circuit, or transmission power of the transmission signal generated in said signal processing section may be increased.

5. The mobile radio apparatus according to claim 1,
wherein said matched load value deriving means includes
local search means for deriving said matched load value information by means of finely adjusting the load value of said matching circuit, and
if said matched load value information cannot be derived by means of said local search means, global search means for newly generating load value information required for deriving said matched load value information, and deriving said matched load value information using said load value information, and
wherein if said matched load value information cannot be derived by said global search means, said local search means derives said matched load value information by means of finely adjusting the load value of said matching circuit again.

6. The mobile radio apparatus according to claim 1, wherein said matched load value deriving means derives said matched load value information by means of finely adjusting the load value of said matching circuit.

7. The mobile radio apparatus according to claim 1, wherein
- said control section further comprises new initial load value information registration means for additionally registering said matched load value information derived by said matched load value deriving means to said storage section as the initial load value information, and
- said control section performs control from the next time using the initial load value information which is newly additionally registered.

8. The mobile radio apparatus according to claim 1, wherein
- said mobile radio apparatus is a mobile phone, and
- said initial load value information includes
- information on a load value expected to provide the impedance matching in a situation when there is said mobile phone in a free space apart from a human body,
- information on a load value expected to provide the impedance matching when said mobile phone is used in a situation during call, and
- information on a load value expected to provide the impedance matching in a situation when a mail function of said mobile phone is used.

9. The mobile radio apparatus according to claim 1, wherein said matching circuit includes
- at least one reactive element and/or at least one inductance element, which serves as the load, and
- at least one switch for selecting said load.

10. The mobile radio apparatus according to claim 1, wherein said matched load value deriving means generates pieces of information for indicating the load values of the matching circuit at random as the random load value information to thereby evaluate said generated random load value information, and
- if there is random load value information for providing the impedance matching, controls said matching circuit so as to have the load value corresponding to said random load value information,
- while, if there is not said random load value information for providing the impedance matching, derives said matched load value information using said initial load value information and said random load value information.

11. The mobile radio apparatus according to claim 10, wherein
- said initial load value information is an initial chromosome for indicating the load value of said matching circuit,
- said random load value information is a random chromosome for indicating the load value of said matching circuit, and
- said matched load value deriving means derives said matched load value information by means of evolving said initial chromosome and said random chromosome using a genetic algorithm.

12. The mobile radio apparatus according to claim 11, wherein said matched load value deriving means derives said matched load value information by means of finely adjusting the load value of said matching circuit corresponding to a chromosome with the highest evaluation among the chromosomes obtained by means of evolving said initial chromosome and said random chromosome.

13. The mobile radio apparatus according to claim 12, wherein if the processing for fine adjustment satisfies a predetermined limiting condition, said matched load value deriving means generates a new chromosome, and derives said matched load value information using said new chromosome that has been generated.

14. The mobile radio apparatus according to claim 13, wherein said matched load value deriving means evaluates said new chromosome, and
if there is a chromosome for providing the impedance matching, controls said matching circuit to have the load value corresponding to said chromosome,
while, if there is not said chromosome for providing the impedance matching, evolves said new chromosome using a genetic algorithm to derive said matched load value information using the evolved chromosome.

15. The mobile radio apparatus according to claim 14, wherein said matched load value deriving means derives said matched load value information by means of finely adjusting the load value of said matching circuit corresponding to the chromosome with the highest evaluation among the chromosomes obtained by means of evolving said new chromosome.

16. The mobile radio apparatus according to claim 1, further comprising
at least one other antenna other than said antenna, and
a switch circuit for switching a connection between said signal processing section, and said antenna and said other antenna, wherein
said matching circuit matches the impedance between said antenna and said other antenna, and said signal processing section, and
said control section controls the connection of said switch circuit.

17. The mobile radio apparatus according to claim 16, wherein said at least one switch is a MEMS (Micro-Electro-Mechanical System) switch.

18. The mobile radio apparatus according to claim 1, wherein said matched load value deriving means derives said matched load value information by means of repeatedly changing the load value of said matching circuit.

19. The mobile radio apparatus according to claim 18, wherein
said initial load value information is initial information for indicating the load value of said matching circuit, and
said matched load value deriving means derives information for indicating said matched load value information by means of evolving said initial information.

20. The mobile radio apparatus according to claim 18, wherein
said initial load value information is an initial chromosome for indicating the load value of said matching circuit, and
said matched load value deriving means derives a chromosome for indicating said matched load value information by means of evolving said initial chromosome using a genetic algorithm.

21. The mobile radio apparatus according to claim 18, wherein said matched load value deriving means derives said matched load value information by means of finely adjusting the load value of said matching circuit using a steepest descent method algorithm.

22. The mobile radio apparatus according to claim 18, wherein
said matching circuit includes a plurality of switches for selecting a load, and
said matched load value deriving means derives, while switching said plurality of switches, said matched load value information which is information on on/off of the switch by setting a state where said plurality of switches are controlled to a starting point, so as to correspond to the initial load value information with the highest evaluation.

23. The mobile radio apparatus according to claim 1, further comprising a matching detecting section for detecting the impedance matching rate, the matching detecting section being connected between said matching circuit and said signal processing section,
wherein said control section determines whether or not the impedance matching is obtained, based on the detected result by said matching detecting section.

24. The mobile radio apparatus according to claim 23, wherein said initial control means starts the control of said matching circuit based on the detected result by said matching detecting section.

25. The mobile radio apparatus according to claim 23, wherein
said matching detecting section detects a reflected voltage or a received power,
said mobile radio apparatus further comprises an integrating circuit, and
the reflected voltage or the received power detected by said matching detecting section is inputted into said control section through said integrating circuit.

26. The mobile radio apparatus according to claim 1, further comprising a use situation change detecting section for detecting the change of the use situation of said mobile radio apparatus,
wherein said initial control means starts the control of said matching circuit when the change of the use situation is detected by said use situation change detecting section.

27. The mobile radio apparatus according to claim 26, wherein said initial control means first evaluates the initial load value information corresponding to the use situation after the change detected by said use situation change detecting section.

28. The mobile radio apparatus according to claim 27, wherein
said mobile radio apparatus is a mobile phone,
said use situation change detecting section detects whether or not the use situation is in a talk state by means of detecting whether or not a call button of said mobile phone is pressed, and
if the use situation is detected to be in the talk state by said use situation change detecting section, said initial control means first evaluates the initial load value information corresponding to the talk state.

29. The mobile radio apparatus according to claim 27, wherein
said mobile radio apparatus is a flip mobile phone,
said use situation change detecting section detects whether or not the use situation is in an open state or in a close state by means of detecting open/close of said flip mobile phone, and said initial control means, if the open state is detected by said use situation change detecting section, first evaluates the initial load value information corresponding to the open state, while, if the use situation is detected to be in the close state by said use situation change detecting section, first evaluates the initial load value information corresponding to the close state.

30. The mobile radio apparatus according to claim 27, wherein said use situation change detecting section detects the change of the use situation of said mobile radio apparatus by detecting a temperature, and said initial control means first evaluates the initial load value information corresponding to the temperature detected by said use situation change detecting section.

* * * * *